(12) United States Patent
Sano et al.

(10) Patent No.: US 7,778,140 B2
(45) Date of Patent: Aug. 17, 2010

(54) OPTICAL HEAD DEVICE AND OPTICAL INFORMATION DEVICE

(75) Inventors: Kousei Sano, Osaka (JP); Takayuki Nagata, Osaka (JP); Hideki Aikoh, Osaka (JP); Joji Anzai, Osaka (JP); Fumitomo Yamasaki, Nara (JP)

(73) Assignee: Panasonic Corporation, Osaka (JP)

( * ) Notice: Subject to any disclaimer, the term of this patent is extended or adjusted under 35 U.S.C. 154(b) by 448 days.

(21) Appl. No.: 11/905,923

(22) Filed: Oct. 5, 2007

(65) Prior Publication Data

US 2008/0084797 A1 Apr. 10, 2008

(30) Foreign Application Priority Data

Oct. 5, 2006 (JP) .............................. 2006-273820
Oct. 25, 2006 (JP) .............................. 2006-289820

(51) Int. Cl.
*G11B 7/00* (2006.01)
(52) U.S. Cl. .............................. 369/112.12; 369/112.03
(58) Field of Classification Search ........................ None
See application file for complete search history.

(56) References Cited

U.S. PATENT DOCUMENTS

| | | | | |
|---|---|---|---|---|
| 7,206,277 B2 * | 4/2007 | Ogasawara et al. | .... | 369/112.12 |
| 7,573,801 B2 * | 8/2009 | Watanabe et al. | ...... | 369/112.23 |
| 2002/0159378 A1 * | 10/2002 | Lee et al. | ................ | 369/112.12 |
| 2007/0183296 A1 * | 8/2007 | Koike | ..................... | 369/112.12 |

FOREIGN PATENT DOCUMENTS

JP  2004-281026  10/2004

* cited by examiner

*Primary Examiner*—Joseph H Feild
*Assistant Examiner*—Tawfik Goma
(74) *Attorney, Agent, or Firm*—Wenderoth, Lind & Ponack, L.L.P.

(57) ABSTRACT

An offset-free tracking signal enables stable tracking control even if an optical disc is a multi-layer disc having three or more layers. Light receiving portions of a main region light receiving portion group are arranged between a projection line of a third dividing line on a photodetector and a projection line of a fourth dividing line on the photodetector by stray lights from information layers adjacent to the one, on which a light beam is focused, out of a plurality of information layers. Further, light receiving portions of a subregion light receiving portion group is arranged between a projection line of a first dividing line on a photodetector and a projection line of a second dividing line on the photodetector by the stray lights from the information layers adjacent to the one, on which a light beam is focused, out of the plurality of information layers.

10 Claims, 37 Drawing Sheets

Y-DIRECTION
X-DIRECTION

OPTICAL HEAD DEVICE AND OPTICAL INFORMATION DEVICE

BACKGROUND OF THE INVENTION

1. Field of the Invention

The present invention relates to an optical head device and an optical information device for recording and/or reproducing information on and/or from an information recording medium such as an optical disc or an optical card.

2. Description of the Background Art

In a conventional optical head device, a part of light reflected and diffracted from an optical disc as an information recording medium is diffracted and the diffracted light is detected by a light receiving portion different from the one for receiving a transmission light ($0^{th}$-order light), which is not diffracted, and used as a tracking signal (see, for example, FIG. 25 of Japanese Unexamined Patent Publication No. 2004-281026). FIG. 36 is a diagram showing the construction of a conventional optical head device 100 disclosed in the prior art document.

In FIG. 36, a light beam emitted from a semiconductor laser 101 is converted into a collimated light by a collimator lens 102, reflected by a beam splitter 103 and incident on an objective lens 104 to become a convergent light. This convergent light is irradiated to an optical disc 105. The light reflected and diffracted by an information layer 106 of the optical disc 105 passes through the objective lens 104 again and further passes through the beam splitter 103. The objective lens 104 is moved in an optical axis direction and a direction normal to a track by an actuator 107. The light beam having passed through the beam splitter 103 is incident on a holographic element 108 to be partly diffracted, thereby becoming a $0^{th}$-order light 110 that is not diffracted and a $1^{st}$-order light 111 that is diffracted. The light beam having passed through the holographic element 108 passes through a detection lens 109 to be incident on a photodetector 120.

FIG. 37A is a diagram showing the region division of the holographic element 108 shown in FIG. 36. Dotted line 130 in FIG. 37A shows a beam diameter and the overlap of diffracted lights from the track on the holographic element 108 when the focal point of the objective lens 104 is adjusted to a desired information layer of the optical disc. The holographic element 108 is divided into seven regions 140 to 146 by dividing lines 131 to 136. It is assumed that the region 142 is a first main region; the region 144 a second main region; the regions 140 and 145 a first subregion; the regions 141 and 146 a second subregion; and the region 143 a central region.

FIG. 37B is a diagram showing the arrangement of light receiving portions of the photodetector 120 shown in FIG. 36. The $0^{th}$-order light not diffracted by the holographic element 108 is received by a four-divided light receiving portion 150 on an optical axis to detect a focus signal and an RF signal. The $1^{st}$-order light 111 diffracted by the holographic element 108 is received by light receiving portions 151 to 154 according to the region division of the holographic element 108. A light beam 161 diffracted by the first main region is received by the light receiving portion 151; a light beam 162 diffracted by the second main region by the light receiving portion 152; a light beam 163 diffracted by the first subregion by the light receiving portion 153; and a light beam 164 diffracted by the second subregion by the light receiving portion 154.

However, in the construction of the conventional optical head device 100, stray lights from other layers (other-layer stray lights) are incident on the light receiving portions for the diffracted light if interlayer thicknesses vary in a multilayer optical disc having three or more layers. Thus, there has been a problem that an offset is added to the tracking signal and no stable tracking control can be performed.

SUMMARY OF THE INVENTION

In view of the above problems, an object of the present invention is to provide an optical head device and an optical information device capable of generating an offset-free tracking signal and realizing a stable tracking control even if an optical disc is a multilayer disc having three or more layers.

One aspect of the present invention is directed to an optical head device, comprising a light source for emitting a light beam; a focusing optical system for focusing the light beam emitted from the light source into a convergent light to be incident on an information recording medium having tracks; a diffraction optical system for diffracting a part of the light beam reflected and diffracted by the information recording medium; and a photodetector for receiving the light beam diffracted by the diffraction optical system and the light beam having passed through the diffraction optical system without being diffracted, wherein the diffraction optical system is divided into a plurality of regions by first and second dividing lines extending in a first direction and third and fourth dividing lines extending in a second direction intersecting with the first direction and uses regions at the outer sides of the first and second dividing lines as first and second subregions and regions at the outer sides of the third and fourth dividing lines as first and second main regions; the photodetector includes a $0^{th}$-order light receiving portion group for receiving the light beam having passed through the diffraction optical system without being diffracted, a main region light receiving portion group for receiving the light beam diffracted by the first and second main regions and a subregion light receiving portion group for receiving the light beam diffracted by the first and second subregions; the information recording medium includes a plurality of information layers; light receiving portions of the main region light receiving portion group are arranged between projection lines of the third and fourth dividing lines on the photodetector by stray lights from the information layer adjacent to the one, on which the light beam is focused, out of the plurality of information layers; and light receiving portions of the subregion light receiving portion group are arranged between projection lines of the first and second dividing lines on the photodetector by the stray lights from the information layer adjacent to the one, on which the light beam is focused, out of the plurality of information layers.

Another aspect of the preset invention is directed to an optical information device, comprising the above optical head device for reading and/or recording information from and/or on an information recording medium; a moving device for changing relative positions of the information recording medium and the optical head device, and a control circuit for controlling the moving device and the optical head device.

These and other objects, features, aspects and advantages of the present invention will become more apparent upon a reading of the following detailed description with reference to accompanying drawings.

DETAILED DESCRIPTION OF THE PREFERRED EMBODIMENTS OF THE INVENTION

Hereinafter, embodiments of the present invention are described with reference to the accompanying drawings. It should be noted that the following embodiments are merely specific examples of the present invention and do not limit the technical scope of the present invention.

First Embodiment

Figure 1:
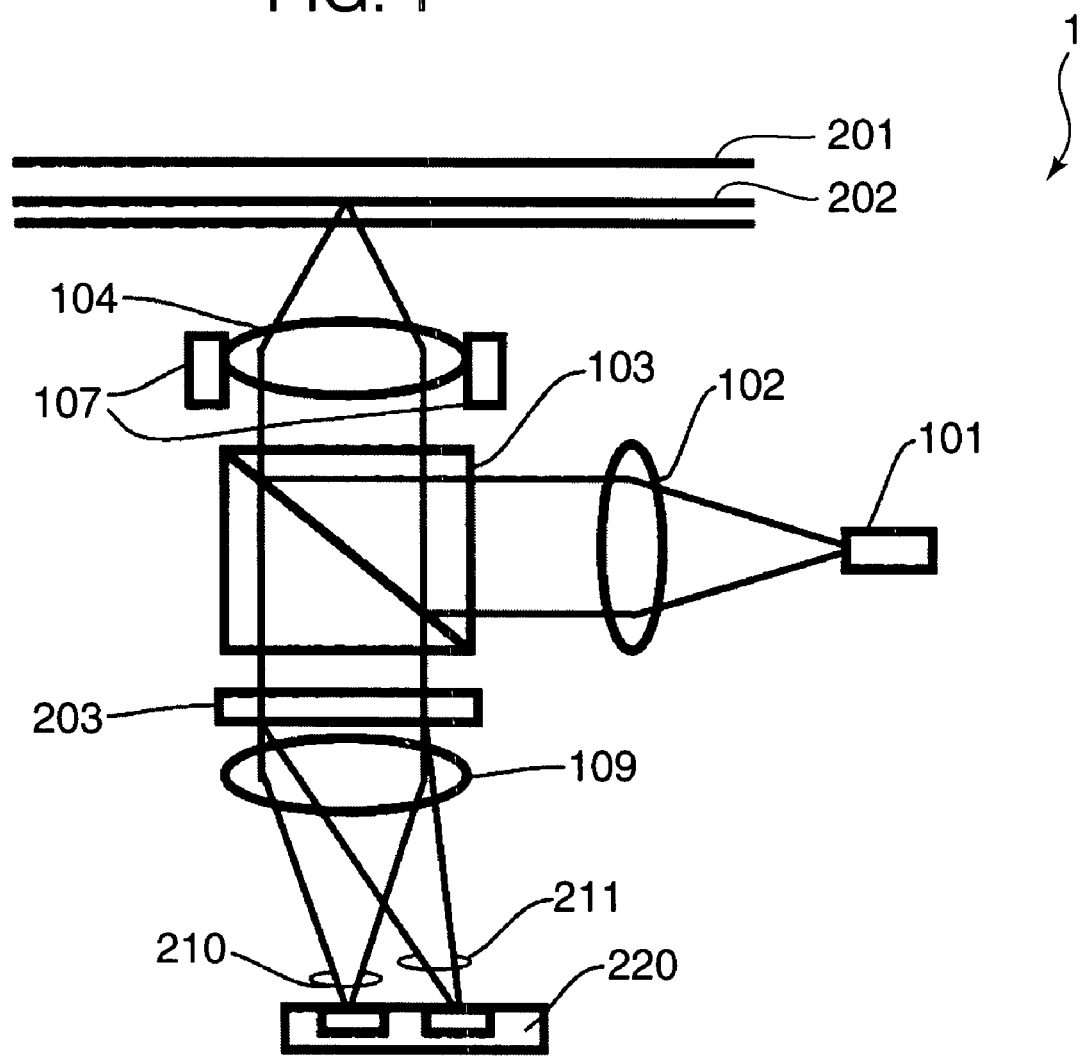
FIG. 1 is a diagram showing the construction of an optical head device according to a first embodiment.
Figure 36:
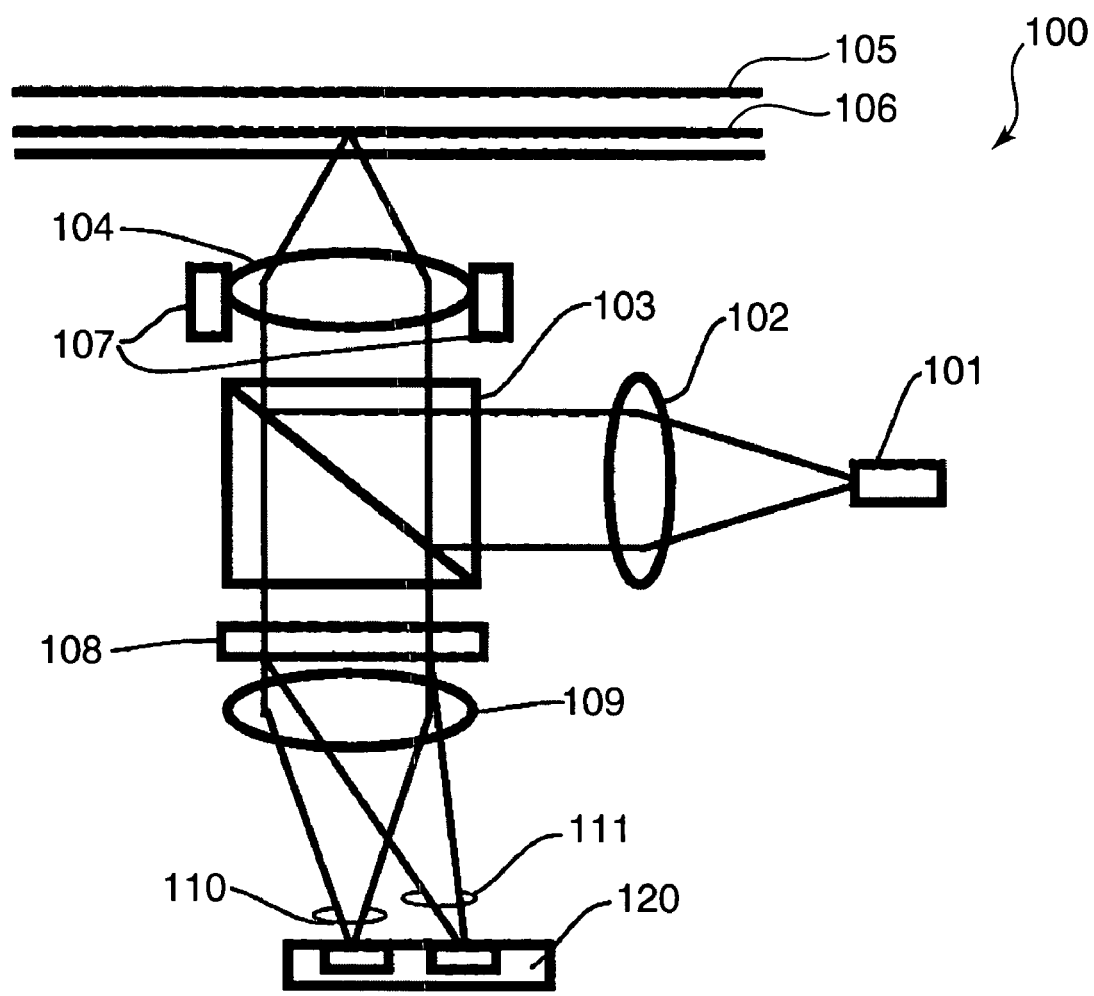
FIG. 36 is a diagram showing the construction of a conventional optical head device.
Figure 37A:
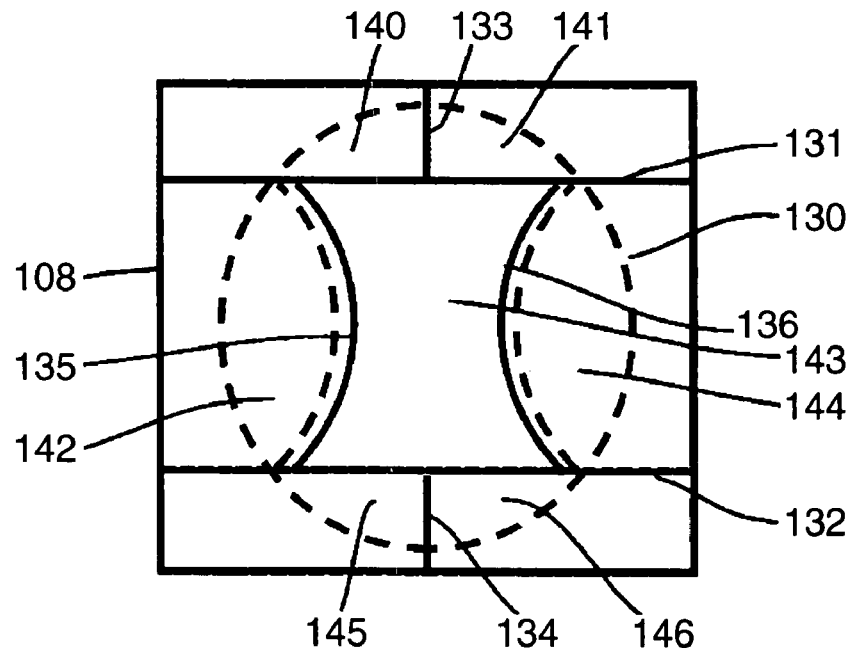
FIG. 37A is a diagram showing the region division of a holographic element shown in FIG. 36.
Figure 37B:
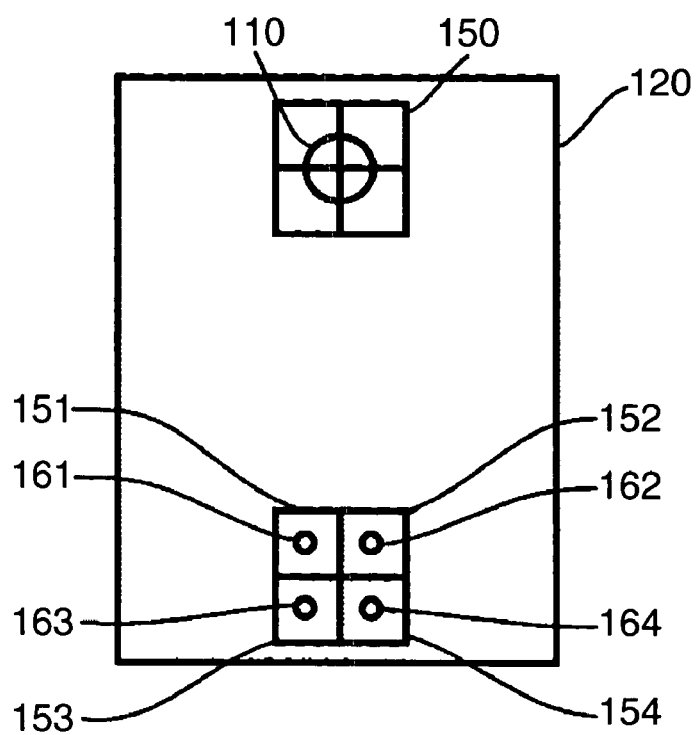
FIG. 37B is a diagram showing the arrangement of light receiving portions of a photodetector shown in FIG. 36.

FIG. 1 is a diagram showing the construction of an optical head device 1 according to a first embodiment of the preset invention. In FIG. 1, the same component elements as in FIG. 36 are not described by being identified by the same reference numerals.

In FIG. 1, the optical head device 1 includes a semiconductor laser 101, a collimator lens 102, a beam splitter 103, an objective lens 104, an actuator 107, a holographic element 203, a detection lens 109 and a photodetector 220.

The semiconductor laser 101 emits a light beam. The collimator lens 102 converts the light beam emitted from the semiconductor laser 101 from a divergent light into a collimated light. The beam splitter 103 reflects the light beam converted into the collimated light by the collimator lens 102 toward an optical disc 201, and transmits the light beam reflected by the optical disc 201 toward the photodetector 220.

The objective lens 104 focuses the light beam reflected by the beam splitter 103 on the optical disc 201 and transmits the light beam reflected by the optical disc 201 toward the beam splitter 103. The actuator 107 moves the objective lens 104 in an optical axis direction and a direction normal to a track. The holographic element 203 diffracts a part of the light beam reflected by the optical disc 201. The detection lens 109 focuses the light beam having passed through the holographic element 203 on the photodetector 220.

The photodetector 220 receives a $0^{th}$-order light not diffracted by the holographic element 203 and a $1^{st}$-order light diffracted by the holographic element 203. It should be noted that the construction of the photodetector 220 is described later.

Figure 2A:
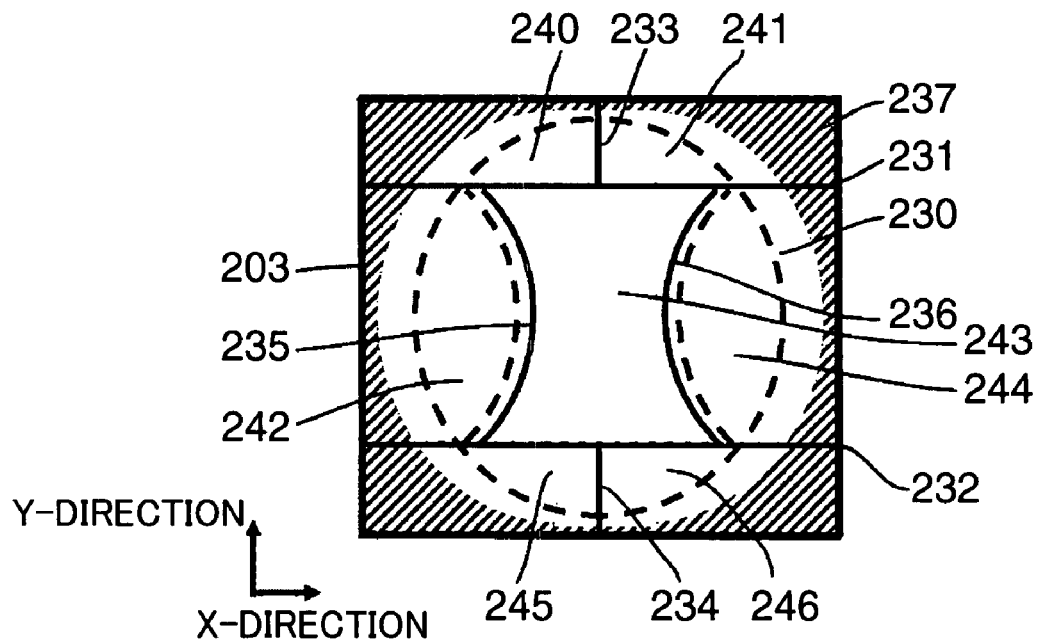
FIG. 2A is a diagram showing the region division of a holographic element shown in FIG. 1.
Figure 2B:
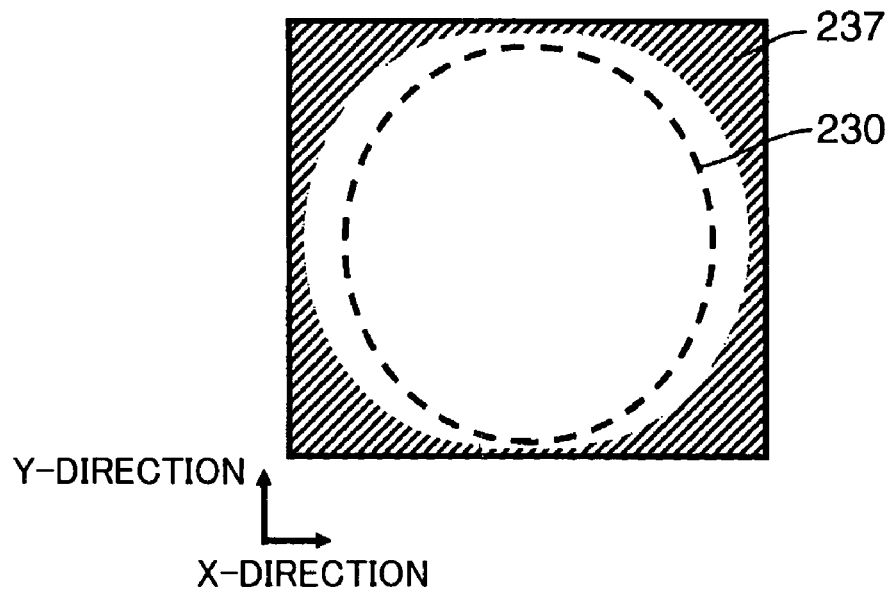
FIG. 2B is a diagram showing a relationship between an aperture and a light beam on the holographic element.

FIG. 2A is a diagram showing the region division of the holographic element 203 shown in FIG. 1. The dotted line in FIG. 2A shows a beam diameter and the overlap of diffracted lights from the track on the holographic element 203 when the focal point of the objective lens 104 is adjusted to a desired information layer of the optical disc 201. In FIGS. 2A and 2B, a Y-direction is a direction parallel to a direction tangent to the track (track tangential direction) and an X-direction is direction normal to the track tangential direction.

The holographic element 203 is divided into a plurality of regions by first and second dividing lines 231, 232 extending in a first direction, by third and fourth dividing lines 235, 236 extending in a second direction intersecting with the first direction, and fifth and sixth dividing lines 233, 234 extending in the second direction.

The first direction is a direction substantially normal to the tangent direction to the tracks, and the second direction is a direction substantially parallel to the track tangential direction. The first and second dividing lines 231, 232 extending in the first direction or the third, fourth, fifth and sixth dividing lines 235, 236, 233 and 234 extending in the second direction may not necessarily be straight lines parallel to the first or second direction, and may be curved or bent lines.

A region at the outer side of the first dividing line 231 is divided into a first region 240 and a second region 241 by the fifth dividing line 233. A region at the outer side of the second dividing line 232 is divided into a third region 245 and a fourth region 246 by the sixth dividing line 234. A first subregion is made up of the first and third regions 240, 245, and a second subregion is made up of the second and fourth regions 241, 246.

A region between the first and second dividing lines 231, 232 is divided into three regions by the third and fourth dividing lines 235, 236. A region at the outer side of the third dividing line 235 and between the first and the second dividing lines 231, 232 is a first main region 242. Further, a region at the outer side of the fourth dividing line 236 and between the first and second dividing lines 231, 232 is a second main region 244. Furthermore, a region enclosed by the first, second, third and fourth dividing lines 231, 232, 235 and 236 is a central region 243.

The holographic element 203 is formed with an aperture 237 for shielding unnecessary stray lights from other layers.

FIG. 2B is a diagram showing a relationship between the aperture 237 of the holographic element 203 and a light beam 230. The opening of the aperture 237 has an elliptical shape, wherein a length in the X-direction as a radial direction is longer than a length in the Y-direction as a tangential direction.

The length of the aperture 237 in the X-direction is so designed as to prevent shading even if the objective lens 104 is moved by a normal shift amount (up to about 200 μm to 400 μm) in the radial direction. Out of the other-layer stray lights, lights having larger beam diameters than the normal light beam on the holographic element 203, i.e. other-layer stray lights from the other layer(s) located before the layer from which information is reproduced and surface stray lights from the disc outer surface are shaded by the aperture 237, wherefore the stray lights have the size thereof restricted on the photodetector 220 and are unlikely to be incident on light receiving portions.

Figure 3:
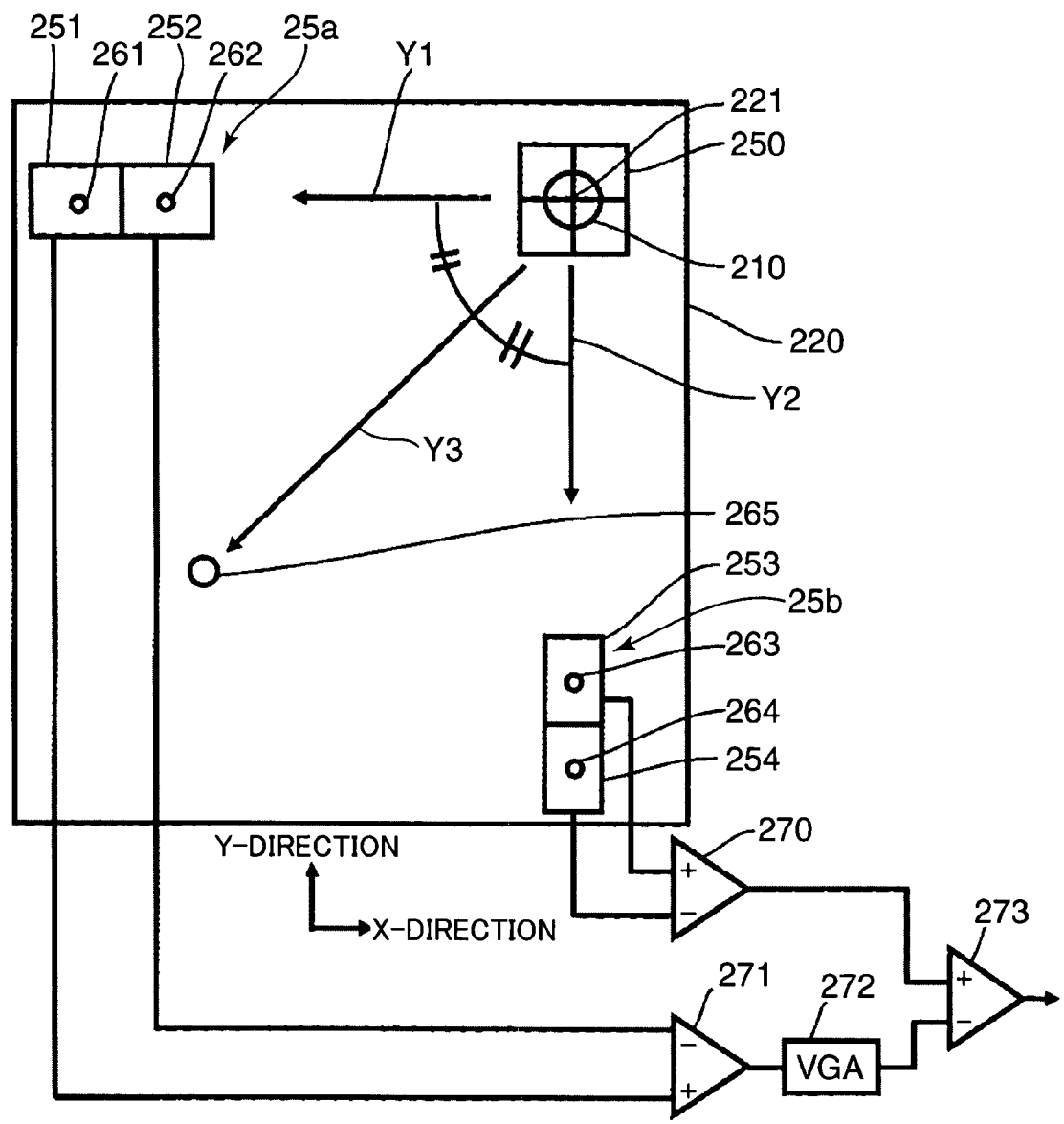
FIG. 3 is an arrangement diagram of light receiving portions of a photodetector in the first embodiment.

FIG. 3 is a diagram showing the arrangement of the light receiving portions of the photodetector 220 in the first embodiment. A $0^{th}$-order light 210 not diffracted by the holographic element 203 is received by a four-divided light receiving portion ($0^{th}$-order light receiving portion group) 250 on an optical axis 221. Although not shown, a focus signal (or focus error signal) and an RF signal are obtained from a signal outputted from this four-divided light receiving portion 250 according to an amount of light.

A subregion light receiving portion group 25a is arranged while being spaced apart from the optical axis 221 in a direction of extensions of the first and second dividing lines 231, 232 (direction shown by an arrow Y1). The subregion light receiving portion group 25a includes light receiving portions 251, 252. The light receiving portions 251, 252 are arranged adjacent to each other in the X-direction. The light receiving portion 251 receives a light beam 261 diffracted by the first and third regions 240, 245 as the first subregion. The light beam 261 diffracted by the first and third regions 240, 245 as the first subregion is received by the light receiving portion 251 as one of the light receiving portions constituting the subregion light receiving portion group 25a. The light receiving portion 251 outputs a signal corresponding to an amount of the received light.

The light receiving portion 252 receives a light beam 262 diffracted by the second and fourth regions 241, 246 as the second subregion. The light beam 262 diffracted by the second and fourth regions 242, 246 as the second subregion is similarly received by the light receiving portion 252. The light receiving portion 252 outputs a signal corresponding to an amount of the received light.

On the other hand, a main region light receiving portion group 25b is arranged while being spaced apart from the optical axis 221 in a direction of extensions of tangents to the third and fourth dividing lines 235, 236 (direction shown by an arrow Y2). The main region light receiving portion group 25b includes light receiving portions 253, 254. The light receiving portions 253, 254 are arranged adjacent to each other in the Y-direction. The light receiving portion 253 receives a light beam 263 diffracted by the first main region 242. The light beam 263 diffracted by the first main region 242 is received by the light receiving portion 253. The light receiving portion 253 outputs a signal corresponding to an amount of the received light. The light receiving portion 254 receives a light beam 264 diffracted by the second main region 244. The light beam 264 diffracted in the second main region 244 is similarly received by the light receiving portion 254. The light receiving portion 254 outputs a signal corresponding to an amount of the received light.

As shown in FIG. 3, the main region light receiving portion group 25b made up of the light receiving portions 253, 254 and the subregion light receiving portion group 25a made up of the light receiving portions 251, 252 are arranged to define an angle of about 90° with the optical axis 221 as an apex. Further, a light beam 265 diffracted by the central region 243 is diffracted in a direction (direction shown by an arrow Y3) bisecting the angle defined by the main region light receiving portion group 25b and the subregion light receiving portion group 25a with the optical axis 221 as an apex.

Signals outputted from the light receiving portions 253, 254 are inputted to a subtraction circuit 270, which generates a differential signal of the signals outputted from the light receiving portions 253, 254 and outputs this differential signal to a variable gain amplifier (VGA) circuit 272. The variable gain amplifier circuit 272 multiplies the differential signal generated by the subtraction circuit 271 by a desired coefficient and outputs the resultant to a subtraction circuit 273. The subtraction circuit 273 receives an output signal from the subtraction circuit 270 and an output signal from the variable gain amplifier circuit 272, generates and outputs a differential signal of these. An output signal from the subtraction circuit 273 becomes an offset-corrected tracking signal (or tracking error signal).

Since the third and fourth dividing lines 235, 236 are substantially parallel to the track tangential direction, the main region light receiving portion group 25b is arranged in a direction of the extension of a tangent to the track projected on the holographic element 203 with respect to the optical axis 221. Further, since the first and second dividing lines 231, 232 are substantially normal to the track tangential direction, the subregion light receiving portion group 25a is arranged in a direction normal to the direction tangent to the track projected on the holographic element 203 with respect to the optical axis 221.

By not using the central region 243, stray lights by the first and second main regions 242, 244 do not distribute between the extensions of the two vertical dividing lines (third and fourth dividing lines 235, 236) in the second direction between the first and second main regions 242, 244 mainly including diffraction components from the track. Further, stray lights by the first subregion do not distribute between the extensions of the two horizontal dividing lines (first and second dividing lines 231, 232) in the first direction between the two regions 240 and 245 constituting the first subregion. Thus, by arranging the light receiving portions 253, 254 for receiving the lights from the first and second main regions 242, 244 such that the longitudinal directions thereof extend along the second direction and arranging the light receiving portions 251, 252 for receiving the lights from the first and second subregions such that the longitudinal directions thereof extend along the first direction, the respective lights can be stably detected while the stray lights are avoided.

Figure 4A:
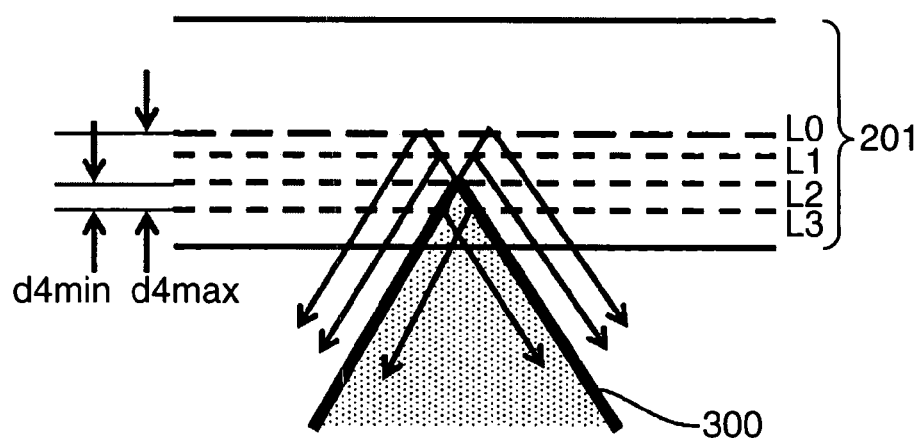
FIG. 4A is a diagram showing a state of stray lights produced from other layers when a convergent light is focused on a certain recording layer in the case where an optical disc has four recording layers.

FIG. 4A is a diagram showing a state of stray lights produced from other layers when a convergent light 300 is focused on a certain recording layer in the case where the optical disc 201 has four recording layers. In the optical disc 201, four recording layers, i.e. layers L0, L1, L2 and L3 are laminated toward an incident surface of a light beam. In FIG. 4A, the light beam is focused on the layer L2, and lights reflected by the layers L0, L1 and L3 become other-layer stray lights.

Figure 4B:
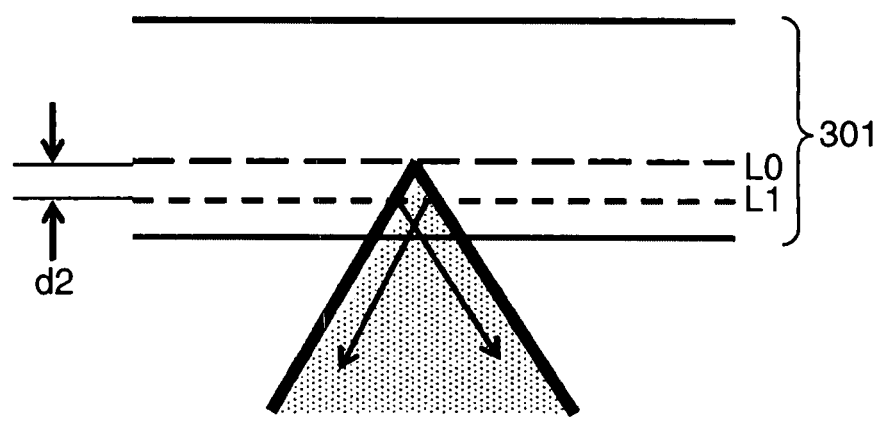
FIG. 4B is a diagram showing a state of stray lights produced from another layer when a convergent light is focused on a certain recording layer in the case where an optical disc has two recording layers.

FIG. 4B is a diagram showing a state of stray lights produced from another layer when a convergent light 300 is focused on a certain recording layer in the case where an optical disc 301 has two recording layers. In the optical disc 301, two recording layers, i.e. layers L0 and L1 are laminated toward an incident surface of a light beam. In FIG. 4B, when the light beam is focused on the layer L0, and lights reflected by the layer L1 become other-layer stray lights.

In the case of the two-layer optical disc, a layer spacing d2 between the layers L0 and L1 is normally defined to be 25±5 μm, a minimum of 20 μm and a maximum of 30 μm. Thus, the sizes of the stray lights from the other layer on the photodetector 220 are restricted to a certain degree. On the other hand, in the case of an optical disc having three or more layers such as the four-layer optical disc, a minimum layer spacing d4min, for example, between the layers L2 and L3 has a high possibility of being shorter than the layer spacing d2 in the case of the two-layer optical disc. Further, a maximum layer spacing d4max between the layers L0 and L3 has a high possibility of being longer than the layer spacing d2 in the case of the two-layer optical disc.

Figure 5:
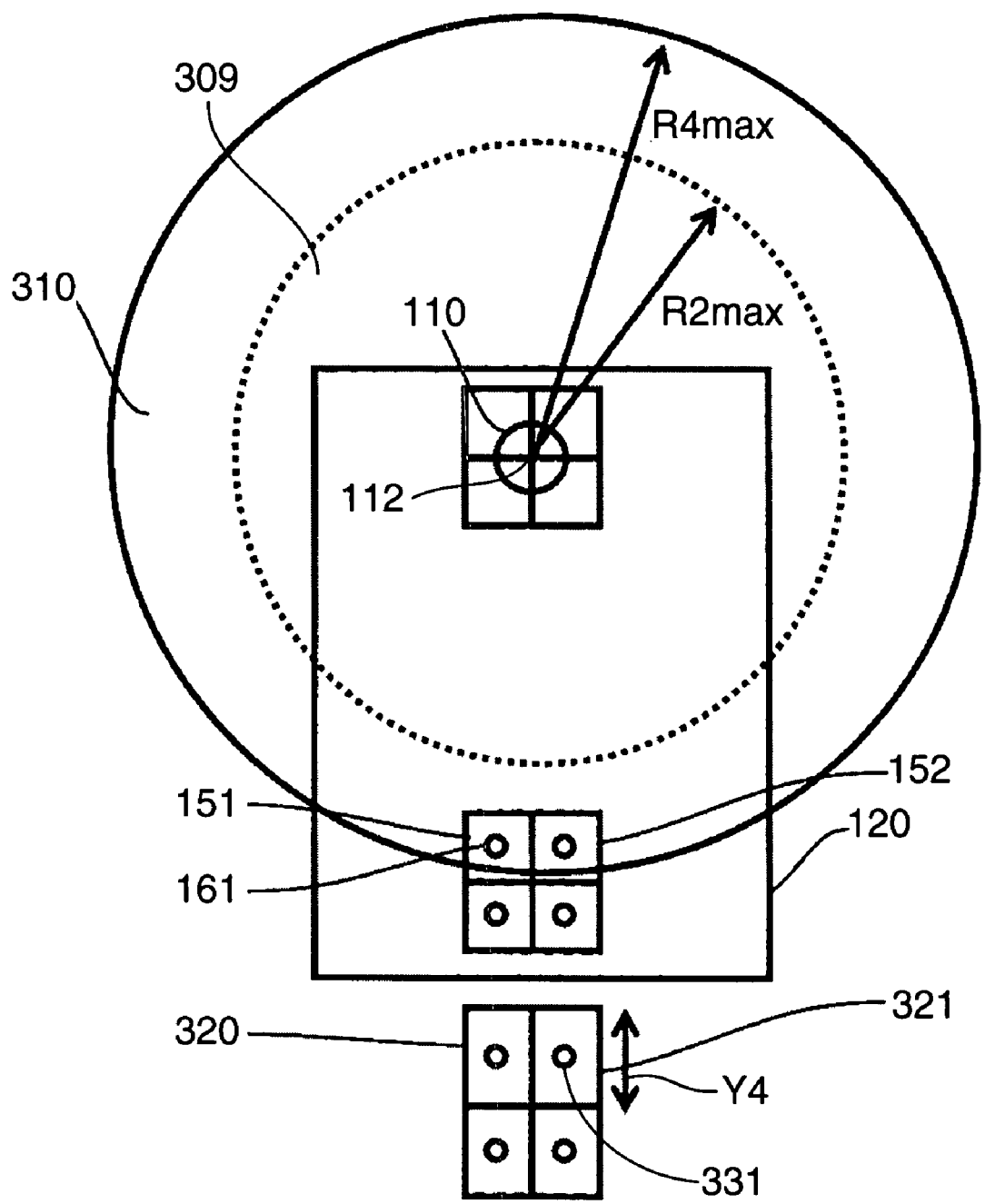
FIG. 5 is a diagram showing a relationship between a conventional photodetector and stray lights of a four-layer optical disc.

FIG. 5 is a diagram showing a relationship between a conventional photodetector 120 and stray lights from a four-layer optical disc. In the case of the two-layer optical disc, an other-layer stray light 309 of a $0^{th}$-order light 110 has a substantially circular shape (circle shown by the dotted line in FIG. 5) having a radius R2max proportional to a maximum value of the layer spacing d2. On the other hand, in the case of the four-layer optical disc, an other-layer stray light 310 of the $0^{th}$-order light 110 has a substantially circular shape having a radius R4max proportional to a maximum value of the layer spacing d4max.

Since the radius R4max is larger than the radius R2max, the stray light 309 is not incident on the light receiving portions 151, 152 in the case of the two-layer optical disc, but the stray light 310 is incident thereon in the case of the four-layer optical disc. If an objective lens is moved in a radial direction according to the deviation of the optical disc, stray lights are also moved and offsets of detection signals detected by the light receiving portions vary. This variation becomes an offset of a tracking signal, thereby hindering a stable tracking control.

In order to avoid such a problem, the light receiving portions may be arranged at positions distant from the stray lights, for example, like light receiving portions 320, 321, but a light beam 331 diffracted to be incident on this light receiving portion 321 becomes more distant from an optical axis 112. Thus, a direction of a light diffracted by a holographic element largely changes, and the size of the light receiving portion 321 needs to be enlarged in a direction shown by an arrow Y4 of FIG. 5.

Figure 6A:
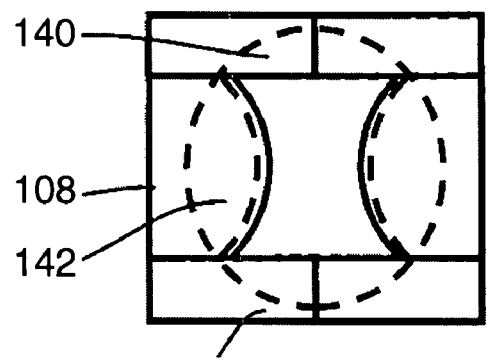
FIGS. 6A to 6E are diagrams showing a relationship between the conventional photodetector and other-layer stray lights produced from two recording layers having a minimum interlayer spacing in a four-layer optical disc.

FIGS. 6A to 6E are diagrams showing a relationship between a conventional photodetector 120 and other-layer stray lights produced from two recording layers having a minimum layer spacing in a four-layer optical disc. FIG. 6A shows the conventional holographic element 108 again. Here, lights diffracted by the regions 140, 142 and 145 are described as an example.

Figure 6B:
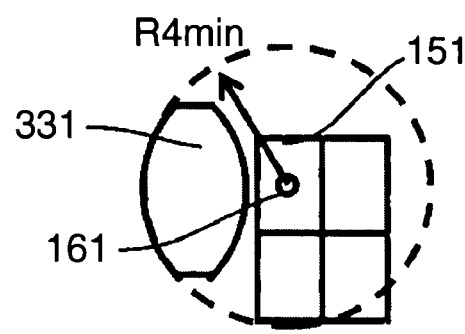
Figure 6C:
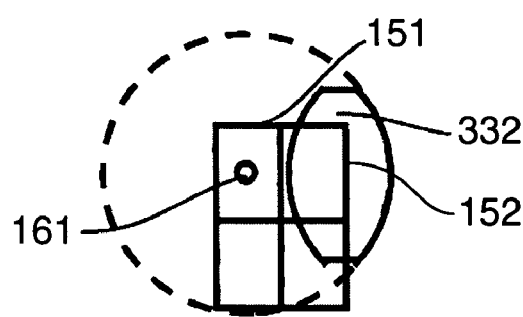

FIGS. 6B and 6C are diagrams showing a relationship of the light receiving portion 151, the light beam 161 diffracted by the region 142 and the other-layer stray light 331 of the light beam 161. FIG. 6B is a diagram showing the stray light 331 from the front-side recording layer when a focal point is adjusted to the back-side recording layer out of the two recording layers having the minimum layer spacing. The other-layer stray lights produced from the two recording layers having the minimum layer spacing are of the size having the radius R4min proportional to the minimum layer spacing d4min. However, since the light beam 161 is the one from the region 142, the shape of the stray light is similar to that of a light beam passing the region 142. This is the stray light 331. Since stray lights from the front-side recording layer are focused behind the photodetector, they are located in a direction in which the holographic element 108 is mapped as it is.

On the other hand, FIG. 6C is a diagram showing a stray light 332 from the back-side recording layer when a focal point is adjusted to the front-side recording layer out of the two recording layers having the minimum layer spacing. Since stray lights from the back-side recording layer are focused before the photodetector, they are located in a direction in which the holographic element 108 is mapped while being inverted in point symmetry. Thus, as shown in FIG. 6C, the stray light 332 is incident on the light receiving portion 152 adjacent to the light receiving portion 151.

Figure 6D:
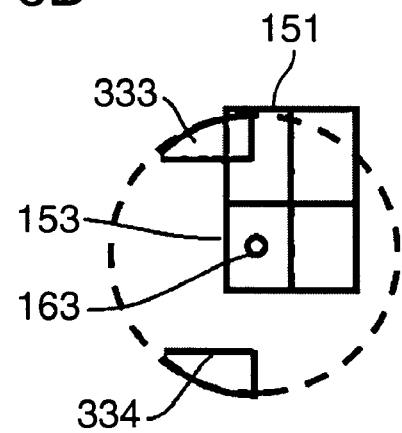
Figure 6E:
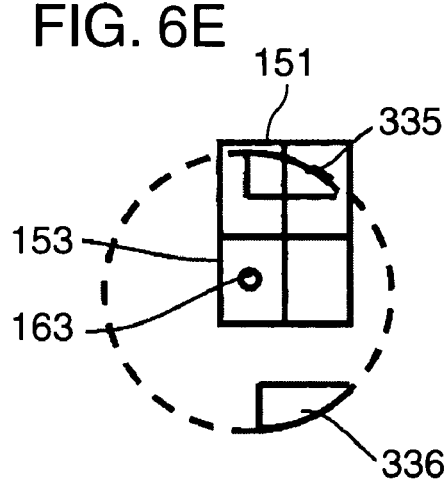

FIGS. 6D and 6E are diagrams showing relationships between the light beam 163 diffracted by the regions 140 and 145 and other-layers stray lights 333, 334 of the light beam 163. Similar to FIG. 6B, FIG. 6D shows the stray lights 333, 334 from the front-side recording layer when a focal point is adjusted to the back-side recording layer out of the two recording layers having the minimum layer spacing. Since stray lights from the front-side recording layer are focused behind the photodetector, they are located in a direction in which the holographic element 108 is mapped as it is. Thus, as shown in FIG. 6D, the stray light 333 is incident on the light receiving portion 151 adjacent to the light receiving portion 153.

On the other hand, FIG. 6E is a diagram showing stray lights 335, 336 from the back-side recording layer when a focal point is adjusted to the front-side recording layer out of the two recording layers having the minimum layer spacing. Since stray lights from the back-side recording layer are focused before the photodetector, they are located in a direction in which the holographic element 108 is mapped while being inverted in point symmetry. Thus, as shown in FIG. 6E, the stray light 335 is incident on the light receiving portion 151 adjacent to the light receiving portion 153.

As described above, since the radius R4min of the stray lights decreases as the layer spacing d4min becomes smaller than the minimum value of the layer spacing d2, the stray lights of the diffracted lights are incident on the light receiving portions. These lights also become an offset upon detecting a tracking signal and hinder a stable tracking control. Further, if the lengths of the light receiving portions are made longer like the light receiving portions 320, 321 of FIG. 5, stray lights are more likely to be incident on the light receiving portions. Since the radius R4max is larger and the radius R4min is smaller in a four-layer optical disc or the like, it has been difficult to avoid stray lights with such a construction of the light receiving portions.

Figure 7:
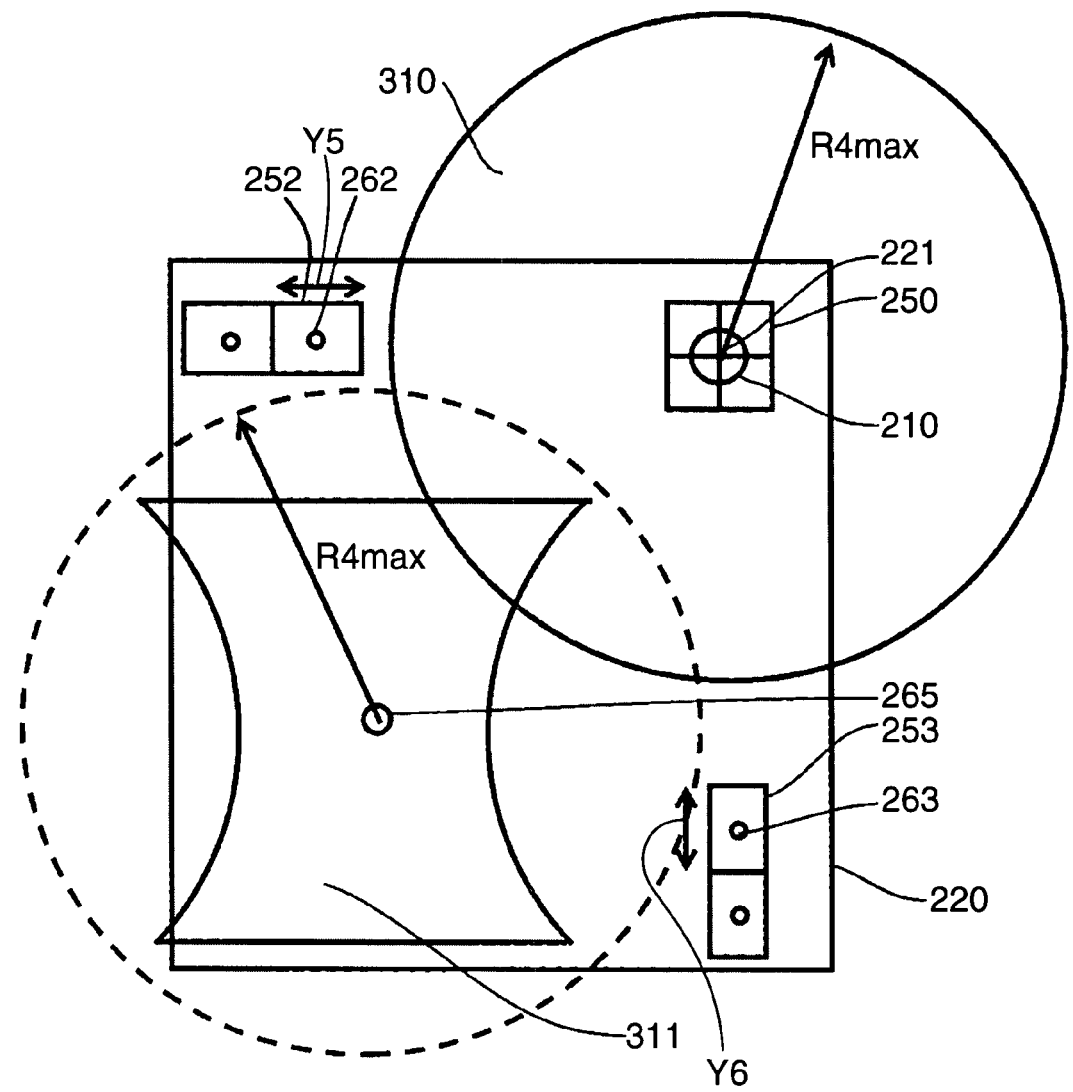
FIG. 7 is a diagram showing a relationship between the photodetector of the first embodiment and stray lights of a four-layer optical disc.

The construction of the photodetector in the first embodiment is described. FIG. 7 is a diagram showing a relationship between the photodetector 220 of the first embodiment and stray lights from a four-layer optical disc. In the case of the four-layer optical disc, an other-layer stray light 310 of the $0^{th}$-order light 210 has a substantially circular shape having a radius R4max proportional to the maximum value of the layer spacing d4max. In order to avoid the reception of the other-layer stray light 310, the light receiving portions 252, 253 are arranged at positions sufficiently distant from the optical axis 221.

Since the light beams 262, 263 diffracted to be incident on the light receiving portions 252, 253 are quite distant from the optical axis 221, a change in the diffraction direction by the holographic element is large. However, the light receiving portions 252, 253 are respectively made larger in directions shown by arrows Y5, Y6 of FIG. 7.

An other-layer stray light of a light beam 265 diffracted by the central region 243 of the holographic element becomes an other-layer stray light 311 having a mapped shape of the central region 243 in a substantially circular range of the radius R4max. However, since the light receiving portions 252, 253 are arranged at the positions distant from the other-layer stray light 311, the other-layer stray light 311 is incident neither on the light receiving portion 252 nor on the light receiving portion 253.

Figure 8A:
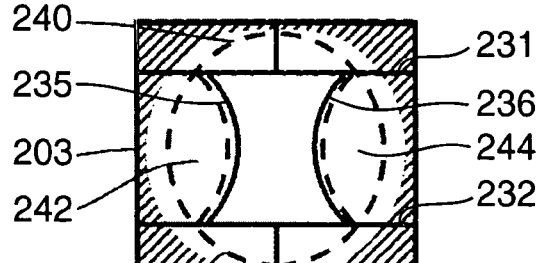
FIGS. 8A to 8D are diagrams showing a relationship between the photodetector of the first embodiment and stray lights from layers having a minimum interlayer spacing in the four-layer optical disc.

FIGS. 8A to 8D are diagrams showing relationships between the photodetector 220 of the first embodiment and stray lights from recording layers having a minimum layer spacing in a four-layer optical disc. FIG. 8A shows the holographic element 203 again. Here, lights diffracted by the regions 240, 242 and 245 are described as an example.

Figure 8B:
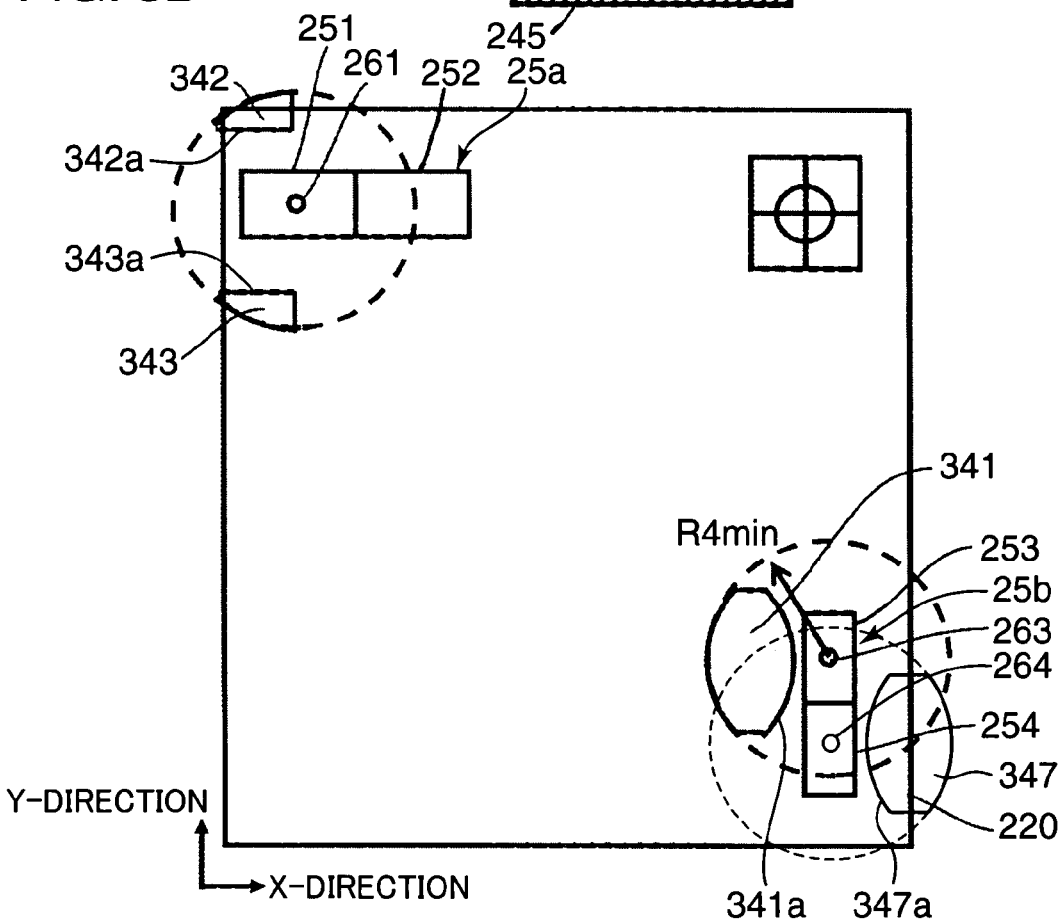

FIG. 8B shows a relationship of the light receiving portion 253 of the photodetector 220, the light beam 263 diffracted by the region 242 and an other-layer stray light 341 of the light beam 263 and a relationship of the light receiving portion 251, the light beam 261 diffracted by the regions 240 and 245 and other-layer stray lights 342, 343 of the light beam 261.

Other-layer stray lights produced from the two information layers having the minimum layer spacing becomes other-layer stray lights having the radius R4min proportional to the minimum layer spacing d4min. However, since the light beam 263 is the one from the region 242, the shape of the stray light is similar to that of a light beam passing the region 242. This is the stray light 341. FIG. 8B shows the stray lights from the front-side layer when a focal point is adjusted to the back-side information layer out of the information layers having the minimum layer spacing. Since the stray lights from the front-side layer are focused behind the photodetector 220, they are located in a direction in which the holographic element 203 is mapped as it is.

Further, since the light beam 264 is the one from the second main region 244, the shape of the stray light is similar to that of a light beam passing the second main region 244. This is a stray light 347.

Similarly, since the light beam 261 is the one from the regions 240 and 245, the shapes of the stray lights are similar to that of a light beam passing the regions 240 and 245. These are the stray lights 342, 343.

Figure 8D:
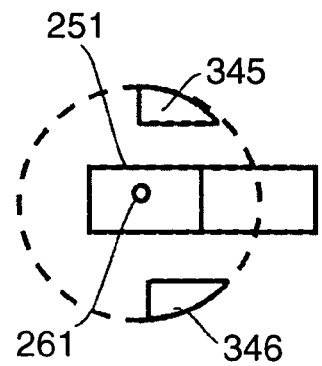
Figure 8C:
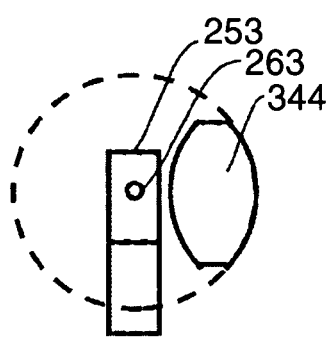

On the other hand, FIG. 8C shows a stray light 344 from the back-side layer when the light beam 263 diffracted by the region 242 is focused on the front-side information layer out of the information layers having the minimum layer spacing. Since stray lights from the back-side layer are focused before the photodetector 220, they are located in a direction in which the holographic element 203 is mapped while being inverted in point symmetry. Thus, as shown in FIG. 8C, the stray light 344 and the stray light 341 are point symmetrical with respect to the light beam 263.

FIG. 8D shows stray lights 345, 346 from the back-side layer when the light beam 261 diffracted in the regions 240, 245 is focused on the front-side layer out of the information layers having the minimum layer spacing. Since stray lights from the back-side layer are focused before the photodetector, they are located in the direction in which the holographic element 203 is mapped while being inverted in point symmetry. Thus, as shown in FIG. 8D, the stray lights 345, 346 and the stray lights 342, 343 are point symmetrical with respect to the light beam 261.

The respective light receiving portions 253, 254 of the main region light receiving portion group 25b are arranged between a projection line 341a of the third dividing line 235 on the photodetector 220 and a projection line 347a of the fourth dividing line 236 on the photodetector 220 by stray lights from two information layers adjacent to the one information layer, on which the light beam is focused, out of a plurality of information layers. Further, the light receiving portions 251, 252 of the subregion light receiving portion group 25a are arranged between a projection line 342a of the first dividing line 231 on the photodetector 220 and a projection line 343a of the second dividing line 232 on the photodetector 220 by stray lights from the two information layers adjacent to the one information layer, on which the light beam is focused, out of a plurality of information layers.

Here, the photodetector 220 is described, taking a specific numerical example. For example, if the focal length of the detection optical system is 26 mm and that of the objective lens is 1.3 mm, lateral magnification is 20. When the minimum layer spacing d4min of the optical disc is 8 μm, the focal point of an other-layer stray light is 3.2 mm by the approximation calculation of 8×20×20 μm. If NA=0.85, the beam radius of the objective lens is 1.105 mm. When a stray light from the front-side layer is considered, this light beam is focused at a position 3.2 mm behind the photodetector 220 and the radius R4min of the other-layer stray light on the photodetector 220 is 1.105×3.2/(26+3.2)=0.121 mm. In other words, the radius R4 min of the other-layer stray light on the photodetector is about 121 μm.

If it is assumed that a ratio of the spacing between the two vertical dividing lines (third dividing line 235 and fourth dividing line 236) on the holographic element 203 to the light beam is 40%, the stray light has a clearance of 96 μm in the center. Specifically, the spacing between the projections of the two vertical dividing lines on the photodetector 220 by the other-layer stray lights from the layers having the minimum layer spacing is 96 μm. If the width of the light receiving portions 253, 254 in a direction (X-direction of FIG. 8B) normal to the diffraction direction of the light toward the light receiving portions of the main region light receiving portion group 25b is 80 μm, the stray light can be avoided with a margin of 8 μm at each side.

Similarly, if it is assumed that a ratio of the spacing between the two horizontal dividing lines (first dividing line 231 and second dividing line 232) on the holographic element 203 to the light beam is 60%, the stray light has a clearance of 145 μm in the center. Specifically, the spacing between the projections of the two horizontal dividing lines on the photodetector 220 by the other-layer stray lights from the layers having the minimum layer spacing is 145 μm. If the width of the light receiving portions 251, 252 in a direction normal to the diffraction direction (Y-direction of FIG. 8B) of the light toward the light receiving portions of the subregion light receiving portion group 25a is 80 μm, the stray lights can be avoided with a margin of 32 μm at each side.

Further, if it is assumed that the maximum layer spacing d4max of the optical disc is 50 μm, a distance from the objective lens to the detection lens is 50 mm and an aperture radius of the objective lens is 1.105 mm, the radius R4max of the other-layer stray lights on the photodetector 220 is calculated to be 819 μm using a paraxial formula for the lens. In FIG. 7, the stray lights can be avoided if a distance from an end of the light receiving portion 253 of the main region light receiving portion group 25b to the optical axis 221 of the $0^{th}$-order light is made longer than 819 μm and if a distance from an end of the light receiving portion 252 of the subregion light receiving portion group 25a to the optical axis 221 of the $0^{th}$-order light is also made longer than 819 μm.

Figure 9:
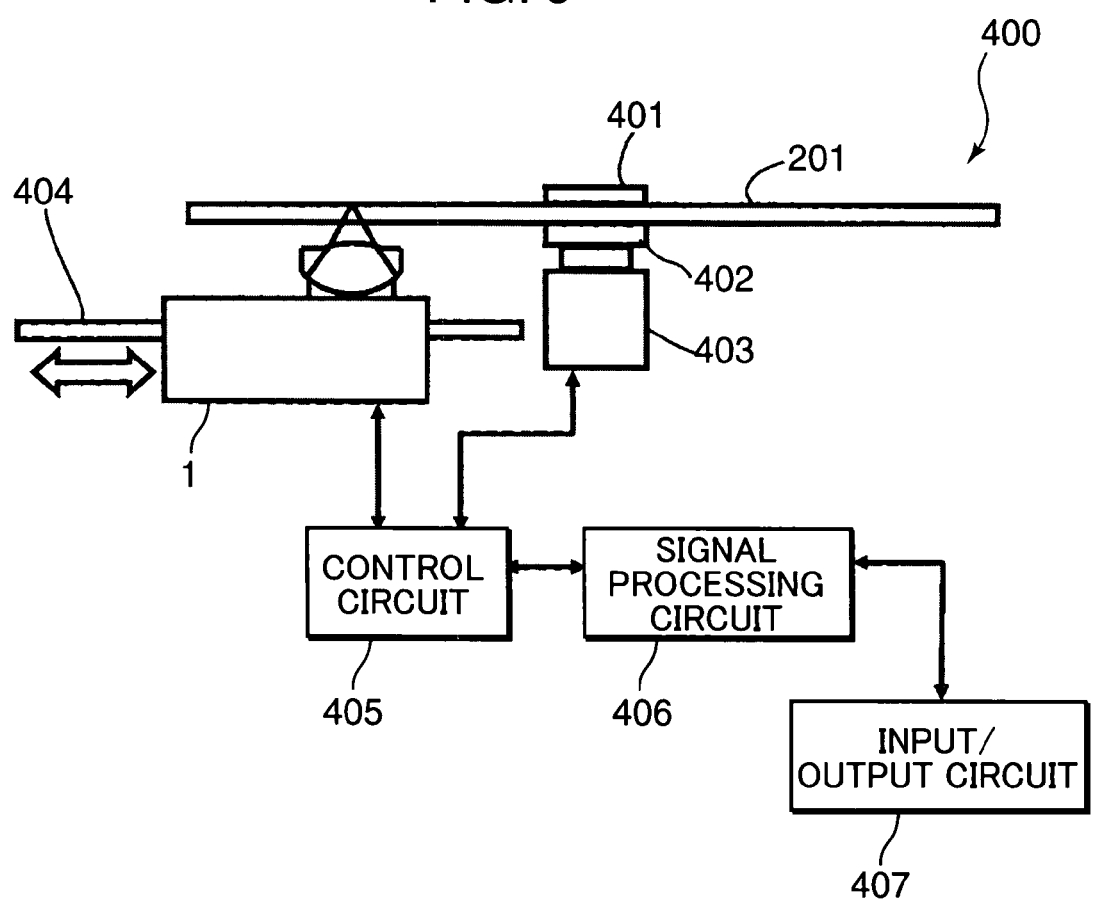
FIG. 9 is a diagram showing the entire construction of an optical disc drive as an example of an optical information device according to the first embodiment.

FIG. 9 is a diagram showing the entire construction of an optical disc drive 400 as an example of the optical information device. The optical disc drive 400 is provided with an optical head device 1, a spindle motor 403, a traverse 404, a control circuit 405, a signal processing circuit 406 and an input/output circuit 407.

The optical head device 1 has the same construction as the optical head device 1 shown in FIG. 1 and reads and/or records information from and/or on an optical disc 201. The spindle motor 403 rotates the optical disc 201 at a constant rotation speed or a constant linear speed in accordance with a rotation control signal fed from the control circuit 405. The optical disc 201 is sandwiched between a clamper 401 and a turntable 402 to be fixed, and rotated by the spindle motor (rotating device) 403.

The traverse 404 moves the optical head device 1 to a specified position in a radial direction of the optical disc 201 in accordance with a movement control signal fed from the control circuit 405, thereby changing relative positions of the optical disc 201 and the optical head device 1. The optical head device 1 is located on the traverse (moving device) 404 so that a light emitting point can be moved from the inner circumferential side to the outer circumferential side of the optical disc 201.

The control circuit 405 performs a focus control, a tracking control, a traverse control and a rotation control for the spindle motor 403 and the like in accordance with signals received from the optical head device 1. Further, the signal processing circuit 406 reproduces information from a reproduced signal and outputs the reproduced information to the input/output circuit 407, and sends signals from the input/output circuit 407 to the optical head device 1 via the control circuit 405.

If the holographic element 203 and the photodetector 220 of this embodiment are used in this way, neither the other-layer stray lights of the $0^{th}$-order layer nor those of the diffracted lights are incident on the light receiving portions for receiving the diffracted lights, wherefore an offset-free tracking signal can be detected and a stable tracking control can be realized.

Effects obtained by forming the aperture 237 atop the holographic element 203 shown in FIG. 2A can be realized not only at the time of combination with the light receiving portion pattern of this embodiment, but also at the time of combination with the light receiving portion pattern of the prior art.

Second Embodiment

Figure 10:
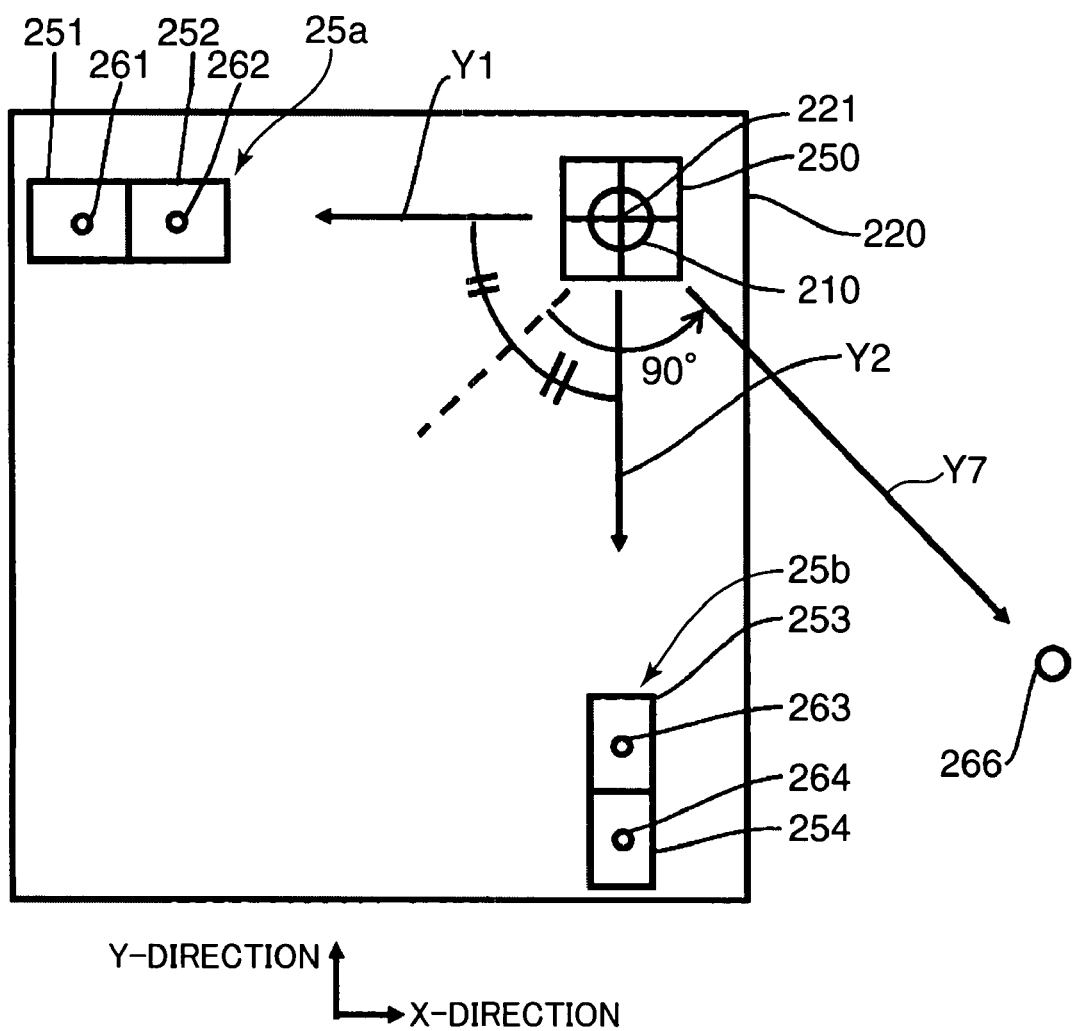
FIG. 10 is an arrangement diagram of light receiving portions of a photodetector in a second embodiment.

In a second embodiment is described an example in which a diffraction direction of a light passing a central region is changed. FIG. 10 is a diagram showing a relationship between light receiving portions of a photodetector of an optical head device according to the second embodiment of the present invention and light beams. In the second embodiment, a holographic element different from the one in the first embodiment is used and the diffraction direction of the light passing the central region is changed in a direction different from the one in the first embodiment. Specifically, a light beam 266 diffracted by a central region 243 is diffracted in a direction (direction shown by an arrow Y7) normal to a direction bisecting an angle defined between a main region light receiving portion group 25b and a subregion light receiving portion group 25a with an optical axis 221 as an apex. Light beams diffracted in other regions are diffracted to the same positions as in the first embodiment. A photodetector 220 also has the same construction as in the first embodiment, and optical elements other than the holographic element also have the same constructions.

Figure 11:
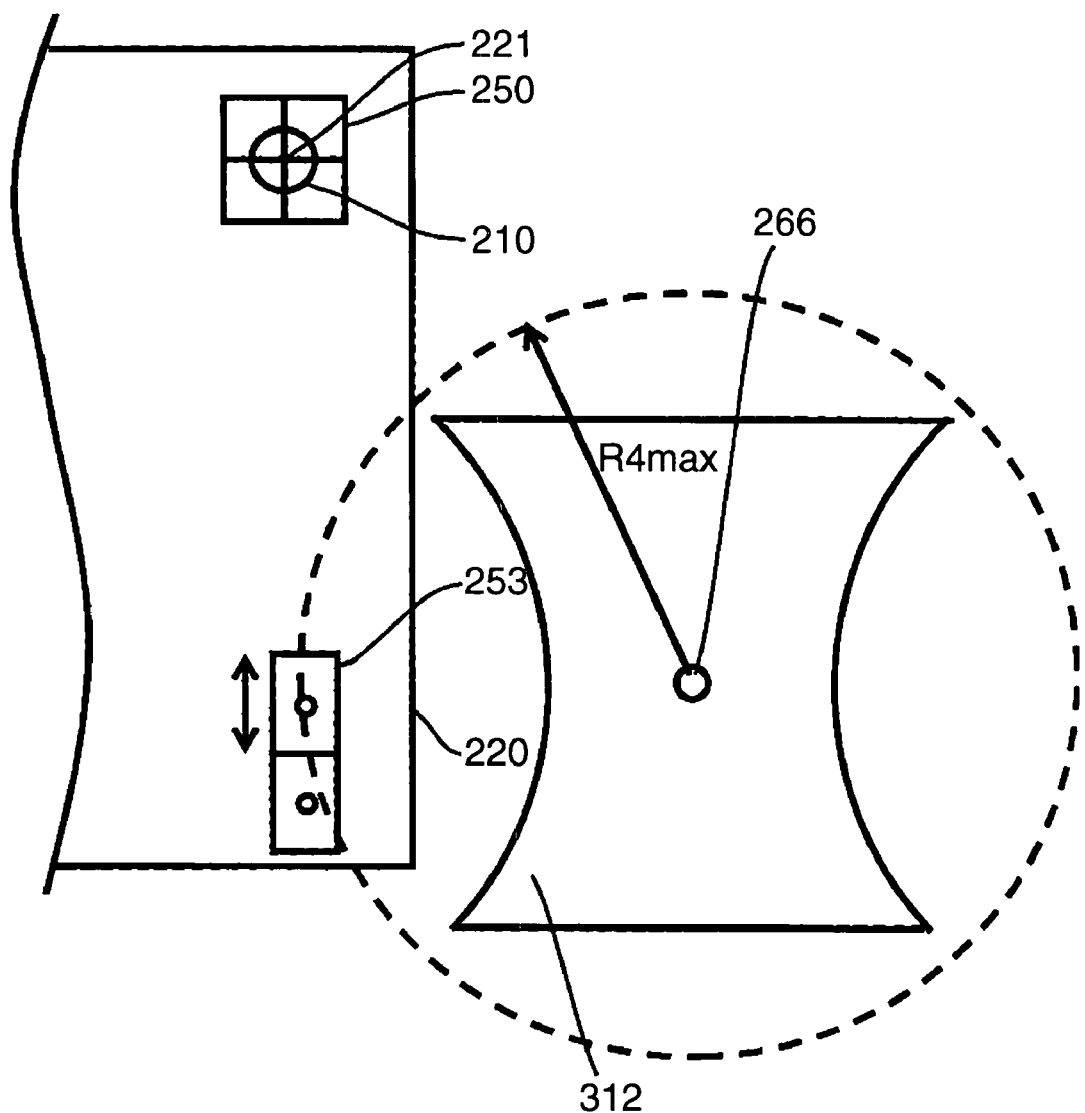
FIG. 11 is a diagram showing a relationship between the photodetector of the second embodiment and stray lights of a four-layer optical disc.

FIG. 11 is a diagram showing a relationship between the photodetector 220 of the second embodiment and a stray light from a four-layer optical disc. An other-layer stray light 312 of the light beam 266 diffracted by the central region 243 has a mapped shape of the central region 243 in a substantially circular range having a radius R4max proportional to a maximum value of a maximum layer spacing between most distant layers. However, since light receiving portions 251, 252, 253 and 254 are arranged at positions distant from the other-layer stray light 312, the other-layer stray light 312 is incident on none of the light receiving portions 251, 252, 253 and 254.

Thus, even if the optical head device of the second embodiment is used, neither other-layer stray lights of a $0^{th}$-order light nor those of diffracted lights are incident on the light receiving portions for receiving the diffracted lights if a disc has three or more layers as in the first embodiment. Therefore, an offset-free tracking signal can be detected and a stable tracking control can be realized.

Third Embodiment

Although information is recorded and/or reproduced by irradiating light beams to one type of an optical disc in the optical head devices according to the first and second embodiments, information is recorded and/or reproduced by irradiating light beams having different wavelengths to three types of optical discs such as CDs, DVDs and Blu-ray discs (hereinafter, abbreviated as "BDs").

An optical head device capable of reproducing/writing with CDs, DVDs and high-density optical discs such as BDs includes light sources for emitting three lights having different wavelengths to reproduce information from the respective discs. In this case, the number of parts can be reduced by receiving these lights by one photodetector.

Figure 12:
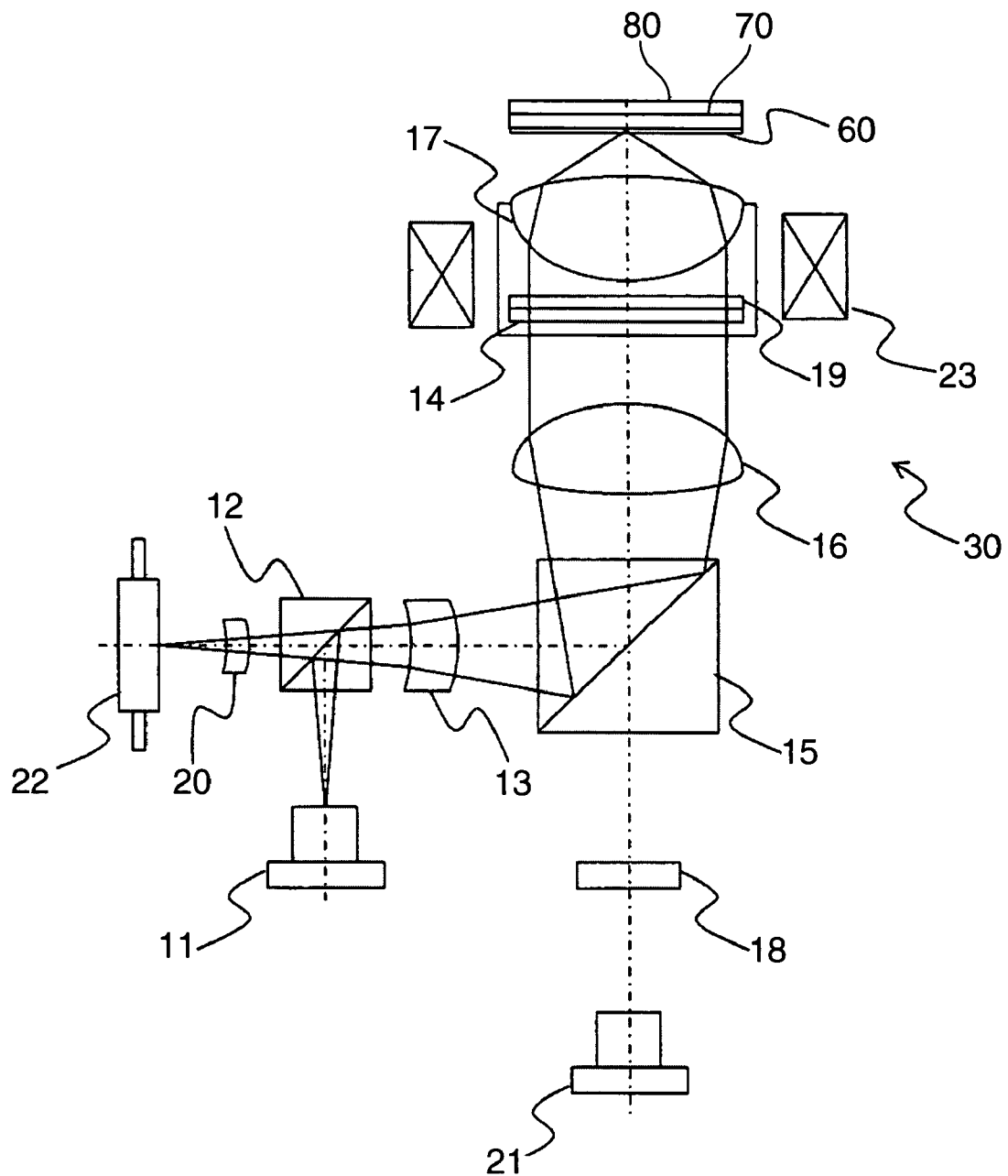
FIG. 12 is a diagram showing the construction of an optical head device according to a third embodiment.

FIG. 12 is a diagram showing the construction of an optical head device according to a third embodiment. An optical head device 30 shown in FIG. 12 includes a first light source 11, a beam splitter 12, a relay lens 13, a holographic element 14, a dichroic prism 15, a collimator lens 16, an objective lens 17, a diffraction grating 18, a quarter-wave plate 19, a detection lens 20, a second light source 21, a photodetector 22 and an actuator 23.

The first light source 11 emits a blue-violet laser beam for BDs. The second light source 21 emits a red laser beam for DVDs and an infrared laser beam for CDs. The actuator 23 drives the objective lens 17, the holographic element 14 and the quarter-wave plate 19 as an integral unit. Further, a BD 60 is an optical disc whose protection substrate is 0.075 to 0.1 mm in thickness.

An operation of the optical head 30 to record or reproduce information on or from the BD 60 is described. A blue-violet laser beam having a wavelength of 405 nm and emitted from the first light source 11 is reflected by the beam splitter 12 and passes through the relay lens 13 to be converted into a divergent beam having a different NA. The blue-violet laser beam reflected by the dichroic prism 15 is converted into a substantially collimated beam by the collimator lens 16 and passes through the holographic element 14. Thereafter, the blue-violet laser beam is converted from a linearly polarized light into a circularly polarized light by the quarter-wave plate 19, and is focused as a light spot on an information recording surface of the BD 60 through the protective substrate by the objective lens 17.

The laser beam reflected by the information recording surface of the BD 60 is split into a $0^{th}$-order diffracted light and a $1^{st}$-order diffracted light by the holographic element 14 after passing through the objective lens 17 again and being converted into a linearly polarized light different from the one on the outward journey. Thereafter, the laser beam passes through the collimator lens 16 and is reflected by the dichroic prism 15. The laser beam reflected by the dichroic prism 15 passes through the relay lens 13 and the beam splitter 12 and is introduced to the photodetector 22 after having astigmatism given thereto by the detection lens 20.

Next, an operation of the optical head device 30 in the case of recording or reproducing on or from a DVD 70, which is an optical disc whose protective substrate is 0.6 mm in thickness, is described. It should be noted that only the blue-violet laser beam irradiated to the BD 60 is shown in FIG. 12.

A red laser beam having a wavelength of 655 nm and emitted from the second light source 21 passes through the diffraction grating 18 and the dichroic prism 15 to be converted into a substantially collimated beam by the collimator lens 16. The red laser beam having passed through the holographic element 14 is converted from a linearly polarized light into a circularly polarized light by the quarter-wave plate 19, and is focused as a light spot on an information recording surface of the DVD 70 through the protective substrate by the objective lens 17.

The laser beam reflected by the information recording surface of the DVD 70 is split into a $0^{th}$-order diffracted light and a $1^{st}$-order diffracted light by the holographic element 14 after passing through the objective lens 17 again and being converted into a linearly polarized light different from the one on the outward journey by the quarter-wave plate 19. Thereafter, the laser beam passes through the collimator lens 16 and is reflected by the dichroic prism 15. The laser beam reflected by the dichroic prism 15 passes through the relay lens 13 and the beam splitter 12 and is introduced to the photodetector 22 after having astigmatism given thereto by the detection lens 20.

Next, an operation of the optical head device 30 in the case of recording or reproducing on or from a CD 80, which is an optical disc whose protective substrate is 1.2 mm in thickness, is described. An infrared laser beam having a wavelength of 785 nm and emitted from the second light source 21 passes through the dichroic prism 15 and is converted into a substantially collimated beam by the collimator lens 16 after being split into a main beam as a $0^{th}$-order diffracted light and a sub-beam as a $1^{st}$-order diffracted light by the diffraction grating 18. The infrared laser beam having passed through the holographic element 14 is converted from a linearly polarized light into a circularly polarized light by the quarter-wave plate 19, and is focused as a light spot on an information recording surface of the CD 80 through the protective substrate by the objective lens 17.

The laser beam reflected by the information recording surface of the CD 80 passes through the holographic element 14 after passing through the objective lens 17 again and being converted into a linearly polarized light different from the one on the outward journey by the quarter-wave plate 19. Thereafter, the laser beam passes through the collimator lens 16 and is reflected by the dichroic prism 15. The laser beam reflected by the dichroic prism 15 passes through the relay lens 13 and the beam splitter 12 and is introduced to the photodetector 22 after having astigmatism given thereto by the detection lens 20.

Here, the objective lens 17 has a diffraction structure for focusing a blue-violet laser beam for recording or reproducing on or from the BD 60, a red laser beam for recording or reproducing on or from the DVD 70 and an infrared laser beam for recording or reproducing on or from the CD 80 respectively as minute light spots utilizing wavelength differences.

However, the present invention is not limited to the optical head device using the objective lens 17 having such a diffraction structure, and the objective lens 17 may be a refraction type objective lens utilizing wavelength dispersion characteristics of a plurality of glass materials or a combination lens including a plurality of diffraction-type/refraction-type lenses.

The holographic element 14 has a function of transmitting substantially entirely the blue-violet laser beam, red laser beam and infrared laser beam on the outward journeys emitted from the light sources, diffracting a part of the blue-violet laser beam and red laser beam on the return journeys reflected by the optical discs and converted into the linearly polarized lights of directions normal to those of the linearly polarized lights on the outward journeys by the quarter-wave plate 19 and substantially entirely transmitting the infrared laser beam on the return journey reflected by the optical disc and converted into the linearly polarized light of a direction normal to that of the linearly polarized light on the outward journey by the quarter-wave plate 19. Since a beam dividing pattern of the holographic element 14 and grating pitches of the respective regions are common for the blue-violet laser beam and red laser beam, a diffraction angle θ of the red laser beam is larger than that of the blue-violet laser beam substantially in proportion to wavelength because of a relationship:

$$m\lambda = d \sin \theta$$

where m: diffraction order, λ: laser wavelength, d: grating pitch, θ: diffraction angle.

On the other hand, the diffraction grating 18 of this embodiment has wavelength selectivity of producing a $0^{th}$-order diffracted light and $\pm 1^{st}$-order diffracted lights for the infrared laser beam emitted from the second light source and substantially entirely transmitting the red laser beam. The present invention is not limited to such a diffraction grating, and the diffraction grating 18 may be a simple diffraction grating of also producing a $0^{th}$-order diffracted light and $\pm 1^{st}$-order diffracted lights for the red laser beam.

Figure 13:
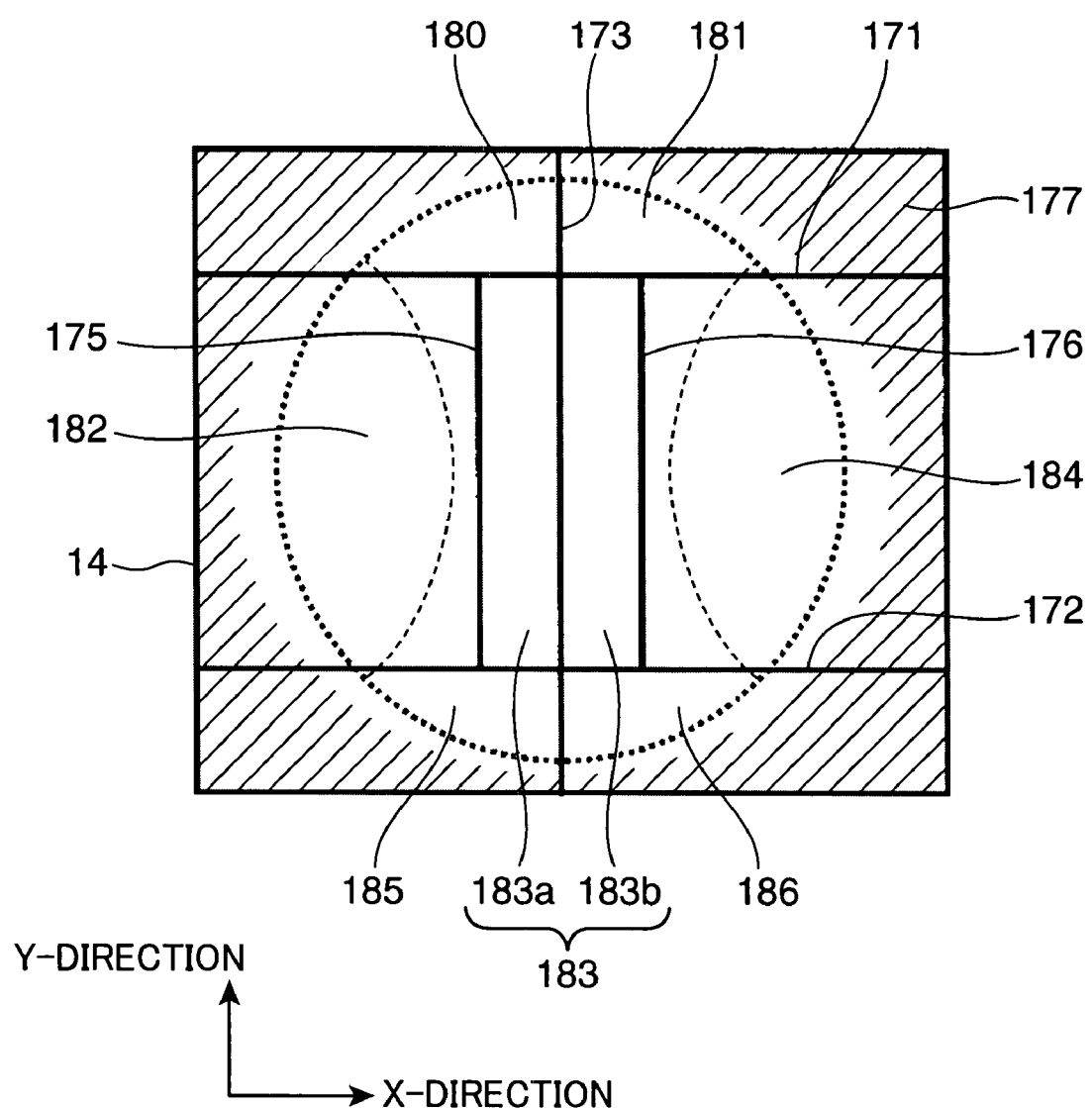
FIG. 13 is a diagram showing the region division of a holographic element shown in FIG. 12.

FIG. 13 is a diagram showing the region division of the holographic element 14 shown in FIG. 12. Dotted lines in FIG. 13 show a beam diameter and the overlap of the diffracted lights from a track on the holographic element 14, for example, when the focal point of the objective lens 17 is adjusted to a desired information layer of the BD 60. In FIG. 13, a Y-direction is a direction parallel to a track tangential direction, and an X-direction is a direction normal to the track tangential direction.

The holographic element 14 is divided into a plurality of regions by first and second dividing lines 171, 172 extending in a first direction, third and fourth dividing lines 175, 176 extending in a second direction intersecting with the first direction, and a fifth dividing line 173 likewise extending in the second direction.

The first direction is a direction substantially normal to the track tangential direction, and the second direction is a direction substantially parallel to the track tangential direction. The first and second dividing lines 171, 172 extending in the first direction or the third, fourth dividing lines 175, 176 extending in the second direction may not necessarily be straight lines parallel to the first or second direction, and may be curved or bent lines. Further, the fifth dividing line 173 may not necessarily be a straight line parallel to the second direction.

A region at the outer side of the first dividing line 171 is divided into a first region 180 and a second region 181 by the fifth dividing line 173. A region at the outer side of the second dividing line 172 is divided into a third region 185 and a fourth region 186 by the fifth dividing line 173. A first sub-region is made up of the first and third regions 180, 185, and a second subregion is made up of the second and fourth regions 181, 186.

A region between the first and second dividing lines 171, 172 is divided into four regions by the third, fourth and fifth dividing lines 175, 176 and 173. A region at the outer side of the third dividing line 175 and between the first and the second dividing lines 171, 172 is a first main region 182. Further, a region at the outer side of the fourth dividing line 176 and between the first and second dividing lines 171, 172 is a second main region 184. Furthermore, a region enclosed by the first, second, third and fourth dividing lines 171, 172, 175 and 176 is a central region 183. The central region 183 is further divided into a first central region 183a and a second central region 183b by the fifth dividing line 173.

The holographic element 14 is provided with an aperture 177 for shielding unnecessary other-layer stray lights.

The holographic element 14 has eight regions and splits a blue-violet laser beam as a specified linearly polarized light (blue-violet laser beam on the return journey reflected by the BD 60 in this embodiment) into the $0^{th}$-order diffracted light and the $\pm 1^{st}$-order diffracted lights. The $0^{th}$-order diffracted light j0 is produced from all the regions of the holographic element 14. The $+1^{st}$-order diffracted light ja is produced from the region 184 of the holographic element 14. The $+1^{st}$-order diffracted light jb is produced from the region 182 of the holographic element 14. The $+1^{st}$-order diffracted light jc is produced from the region 181 of the holographic element 14. The $+1^{st}$-order diffracted light jd is produced from the region 186 of the holographic element 14. The $+1^{st}$-order diffracted light je is produced from the region 180 of the holographic element 14. The $+1^{st}$-order diffracted light jf is produced from the region 185 of the holographic element 14. The $+1^{st}$-order diffracted light jg is produced from the region 183b of the holographic element 14. The $+1^{st}$-order diffracted light jh is produced from the region 183a of the holographic element 14.

Figure 14:
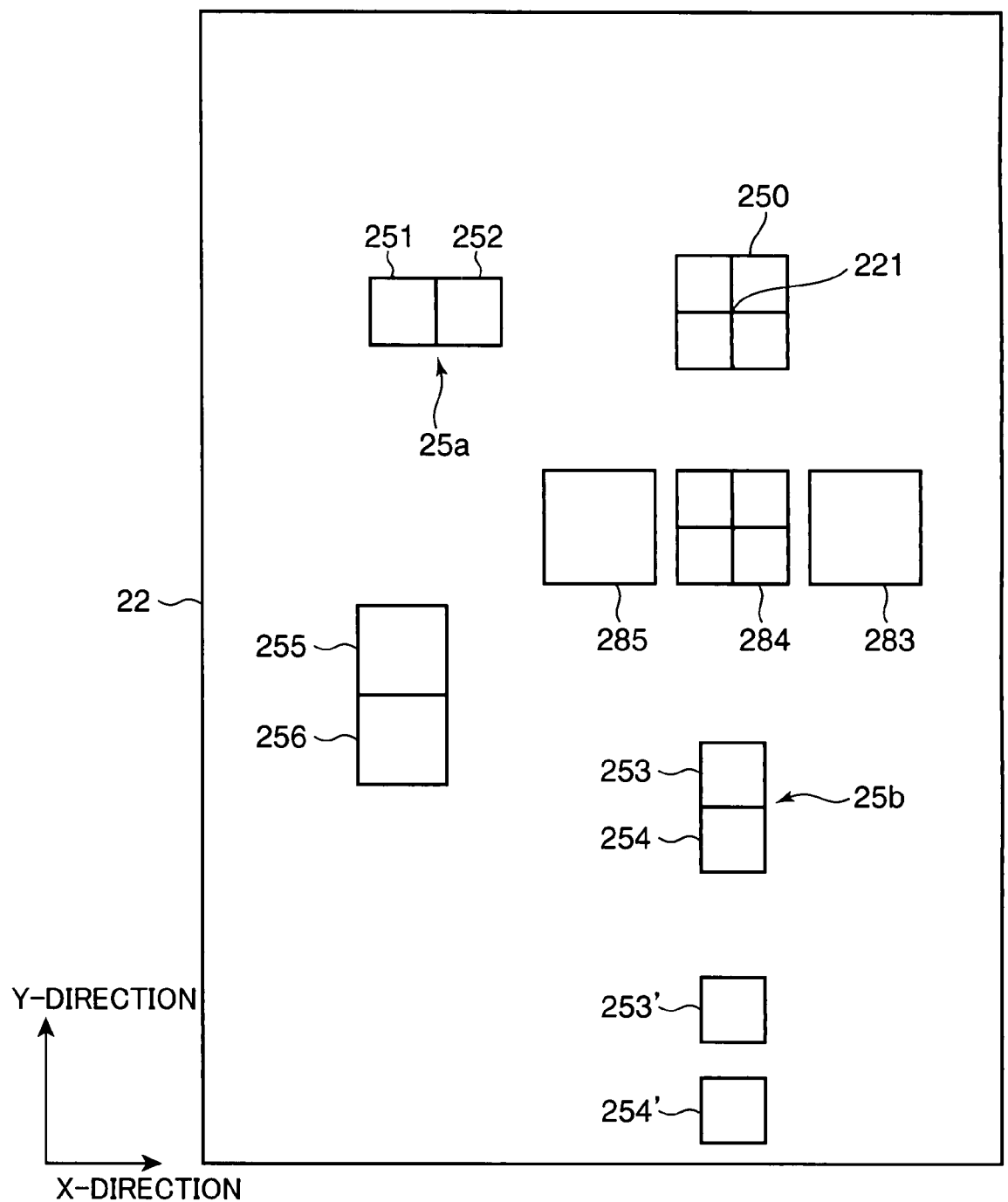
FIG. 14 is an arrangement diagram of light receiving portions of a photodetector in the third embodiment.

FIG. 14 is a diagram showing the arrangement of light receiving portions of the photodetector 22 in the third embodiment. The photodetector 22 includes a plurality of light receiving portions 250 to 256, 283 to 285, 253' and 254'. Here, although the light receiving portions 253, 253' and the light receiving portions 254, 254' are arranged at different positions, each pair can be seen as a light receiving portion of one region since being connected by wiring and gives one output.

A subregion light receiving portion group 25a is arranged while being spaced in a direction of extensions of the first and second dividing lines 171, 172 from an optical axis 221 and includes the light receiving portions 251 and 252.

A main region light receiving portion group 25b is arranged while being spaced in a direction of extensions of the third and fourth dividing lines 175, 176 from the optical axis 221 and includes the light receiving portions 253 and 254.

The light receiving portion 250 is used to detect focus error signals of the BD 60 and the DVD 70 and signals for reproducing information recorded on the optical discs. The light receiving portion 284 is used to detect a focus error signal of the CD 80 and signals for reproducing information recorded on the optical disc. On the other hand, the light receiving portions 251, 252, 253 and 254 are used to detect a tracking error signal of the BD 60; the light receiving portions 253, 254, 255 and 256 are used to detect a tracking error signal of the DVD 70; and the light receiving portions 283, 285 are used to detect a tracking error signal of the CD 80.

In this embodiment, the light receiving portion 284 for receiving the $0^{th}$-order diffracted light of the infrared laser beam on the return journey reflected by the CD 80 is arranged between the light receiving portion 250 for receiving the $0^{th}$-order diffracted light of the blue-violet laser beam or red laser beam reflected by the BD 60 or DVD 70 and the main region light receiving portion group 25b.

Next, functions of the holographic element 14 and the photodetector 22 are described in detailed with reference to FIG. 15 in the case of recording or reproducing on or from the BD 60.

Figure 15:
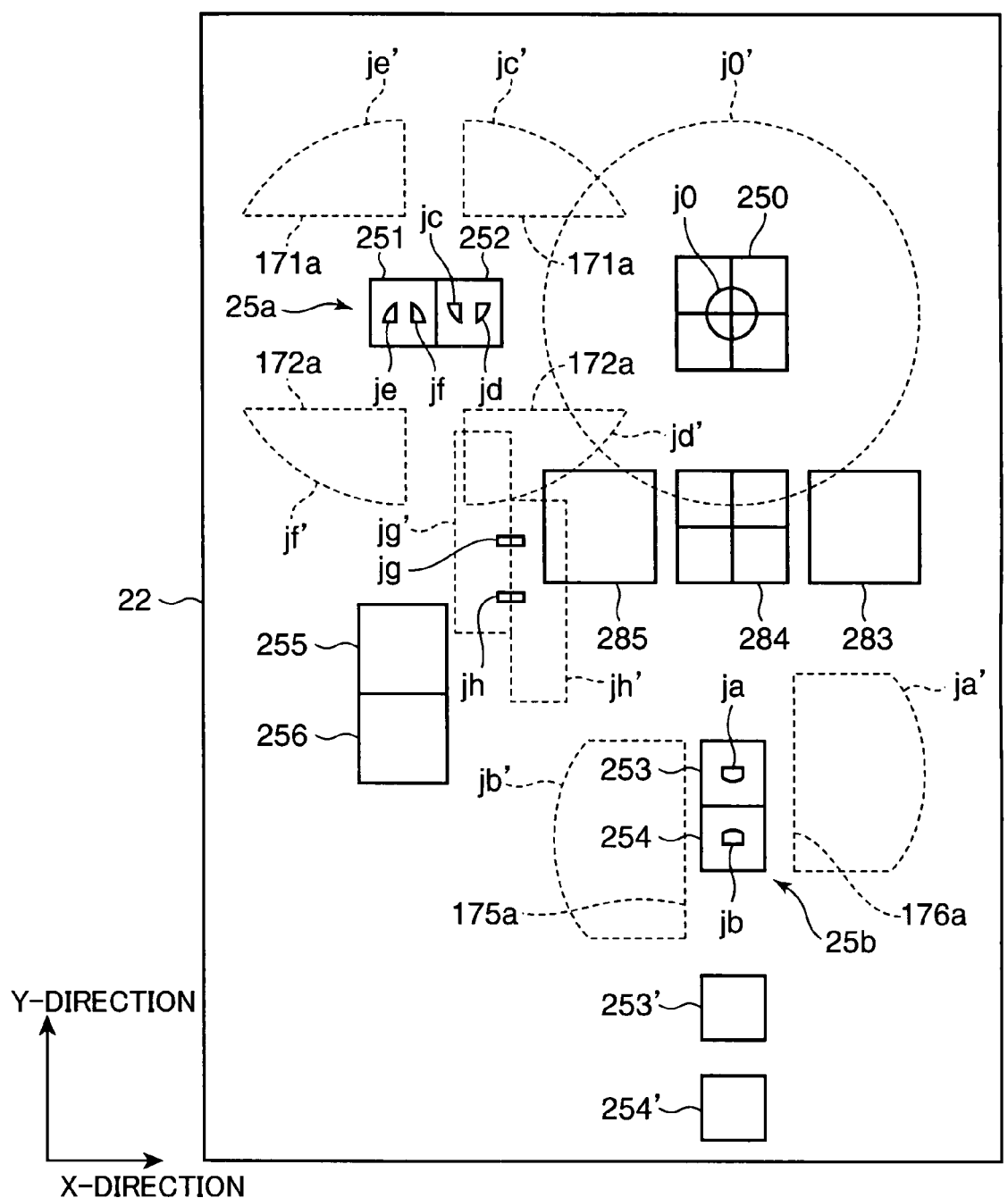
FIG. 15 is a diagram schematically showing a state of a light beam reaching the photodetector after being reflected by a BD.

FIG. 15 is a diagram schematically showing a state of a laser beam reaching the photodetector 22 after being reflected by the BD 60. The $0^{th}$-order diffracted light j0 is received by the four-divided light receiving portion 250; the $+1^{st}$-order diffracted light ja by the light receiving portion 253; the $+1^{st}$-order diffracted light jb by the light receiving portion 254; the $+1^{st}$-order diffracted lights jc, jd by the light receiving portion 252; and the $+1^{st}$-order diffracted lights je, jf by the light receiving portion 251. It should be noted that the $+1^{st}$-order diffracted lights jg, jh are received by none of the light receiving portions.

The $0^{th}$-order diffracted light j0 and the $+1^{st}$-order diffracted lights ja to jh are produced when the blue-violet laser beam reflected by the information recording surface of the BD 60 is incident on the holographic element 14. Since the BD 60 has two information recording surfaces 60a, 60b (not shown), the beam reflected by the information recording surface 60b different from the information recording surface 60a on or from which information is actually recorded or reproduced is also incident on the holographic element 14 to produce diffracted lights.

A $0^{th}$-order diffracted light j0' and $+1^{st}$-order diffracted lights ja' to jh' are diffracted lights (other-layer stray lights) produced when the blue-violet laser beam reflected by the information recording surface 60b adjacent to the one where the laser beam is focused is incident on the holographic element 14. The $0^{th}$-order diffracted light j0' is produced from all the regions of the holographic element 14; the $+1^{st}$-order diffracted light ja' from the region 184; the $+1^{st}$-order diffracted light jb' from the region 182; the $+1^{st}$-order diffracted light jc' from the region 181; the $+1^{st}$-order diffracted light jd' from the region 186; the $+1^{st}$-order diffracted light je' from the region 180; the $+1^{st}$-order diffracted light jf' from the region 185; the $+1^{st}$-order diffracted light jg' from the region 183b; and the $+1^{st}$-order diffracted light jh' from the region 183a.

The blue-violet laser beam focused by the objective lens 17 is largely defocused on the information recording surface 60b when being focused on the information recording surface 60a. Thus, the $0^{th}$-order diffracted light j0' and the $+1^{st}$-order diffracted lights ja' to jh' are also largely defocused on the photodetector 22. Here, it is designed to prevent the incidence of any of the $0^{th}$-order diffracted light j0' and the $+1^{st}$-order diffracted lights ja' to jh' on the light receiving portions 251, 252, 253, 254. This is because a tracking error signal varies according to the degree of incidence and, as a result, a stable tracking control cannot be executed if the $0^{th}$-order diffracted light j0' and the $+1^{st}$-order diffracted lights ja' to jh' are incident on the light receiving portions 251, 252, 253 and 254.

The respective light receiving portions 253, 254 of the main region light receiving portion group 25b are arranged between a projection line 175a of the third dividing line 175 on the photodetector 22 and a projection line 176a of the fourth dividing line 176 on the photodetector 22 by stray lights from an information layer adjacent to the one information layer, on which the light beam is focused, out of a plurality of information layers. Further, the light receiving portions 253, 254 of the subregion light receiving portion group 25a are arranged between a projection line 171a of the first dividing line 171 on the photodetector 22 and a projection line 172a of the second dividing line 172 on the photodetector 22 by stray lights from the information layer adjacent to the one information layer, on which the light beam is focused, out of the plurality of information layers.

Figure 16:
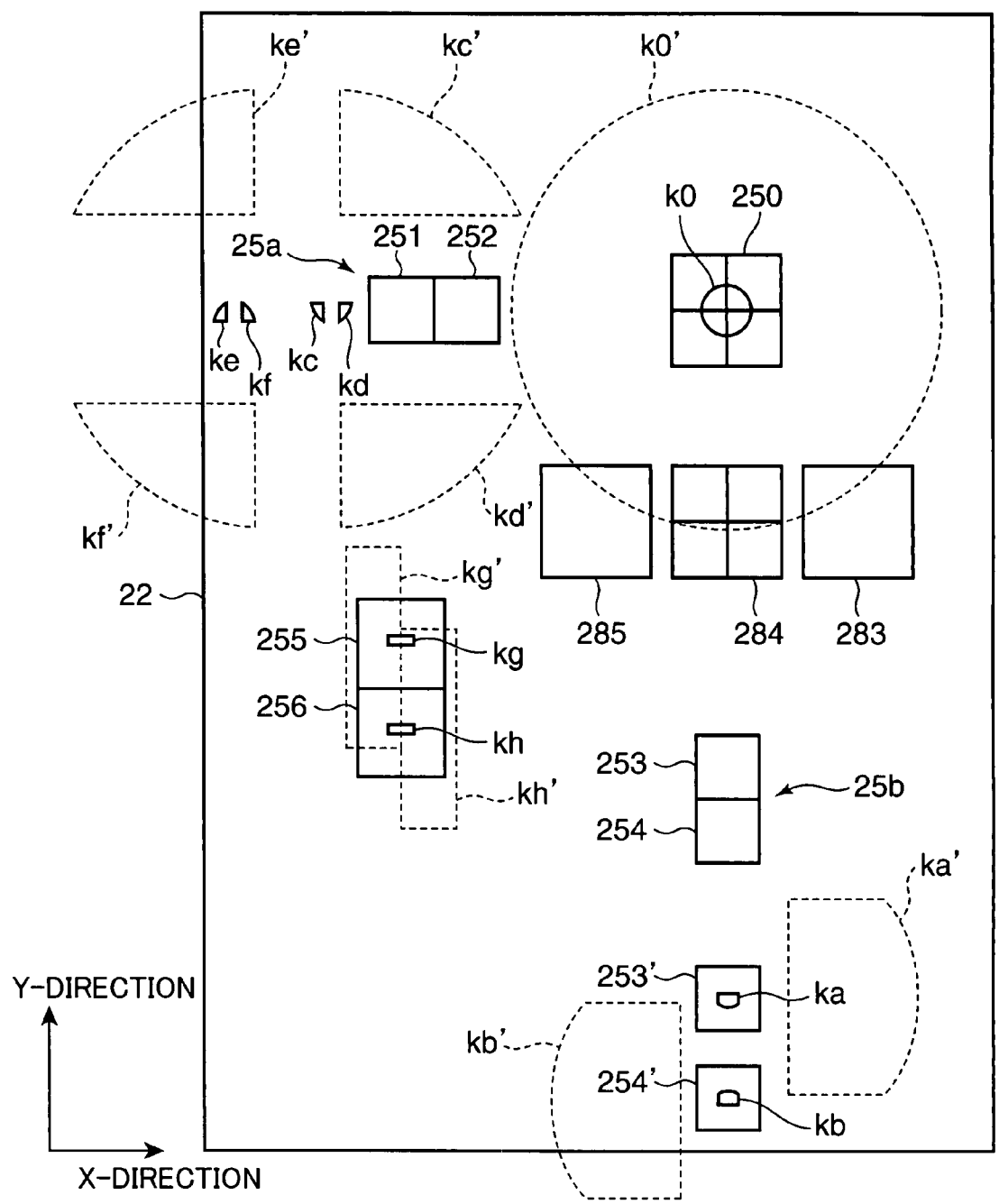
FIG. 16 is a diagram schematically showing a state of a light beam reaching the photodetector after being reflected by a DVD.

Next, functions of the holographic element 14 and the photodetector 22 in the case of recording or reproducing on or from the DVD 70 are described in detail with reference to FIG. 16. FIG. 16 is a diagram schematically showing a state of the laser beam reaching the photodetector 22 after being reflected by the DVD 70.

The holographic element 14 splits a red laser beam as a specified linearly polarized light (red laser beam on the return journey reflected by the DVD 70 in this embodiment) into a $0^{th}$-order diffracted light and $\pm 1^{st}$-order diffracted lights. The $0^{th}$-order diffracted light k0 is produced from all the regions of the holographic element 14. The $+1^{st}$-order diffracted light ka is produced from the region 184 of the holographic element 14. The $+1^{st}$-order diffracted light kb is produced from the region 182 of the holographic element 14. The $+1^{st}$-order diffracted light kc is produced from the region 181 of the holographic element 14. The $+1^{st}$-order diffracted light kd is produced from the region 186 of the holographic element 14. The $+1^{st}$-order diffracted light ke is produced from the region 180 of the holographic element 14. The $+1^{st}$-order diffracted light kf is produced from the region 185 of the holographic element 14. The $+1^{st}$-order diffracted light kg is produced from the region 183b of the holographic element 14. The $+1^{st}$-order diffracted light kh is produced from the region 183a of the holographic element 14.

The $0^{th}$-order diffracted light k0 is received by the four-divided light receiving portion 250; the $+1^{st}$-order diffracted light ka by a light receiving portion 253'; the $+1^{st}$-order diffracted light kb by a light receiving portion 254'; the $+1^{st}$-order diffracted light kg by a light receiving portion 255; and the $+1^{st}$-order diffracted light kh by a light receiving portion 256. It should be noted that the $+1^{st}$-order diffracted lights kc, kd, ke and kf are received by none of the light receiving portions. This is because the $+1^{st}$-order diffracted lights kc, kd, ke and kf are diffracted lights produced from the regions hardly subject to modulation by the information track groove of the DVD 70 and are substantially unnecessary for a tracking error signal by a so-called push-pull method.

The $0^{th}$-order diffracted light k0 and $+1^{st}$-order diffracted lights ka to kh are produced when the red light beam reflected by the information recording surface of the DVD 70 is incident on the holographic element 14. Since the DVD 70 has two information recording surfaces 70a, 70b (not shown), the beam reflected by the information recording surface 70b different from the information recording surface 70a on or from which information is actually recorded or reproduced is also incident on the holographic element 14 to produce diffracted lights.

A $0^{th}$-order diffracted light k0' and $+1^{st}$-order diffracted lights ka' to kh' are diffracted lights (other-layer stray lights) produced when the red light beam reflected by the information recording surface 70b is incident on the holographic element 14. The $0^{th}$-order diffracted light k0' is produced from all the regions of the holographic element 14; the $+1^{st}$-order diffracted light ka' from the region 184; the $+1^{st}$-order diffracted light kb' from the region 182; the $+1^{st}$-order diffracted light kc' from the region 181; the $+1^{st}$-order diffracted light kd' from the region 186; the $+1^{st}$-order diffracted light ke' from the region 180; the $+1^{st}$-order diffracted light kf' from the region 185; the $+1^{st}$-order diffracted light kg' from the region 183b; and the $+1^{st}$-order diffracted light kh' from the region 183a.

The red light beam focused by the objective lens 17 is largely defocused on the information recording surface 70b when being focused on the information recording surface 70a. Thus, the $0^{th}$-order diffracted light k0' and the +$1^{st}$-order diffracted lights ka' to kh' are also largely defocused on the photodetector 22.

Here, it is designed to prevent the incidence of the $0^{th}$-order diffracted light k0' on the light receiving portions 251 to 256. This is because a tracking error signal varies according to the degree of incidence and, as a result, a stable tracking control cannot be executed if the $0^{th}$-order diffracted light k0' is incident on the light receiving portions 251 to 256.

As compared to the BD 60 in which the spacing between two information recording surfaces is about 20 μm, the spacing between two information recording surfaces of the DVD 70 is 40 μm or larger. Thus, defocus amounts of the +$1^{st}$-order diffracted lights ka' to kh' are very large. Accordingly, even upon the incidence on the light receiving portions 253, 254, 255 and 256, there is substantially no problem since the influence on the tracking error signal is very minor.

Next, functions of the holographic element 14 and the photodetector 22 in the case of recording or reproducing on or from the CD 80 are described in detail with reference to FIG. 17.

The infrared laser beam incident on the diffraction grating 18 in FIG. 12 is split into a $0^{th}$-order diffracted light m0, a +$1^{st}$-order diffracted light m1 and a −$1^{st}$-order diffracted light m2. However, the $0^{th}$-order diffracted light m0, the +$1^{st}$-order diffracted lights m1 and the −$1^{st}$-order diffracted lights m2 are not diffracted by the holographic element 14.

Figure 17:
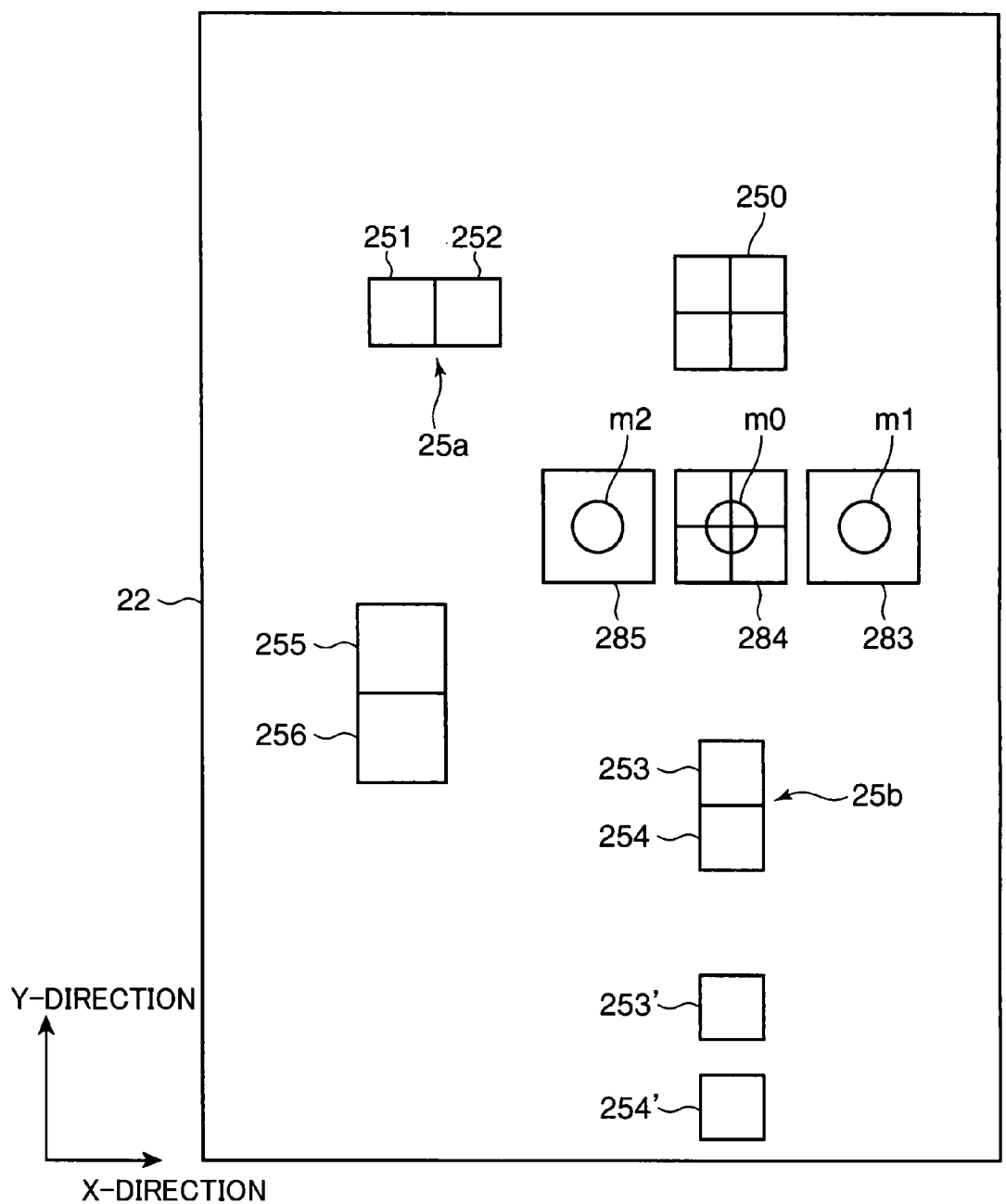
FIG. 17 is a diagram schematically showing a state of a light beam reaching the photodetector after being reflected by a CD.

FIG. 17 is a diagram schematically showing a state of a laser beam reaching the photodetector 22 after being reflected by the CD 80. The $0^{th}$-order diffracted light m0 is received by the four-divided light receiving portion 284, the +$1^{st}$-order diffracted light m1 by the light receiving portion 283, and the −$1^{st}$-order diffracted light m2 by the light receiving portion 285, whereby a tracking error signal by a three-beam method is obtained.

In this way, the blue-violet laser beam is emitted from the first light source 11 and the red and infrared laser beams are emitted from the second light source 21. The blue-violet laser beam and the red laser beam having passed through the diffraction optical system without being diffracted are received by the four-divided light receiving portion 250 (first $0^{th}$-order light receiving portion group) and the infrared laser beam having passed through the diffraction optical system without being diffracted is received by the four-divided light receiving portion 284 (second $0^{th}$-order light receiving portion group). Further, the blue-violet laser beam diffracted by the first and second main regions 182, 184 are received by the main region light receiving portion group 25b, and the blue-violet laser beam diffracted by the first subregion 180, 185 and the second subregion 181, 186 is received by the subregion light receiving portion group 25a. The four-divided light receiving portion 284 is arranged between the four-divided light receiving portion 250 and the main region light receiving portion group 25b.

Accordingly, even in the case of recording or reproducing on or from three types of optical discs such as CDs, DVDs and BDs, an offset-free tracking signal can be generated and a stable tracking control can be realized while compatibility with the respective optical discs is ensured.

By arranging the four-divided light receiving portion 284 (second $0^{th}$-order light receiving portion group) between the four-divided light receiving portion group 250 (first $0^{th}$-order light receiving portion group) and the main region light receiving portion group 25b as shown in this embodiment, the photodetector coping with three wavelengths can be realized without increasing an area where the light receiving portions are arranged, whereby the photodetector can have a compact construction.

Next, a modification of the third embodiment is described. Although the four-divided light receiving portion 284 is arranged between the four-divided light receiving portion group 250 and the main region light receiving portion group 25b in the third embodiment, it is arranged between the four-divided light receiving portion 250 and the subregion light receiving portion group 25a in this modification of the third embodiment.

Figure 18:
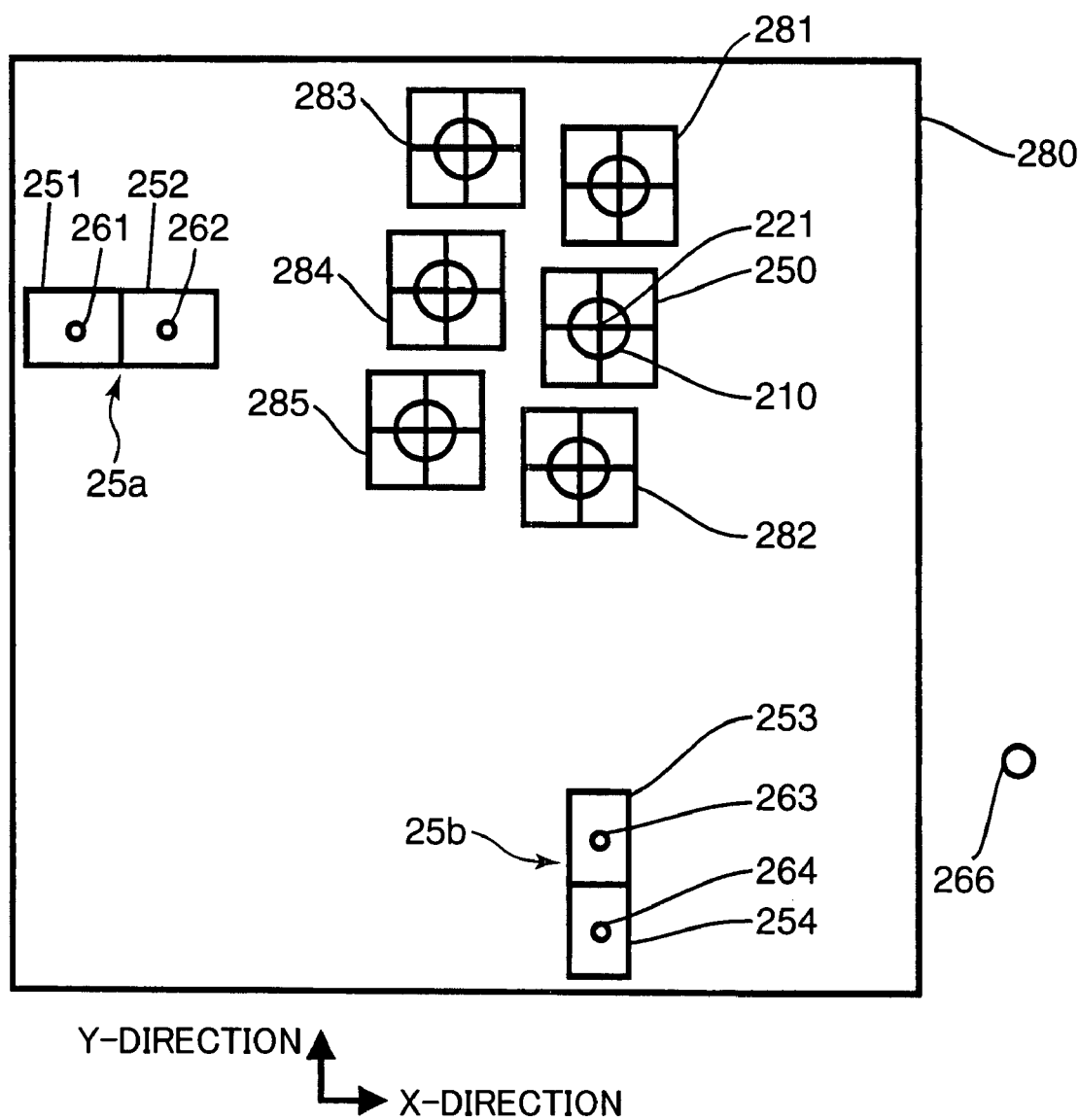
FIG. 18 is a diagram showing an example of a photodetector corresponding to three light sources.

FIG. 18 is a diagram showing an example of a photodetector according to the modification of the third embodiment. A photodetector 280 shown in FIG. 18 is used in an optical head device 30 coping with three light sources shown in FIG. 12. In this case, a division pattern of a holographic element is the same as the one shown in FIG. 2A.

Light receiving portions 251, 252, 253 and 254 for high-density optical discs are arranged similar to those of the photodetector 220 shown in FIG. 3. A light receiving portion 250 is commonly used to receive a main beam for BDs and a main beam for DVDs. Further, light receiving portions 281, 282 receive sub-beams used in a three-beam method or a differential push-pull method. A main beam for CDs not received by the light receiving portion 250 is received by the light receiving portion 284, and sub-beams are received by light receiving portions 283, 285.

The respective light receiving portions 250, 281, 282, 283, 284 and 285 are arranged as shown in FIG. 18 since they give astigmatism to light beams. Specifically, the light receiving portion 284 for receiving a $0^{th}$-order diffracted light of an infrared laser beam on a return journey reflected by the CD 80 is arranged between the light receiving portion 250 for receiving a $0^{th}$-order diffracted light of a blue-violet or red laser beam reflected by the BD 60 or DVD 70 and the subregion light receiving portion group 25a.

Here, although the respective light receiving portions are divided into four, the present invention is not limited to this. The number of sections into which each light receiving portion is divided may differ according a tracking method or a focus method necessary for the information reproduction from the respective discs and may be two, five or more.

In this way, a blue-violet laser beam is emitted from the first light source 11 and a red laser beam and an infrared laser beam are emitted from the second light source 21. The blue-violet laser beam and the red laser beam having passed through the diffraction optical system without being diffracted are received by the four-divided light receiving portion 250 (first $0^{th}$-order light receiving portion group) and the infrared laser beam having passed through the diffraction optical system without being diffracted is received by the four-divided light receiving portion 284 (second $0^{th}$-order light receiving portion group). Further, the blue-violet laser beam diffracted by the first and second main regions 242, 244 are received by the main region light receiving portion group 25b, and the blue-violet laser beam diffracted by the first subregion 240, 245 and the second subregion 241, 246 is received by the subregion light receiving portion group 25a. The four-divided light receiving portion 284 is arranged between the four-divided light receiving portion 250 and the subregion light receiving portion group 25a.

By using such a photodetector 280, light detection from high-density optical discs having three or more layers as well as light detection from CDs, DVDs and the like can be coped with out increasing the number of parts of the photodetector.

As shown in this modification, by arranging the four-divided light receiving portion 284 (second $0^{th}$-order light receiving portion group) between the four-divided light receiving portion group 250 (first $0^{th}$-order light receiving portion group) and the subregion light receiving portion group 25a, the photodetector coping with three wavelengths can be realized without increasing an area where the light receiving portions are arranged, whereby the photodetector can have a compact construction.

Although the light receiving portions 281, 282, 283 and 285 for receiving sub-beams are provided assuming DVDs, CDs and the three-beam method or differential push-pull method, the present invention is not limited thereto and a one-beam method such as a phase difference tracking method may be used. In this case, the light receiving portions for sub-beams are not necessary.

Although the example including one objective lens is shown in this embodiment, the present invention is not limited thereto and similar effects can be obtained with an optical system including both an objective lens exclusively for BDs and an objective lens for DVDs/CDs.

Although the four-divided light receiving portion 250 receives main beams from BDs and those from DVDs and the four-divided light receiving portion 284 receives main beams from CDs here, the four-divided light receiving portion 250 may receive main beams from BDs and those from CDs and the four-divided light receiving portion 284 may receive main beams from DVDs. In this case, a beam diameter on the objective lens for DVDs can be made larger since the spot sizes on the light receiving portion for BDs and CDs can be approximated each other and the spot size on the light receiving portion for DVDs can be made larger. Thus, it is possible both to miniaturize the optical system by the shortening of the focal length of the objective lens for BDs and to ensure stable lens shifts by ensuring a sufficient lens diameter of the objective lens for DVDs.

Fourth Embodiment

An example in which diffraction directions of light passing first and second subregions are changed is described in the fourth embodiment. In the fourth embodiment, a holographic element and light receiving portions different from those of the first embodiment are used, but other optical elements have the same constructions as in the first embodiment.

Figure 19A:
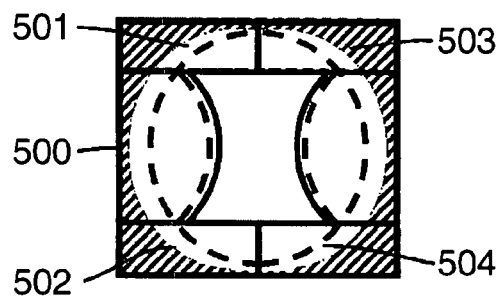
FIG. 19A is a diagram showing a holographic element according to a fourth embodiment.

FIG. 19A is a diagram showing a holographic element 500 according to the fourth embodiment. The shapes of divided regions of the holographic element 500 shown in FIG. 19A are the same as in the first embodiment, but diffraction directions differ.

Figure 19B:
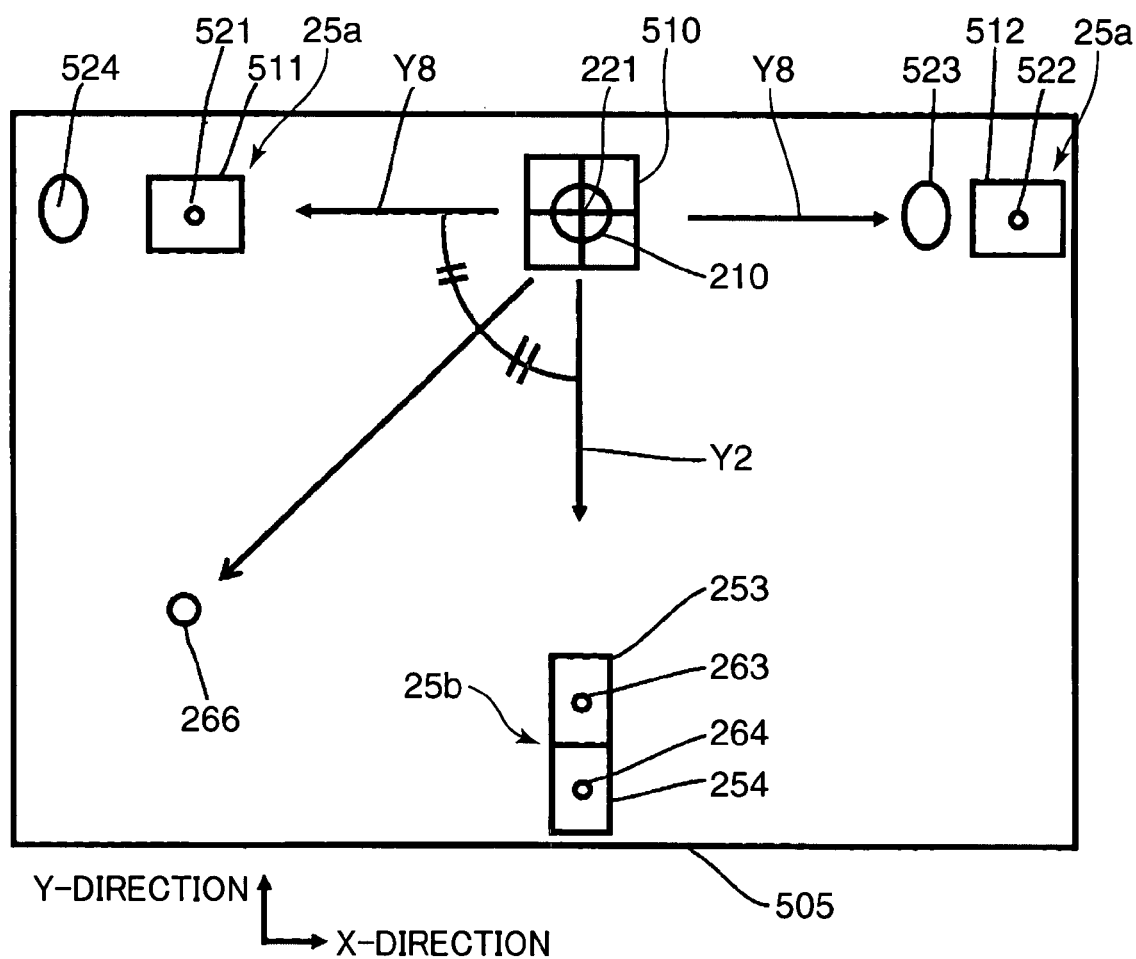
FIG. 19B is an arrangement diagram of light receiving portions of a photodetector in the fourth embodiment.

FIG. 19B is an arrangement diagram of light receiving portions of a photodetector 505 in the fourth embodiment. A main region light receiving portion group 25b is arranged while being spaced apart in a direction (direction shown by an arrow Y2) of extensions of third and fourth dividing lines from an optical axis 221. The main region light receiving portion group 25b includes light receiving portions 253, 254. The arrangement of these light receiving portions 253, 254 is not described since being the same as in the first embodiment.

On the other hand, a subregion light receiving portion group 25a of the photodetector 505 includes light receiving portions 511, 512. The light receiving portions 511, 512 are arranged at positions spaced in opposite directions (directions shown by arrows Y8) of extensions of horizontal dividing lines (first and second dividing lines) from the optical axis 221 of a four-divided light receiving portion ($0^{th}$-order light receiving portion group) 510 for receiving a $0^{th}$-order light 210. A distance from the optical axis 221 to the light receiving portion 511 and a distance from the optical axis 221 to the light receiving portion 512 are not equal.

Although it is designed to cause a light beam 521 diffracted by regions 501, 502 as a first subregion to be incident on the center of the light receiving portion 511, its conjugate diffracted light is incident on the photodetector 505 as a light beam 523. The light receiving portion 512 is arranged at such a position that this light beam 523 is not incident thereon. Further, although it is designed to cause a light beam 522 diffracted by regions 503 and 504 as a second subregion to be incident on the center of the light receiving portion 512, its conjugate diffracted light is incident on the photodetector 505 as a light beam 524. The light receiving portion 511 is arranged at such a position that this light beam 524 is not incident thereon.

Figure 20:
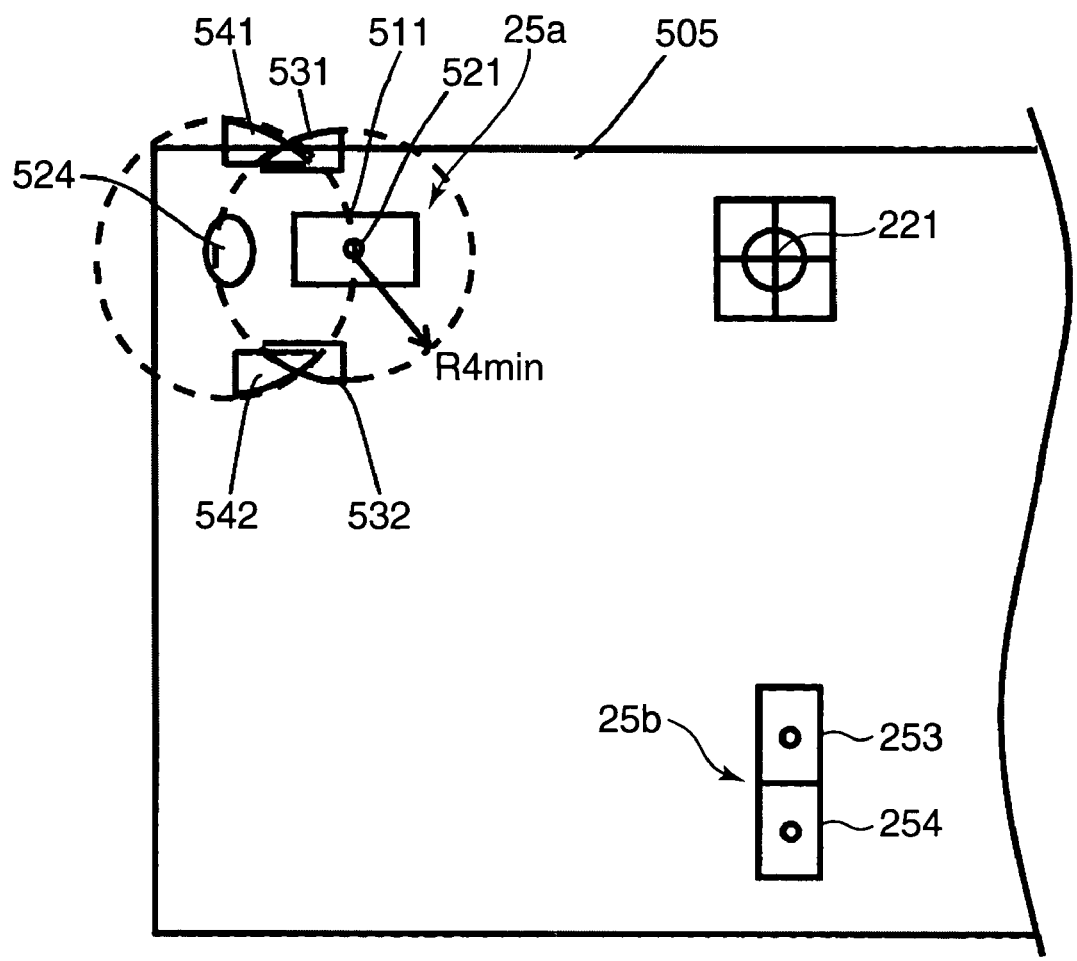
FIG. 20 is a diagram showing a relationship between the photodetector of the fourth embodiment and stray lights from layers having a minimum interlayer spacing in a four-layer optical disc.

FIG. 20 is a diagram showing a relationship between the photodetector of the fourth embodiment and stray lights produced from layers having a minimum layer spacing in a four-layer optical disc. FIG. 20 shows a relationship of the light receiving portion 511 of the photodetector 505, the light beam 521 diffracted by the regions 501 and 502 and other-layer stray lights 531, 532 of the light beam 521, and a relationship between a conjugate light beam 524 diffracted in the regions 503 and 504 and other-layer stray lights 541, 542 of the conjugate light beam 524.

Other-layer stray lights produced from the two information layers having a minimum layer spacing are those having a radius R4min proportional to a minimum layer spacing d4min. However, since the light beam 521 is the one from the regions 501, 502, the shapes of the stray lights are similar to those of light beams passing the regions 501, 502. These are stray lights 531, 532. FIG. 20 shows stray lights from the front-side layer when a focal point is adjusted to the back-side layer out of the information layers having the minimum layer spacing. Since the stray lights from the front-side recording layer are focused behind the photodetector 505, they are located in a direction in which the holographic element 500 is mapped as it is.

On the other hand, since the light beam 524 is the one from the regions 503, 504, the shapes of the stray lights are similar to those of light beams passing the regions 503, 504. These are stray lights 541, 542. The stray lights from the back-side layer when a focal point is adjusted to the front-side layer out of the information layers having the minimum layer spacing are not shown, but they are located at point symmetrical positions with respect to the centers of the respective beams as described in the first embodiment. Therefore, the stray lights are not incident on the respective light receiving portions.

As shown in FIG. 20, the main region light receiving portion group 25b (light receiving portions 253, 254) is arranged while being spaced apart in a direction of the extension of a tangent to a track projected on the holographic element 500 as a diffraction optical system from the optical axis 221. Further, the subregion light receiving portion group 25a (light receiving portions 511, 512) are arranged while being spaced apart in a direction normal to the direction of the tangent to the track projected on the holographic element 500 from the optical axis 221.

If the holographic element 500 and the photodetector 505 of the fourth embodiment are used in this way, neither other-layer stray lights of the $0^{th}$-order light nor those of the diffracted lights are incident on the light receiving portions for receiving the diffracted lights. Therefore, an offset-free tracking signal can be detected and a stable tracking control can be realized.

Fifth Embodiment

Figure 21:
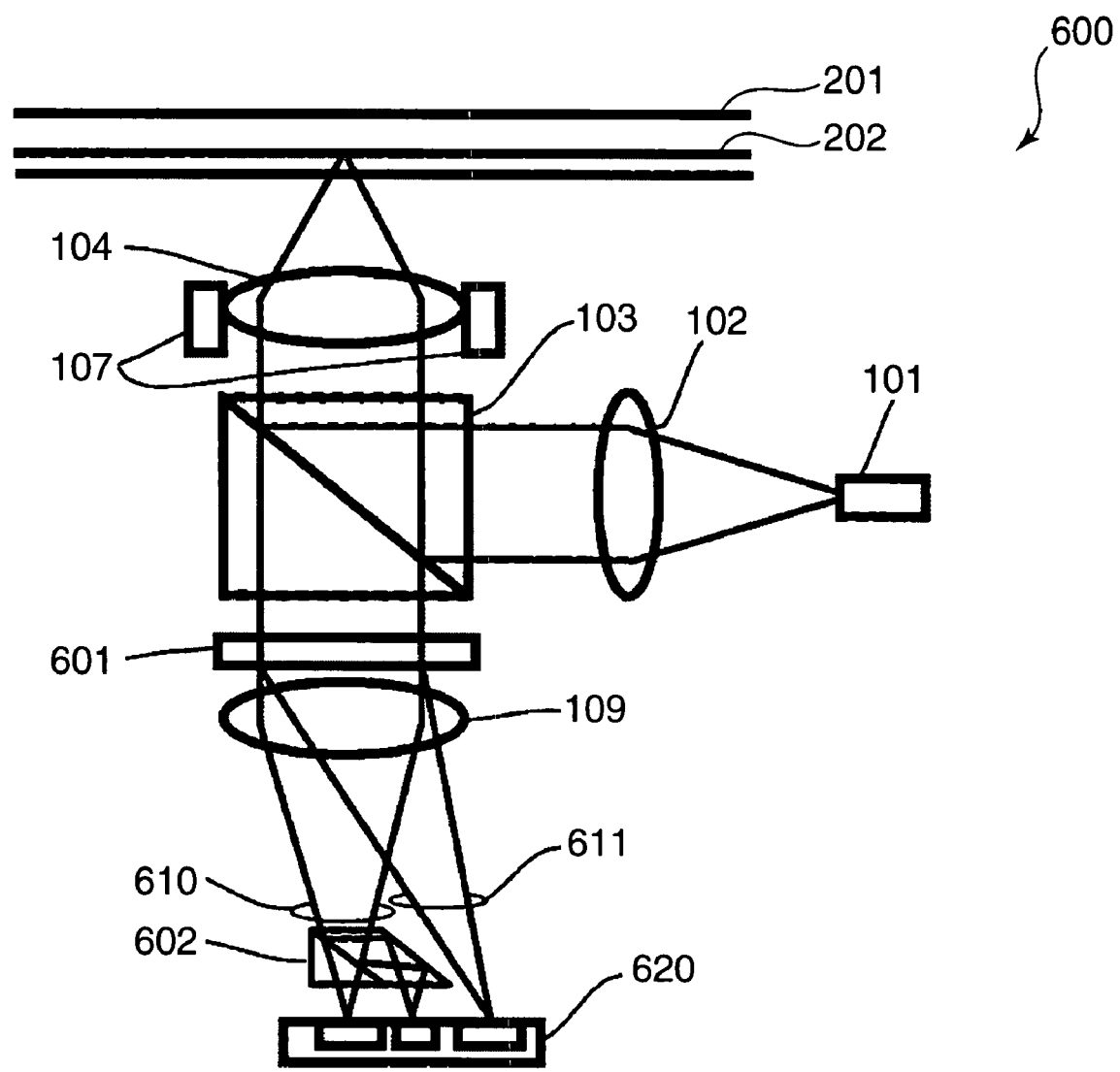
FIG. 21 is a diagram showing the construction of an optical head device according to a fifth embodiment.

An example in which a focus signal and an RF signal are detected by different light receiving portions is described in a fifth embodiment. FIG. 21 is a diagram showing the construction of an optical head device 600 according to the fifth embodiment. Elements having the same functions as in the preceding embodiments are not described by being identified by the same reference numerals. The fifth embodiment differs from the other embodiments in that a $0^{th}$-order light 610 not diffracted by a holographic element 601 is split into two light beams by a prism 602 as a branching element. A light beam 611 diffracted by the holographic element 601 does not pass through the prism 602. These light beams are received by the photodetector 620.

Figure 22:
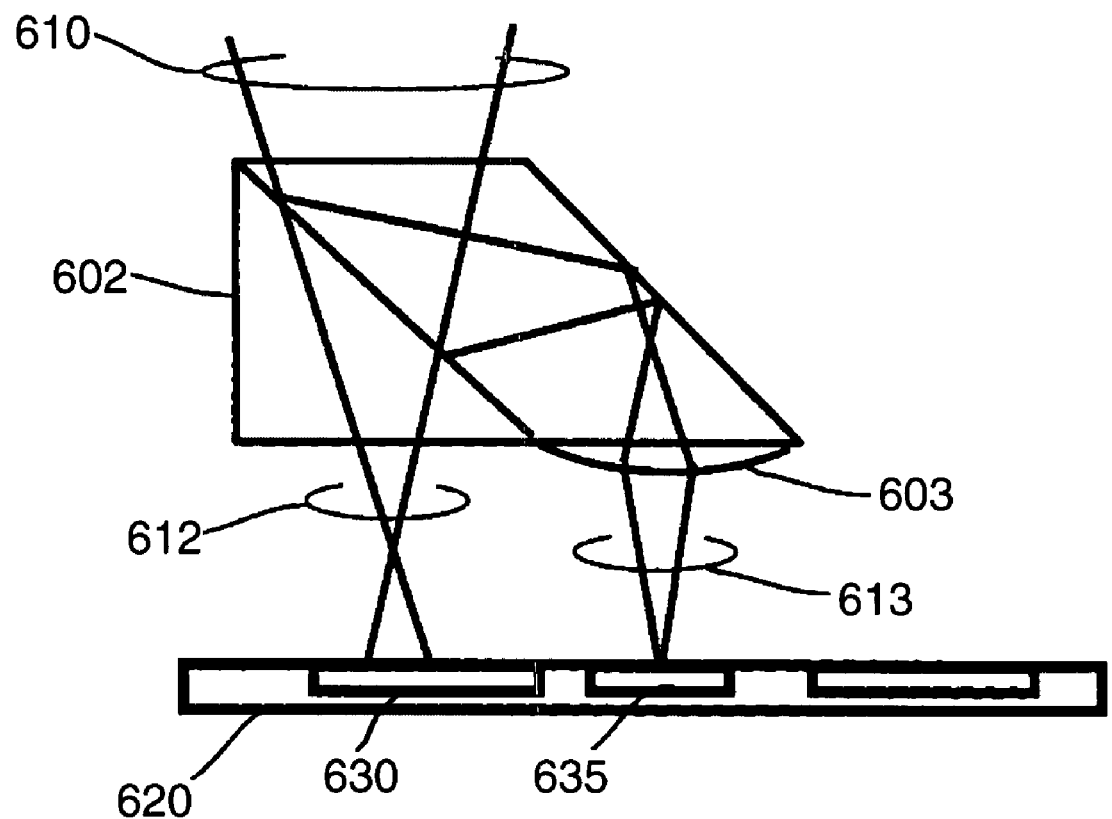
FIG. 22 is a diagram enlargedly showing a photodetector and a prism as a branching element in the fifth embodiment.

FIG. 22 is a diagram enlargedly showing a photodetector and the prism 602 as the branching element in the fifth embodiment. Astigmatism is given to the $0^{th}$-order light 610 from the holographic element 601 by a detection lens 109. This $0^{th}$-order light 610 is split into two light beams upon being incident on the prism 602. A light beam 612 passing through the prism 602 is received by a focusing light receiving portion 630 of the photodetector 620 as it is.

The light beam reflected inside the prism 602 is reflected again by an oblique surface and emerges from the prism 602. However, an optical path length of a light beam 613 reflected inside the prism 602 to the photodetector 620 is longer than that of the light beam 612 having passed through the prism 602 to the photodetector 620. Accordingly, a lens 603 is disposed at a position at the bottom of the prism 602 where the light beam reflected inside the prism 602 emerges. A focal position caused by a difference between the optical path lengths is corrected and the astigmatism is removed by this lens 603, whereby the light beam is focused on a light receiving portion 635 of the photodetector 620.

Figure 23A:
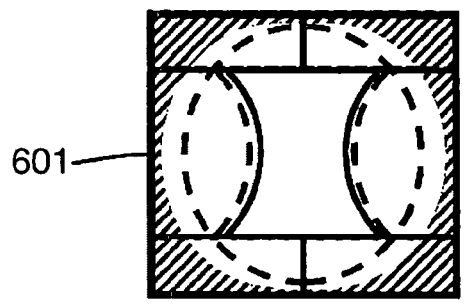
FIG. 23A is a diagram showing the region division of a holographic element in the fifth embodiment.

FIG. 23A is a diagram showing the region division of the holographic element 601 in the fifth embodiment. A division pattern of the holographic element 601 is not described since being the same as that of the holographic element of the first embodiment.

Figure 23B:
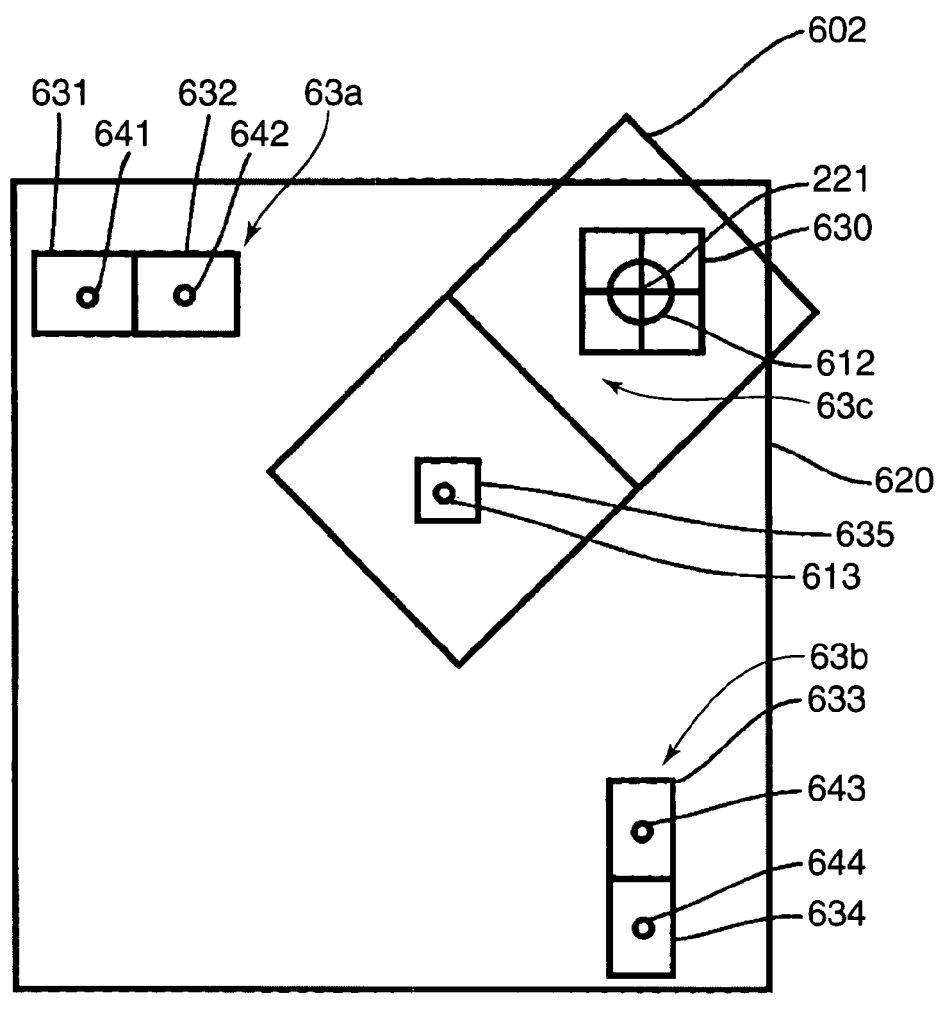
FIG. 23B is a diagram showing the arrangement of light receiving portions of the photodetector and the prism in the fifth embodiment.

FIG. 23B is a diagram showing the arrangement of the light receiving portions of the photodetector 620 and the arrangement of the prism 602 in the fifth embodiment. The prism 602 is so arranged as to reflect in a direction bisecting an angle defined between a direction of the extensions of horizontal dividing lines (first and second dividing lines) of the holographic element 601 and a direction of the extensions of tangents to vertical dividing lines (third and fourth dividing lines).

The light beam 613 reflected inside the prism 602 is received by the one light receiving portion 635 of a $0^{th}$-order light receiving portion group 63c. The light receiving portion 635 is arranged in a direction bisecting an angle defined between a direction in which light receiving portions 633, 634 as a main region light receiving portion group 63b are spaced from an optical axis 221 and a direction in which light receiving portions 631, 632 as a subregion light receiving portion group 63a are spaced from the optical axis 221.

The light passing through the prism 602 is received by one four-divided light receiving portion 630 of the $0^{th}$-order light receiving portion group 63c, and a focus signal is generated from a signal obtained from the four-divided light receiving portion 630. Further, an RF signal used for the reproduction of information is obtained from a signal obtained from the light receiving portion 635. Diffracted light beams 641 to 644 diffracted by the respective main regions and subregions of the holographic element 601 are respectively received by the light receiving portions 631 to 634.

According to the fifth embodiment, the RF signal can be detected by a 1-channel amplifier. In the construction as in the first embodiment, the RF signal is received by four light receiving portions and signals IV-converted by the respective light receiving portions are added, wherefore noise is increased. However, if the RF signal is IV-converted by the 1-channel amplifier, a noise increase can be suppressed since noises of the respective amplifiers are not added. Normally, if four independent amplifier noises are added, noise increases by 6 dB. Since the light beam is split by the prism 602 in this embodiment, an amount of the detected light decreases, but a reduction of the signal is about 2 dB if the splitting ratio of the prism 602 is 2:8 with the focus side being 2 and the RF side being 8.

Accordingly, by adopting such a construction, an S/N ratio can be improved by 4 dB. Thus, the quality of the RF signal can be improved and an error rate upon reproducing information can be reduced. Further, the cost of the prism 602 can be suppressed since the prism 602 can be made smaller if the light beam 610 is split immediately before the photodetector 620 as in the fifth embodiment.

Further, since the spacing between the light receiving portion 630 for generating the focus signal and the light receiving portion 635 for generating the RF signal can be narrowed, the photodetector 620 needs not be enlarged and, hence, can be miniaturized. Further by light-shielding the oblique surface portion of the upper surface of the prism 602, it can be made difficult for other-layer stray lights to be incident on the light receiving portion 635. Further, since the prism 602 functions as an aperture, the spread of the other-layer stray lights of the light beams 612, 613 can be suppressed.

Although the ratio of the focus signal to the RF signal is 2:8 in the fifth embodiment, the present invention is not particularly limited thereto and an effect of improving the S/N ratio can be obtained if the rate of the RF signal is larger than 50%.

Sixth Embodiment

Figure 24:
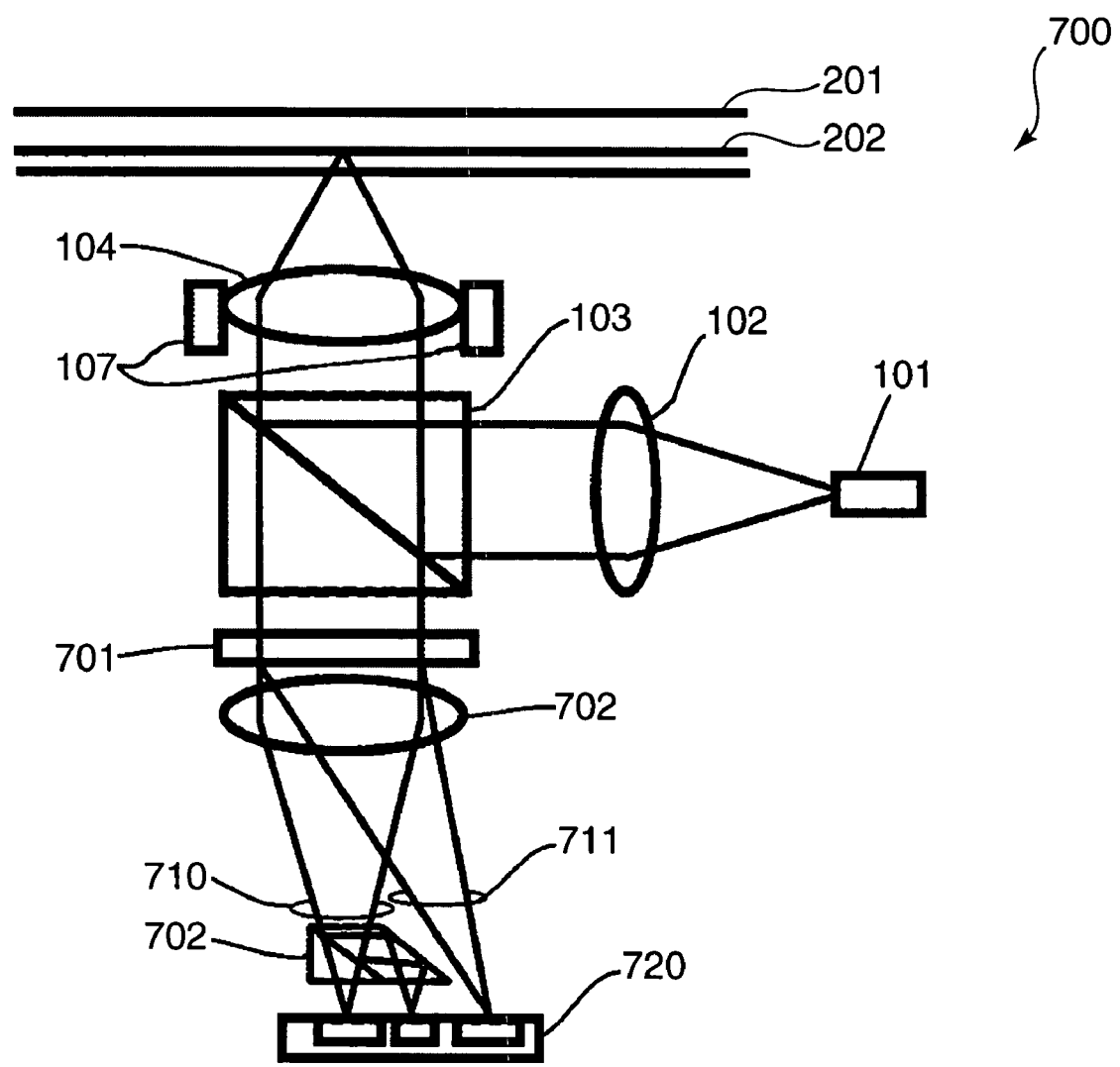
FIG. 24 is a diagram showing the construction of an optical head device according to a sixth embodiment.

An example in which the positions of a light receiving portion for focusing and a light receiving portion for a RF signal are changed is described in a sixth embodiment. FIG. 24 is a diagram showing the construction of an optical head device 700 according to the sixth embodiment. Elements having the same functions as in the preceding embodiments are not described by being identified by the same reference numerals. The sixth embodiment differs from the fifth embodiment in a holographic element 701, a detection lens 702, a prism 703 as a branching element and a photodetector 720. The detection lens 702 of the sixth embodiment has only a function of converting a collimated beam into a convergent beam without having a function of giving astigmatism.

Figure 25:
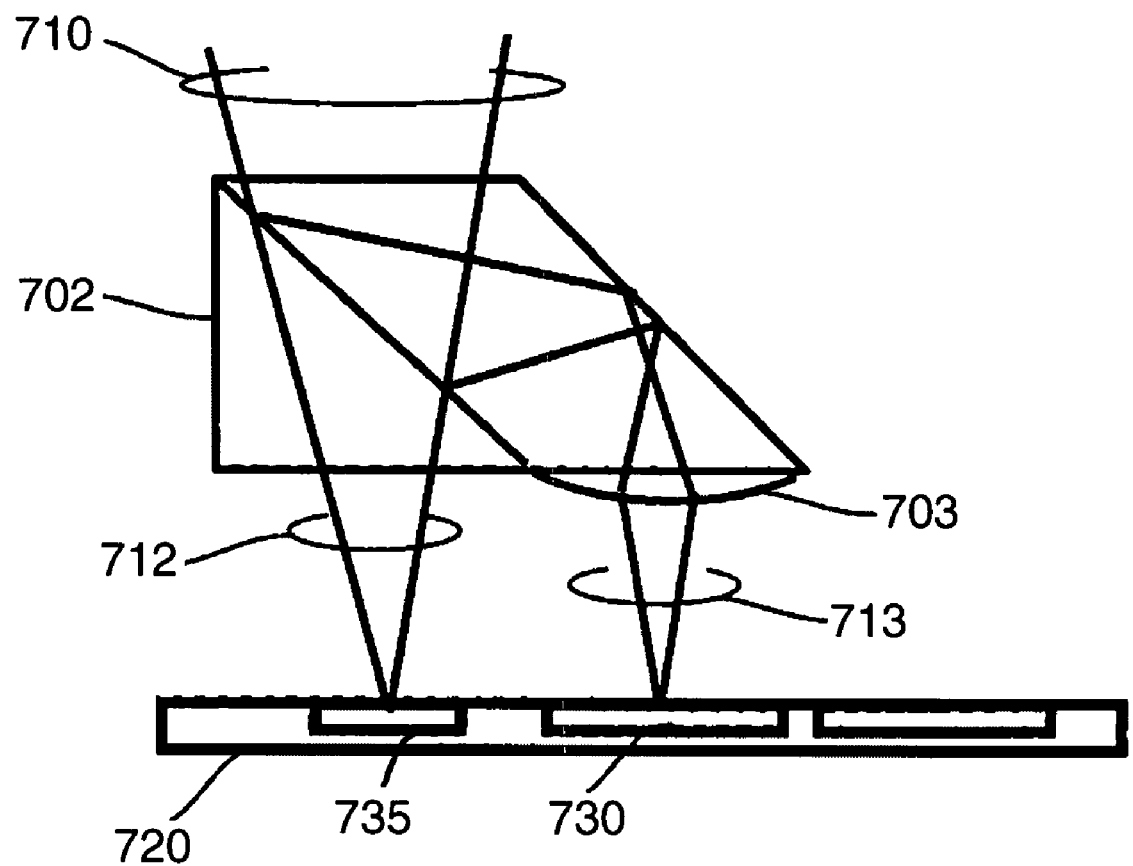
FIG. 25 is a diagram enlargedly showing a photodetector and a prism in the sixth embodiment.

FIG. 25 is a diagram enlargedly showing the photodetector 720 and the prism 702 in the sixth embodiment. A $0^{th}$-order light 710 from the holographic element 701 is split into two light beams upon being incident on the prism 702. A light beam 712 passing through the prism 702 is received by a light receiving portion 735 for an RF signal of the photodetector 720 as it is.

On the other hand, the light beam reflected inside the prism 702 is reflected again by an oblique surface and emerges from the prism 702. However, an optical path length of a light beam 713 reflected inside the prism 702 to the photodetector 720 is longer than that of the light beam 712 having passed through the prism 702 to the photodetector 720. Accordingly, a lens 703 is disposed at a position at the bottom of the prism 702 where the light beam reflected inside the prism 702 emerges. A focal position caused by a difference between the optical path lengths is corrected and the astigmatism is removed by this lens 703, whereby the light beam 713 having the astigmatism is received by a light receiving portion 730 for a focus signal of the photodetector 720 to generate a focus signal.

Figure 26A:
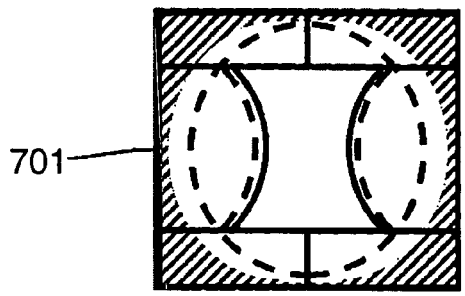
FIG. 26A is a diagram showing the region division of a holographic element in the sixth embodiment.

FIG. 26A is a diagram showing the region division of the holographic element 701 in the sixth embodiment. The division pattern of the holographic element 701 is not described since being the same as that of the holographic element of the first embodiment.

Figure 26B:
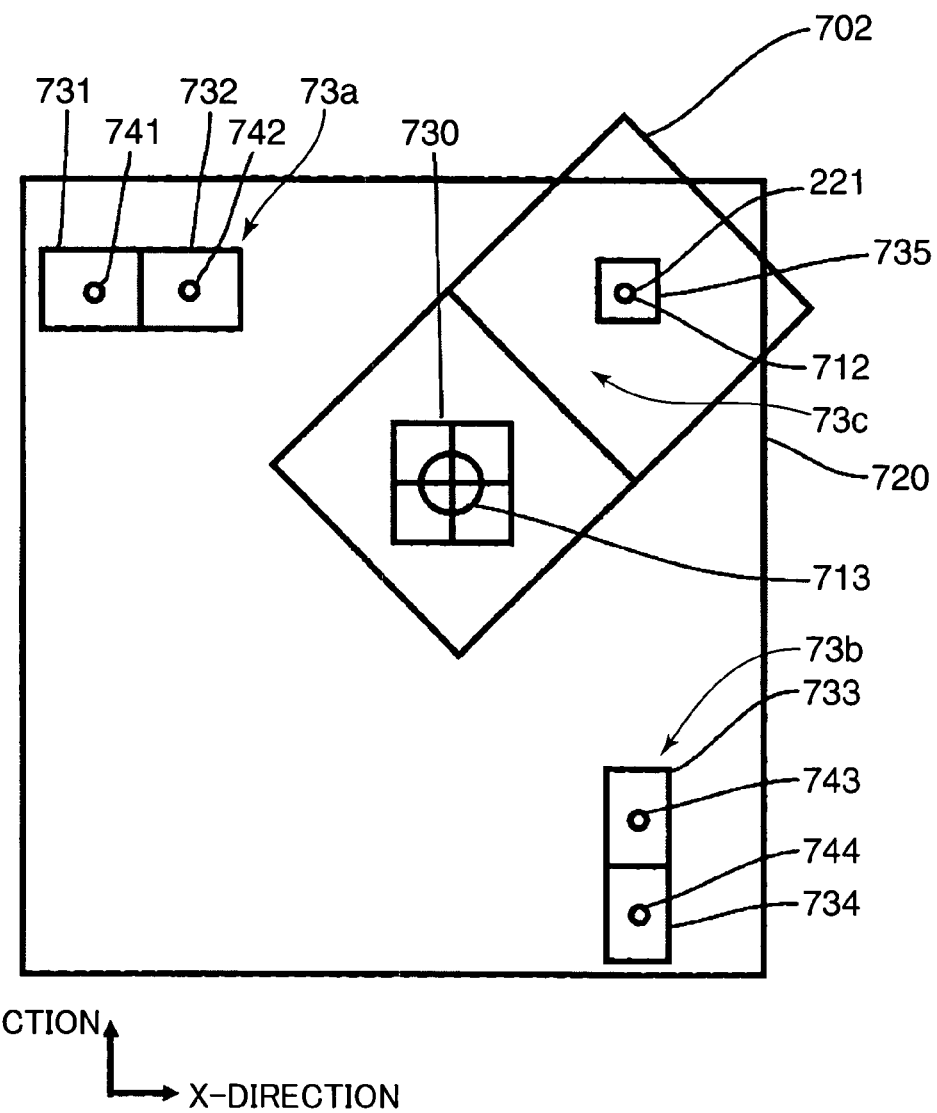
FIG. 26B is a diagram showing the arrangement of light receiving portions of the photodetector and the prism in the sixth embodiment.

FIG. 26B is a diagram showing the arrangement of the light receiving portions of the photodetector 720 and the arrangement of the prism 702 in the sixth embodiment. The prism 702 is so arranged as to reflect in a direction bisecting an angle defined between a direction of the extensions of horizontal dividing lines (first and second dividing lines) of the holographic element 701 and a direction of the extensions of tangents to vertical dividing lines (third and fourth dividing lines).

The light beam 713 reflected inside the prism 702 is received by the four-divided light receiving portion 730 for focus signal detection, and a focus signal is generated from a signal obtained from this four-divided light receiving portion 730. The four-divided light receiving portion 730 is arranged in a direction bisecting an angle defined between a direction in which light receiving portions 733, 734 as a main region light receiving portion group 73b are spaced from an optical axis 221 and a direction in which light receiving portions 731, 732 as a subregion light receiving portion group 73a are spaced from the optical axis 221.

The light passing through the prism 702 is received by the four-divided light receiving portion 735 for the RF signal. The RF signal used for the reproduction of information is obtained from a signal obtained from the light receiving portion 735. Diffracted light beams 741 to 744 diffracted by the respective main regions and subregions of the holographic element 701 are respectively received by the light receiving portions 731 to 734. It should be noted that a $0^{th}$-order light receiving portion group 73c includes the four-divided light receiving portion 730 and the light receiving portion 735.

According to the sixth embodiment, the RF signal can be detected by a 1-channel amplifier as in the fifth embodiment. If four independent amplifier noises are added, noise increases by 6 dB. Since the light beam is split by the prism 702 in the sixth embodiment, an amount of the detected light decreases, but a reduction of the signal is about 2 dB if the splitting ratio of the prism 702 is 2:8 with the focus side being 2 and the RF side being 8. Accordingly, by adopting such a construction, an S/N ratio can be improved by 4 dB. Thus, the quality of the RF signal can be improved and an error rate upon reproducing information can be reduced.

Further, the cost of the prism 702 can be suppressed since the prism 702 can be made smaller if the light beam 710 is split immediately before the photodetector 720 as in the sixth embodiment. Furthermore, since the spacing between the light receiving portion 730 for generating the focus signal and the light receiving portion 735 for generating the RF signal can be narrowed, the photodetector 720 needs not be enlarged and, hence, can be miniaturized. Further by light-shielding the oblique surface portion of the upper surface of the prism 702, it can be made difficult for other-layer stray lights to be incident on the light receiving portion 735. Further, since the prism 702 functions as an aperture, the spread of the other-layer stray lights of the light beams 712, 713 can be suppressed.

Although the lenses 603, 703 are shown as examples of elements attached to the bottoms of the prisms 602, 702 in the fifth and sixth embodiments, the present invention is not limited thereto and holographic elements (particularly blazed holographic elements), Fresnel lenses or the like may be provided in place of the lenses 603, 703 and the reflecting surfaces of the prisms 602, 702 may be concave or convex surfaces. In any of these cases, effects similar to those of the fifth and sixth embodiments can be obtained.

Although the prisms 602, 702 are used as the branching element in the fifth and sixth embodiments, the present invention is not limited thereto and the light beams 610, 710 may be split using holograms, diffraction gratings or the like.

Seventh Embodiment

Figure 27:
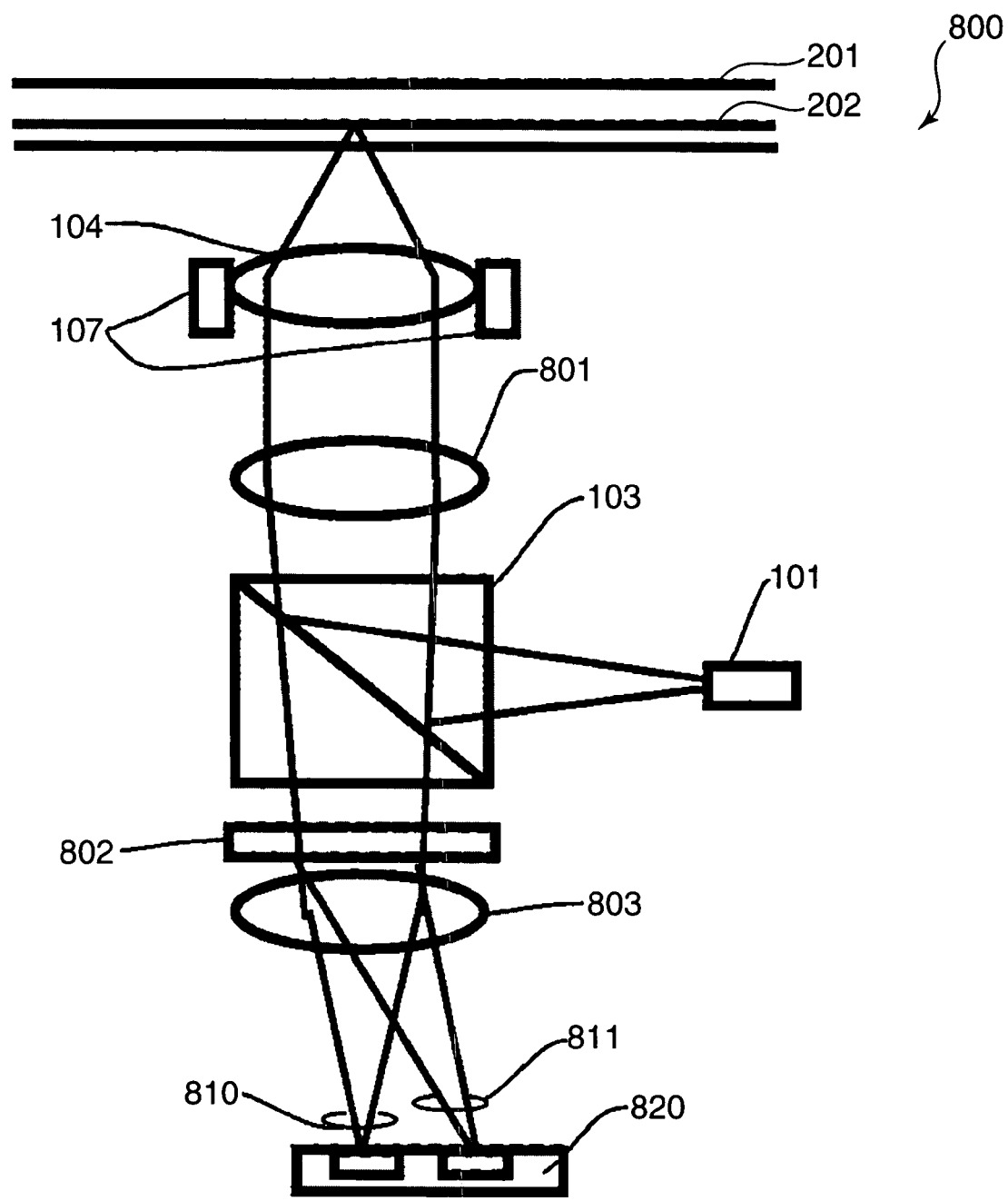
FIG. 27 is a diagram showing the construction of an optical head device according to a seventh embodiment.

Next, an optical head device according to a seventh embodiment is described. FIG. 27 is a diagram showing the construction of an optical head device 800 according to the seventh embodiment. Component elements having the same functions are not described by being identified by the same reference numerals.

In FIG. 27, the optical head device 800 includes a semiconductor laser 101, a beam splitter 103, an objective lens 104, an actuator 107, a collimator lens 801, a holographic element 802, a detection lens 803 and a photodetector 820.

A light beam emitted from the semiconductor laser 101 as a light source is reflected by the beam splitter 103, converted into a collimated beam by the collimator lens 801, and incident on the objective lens 104 to become a convergent beam. This convergent beam is irradiated to an optical disc 201 as an information recording medium having a track. The beam reflected and diffracted by an information layer 202 of the optical disc 201 passes through the objective lens 104 and the collimator lens 801 again to become a convergent beam, which then passes through the beam splitter 103. The objective lens 104 is moved in an optical axis direction and a direction normal to the track by the actuator 107. The light beam having passed through the beam splitter 103 is incident on the holographic element 802 to have a part thereof diffracted, thereby becoming a $0^{th}$-order light 810 that is not diffracted and a $1^{st}$-order light 811 that is diffracted. The light beam having passed through the holographic element 802 has astigmatism given thereto by the detection lens 803 and is incident on the photodetector 820.

Figure 28A:
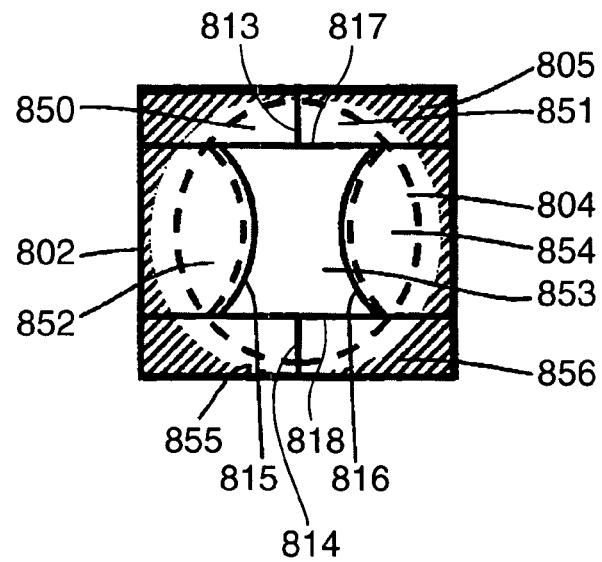
FIG. 28A is a diagram showing the region division of a holographic element in the seventh embodiment.

FIG. 28A is a diagram showing the region division of the holographic element 802 in the seventh embodiment. Dotted line 804 in FIG. 28A shows a beam diameter and the overlap of diffracted lights from the track on the holographic element 802 when the focal point of the objective lens 104 is adjusted to a desired information layer of the optical disc 201. In FIG. 28A, a Y-direction is a direction parallel to a track tangential direction and an X-direction is a direction normal to the track tangential direction.

The holographic element 802 is divided into a plurality of regions by first and second dividing lines 817, 818 along a direction substantially normal to the track tangential direction, third and fourth dividing lines 815, 816 along a direction substantially parallel to the track tangential direction, and fifth and sixth dividing lines 813, 814 along the direction substantially parallel to the track tangential direction.

A region at the outer side of the first dividing line 817 is divided into first and second regions 850 and 851 by the fifth dividing line 813. A region at the outer side of the second dividing line 818 is divided into third and fourth regions 855 and 856 by the sixth dividing line 814. A first subregion is made up of the first and third regions 850, 855, and a second subregion is made up of the second and fourth regions 851, 856.

A region between the first dividing line 817 and the second dividing line 818 is divided into three regions by the third and fourth dividing lines 815, 816. A region at the outer side of the third dividing line 815 and between the first and second dividing lines 817, 818 is a first main region 852. Further, a region at the outer side of the fourth dividing line 816 and between the first and second dividing lines 817, 818 is a second main region 854. Further, a region enclosed by the first, second, third and fourth dividing lines 817, 818, 815 and 816 is a central region 853. Furthermore, the holographic element 802 is provided with an aperture 805.

Figure 28B:
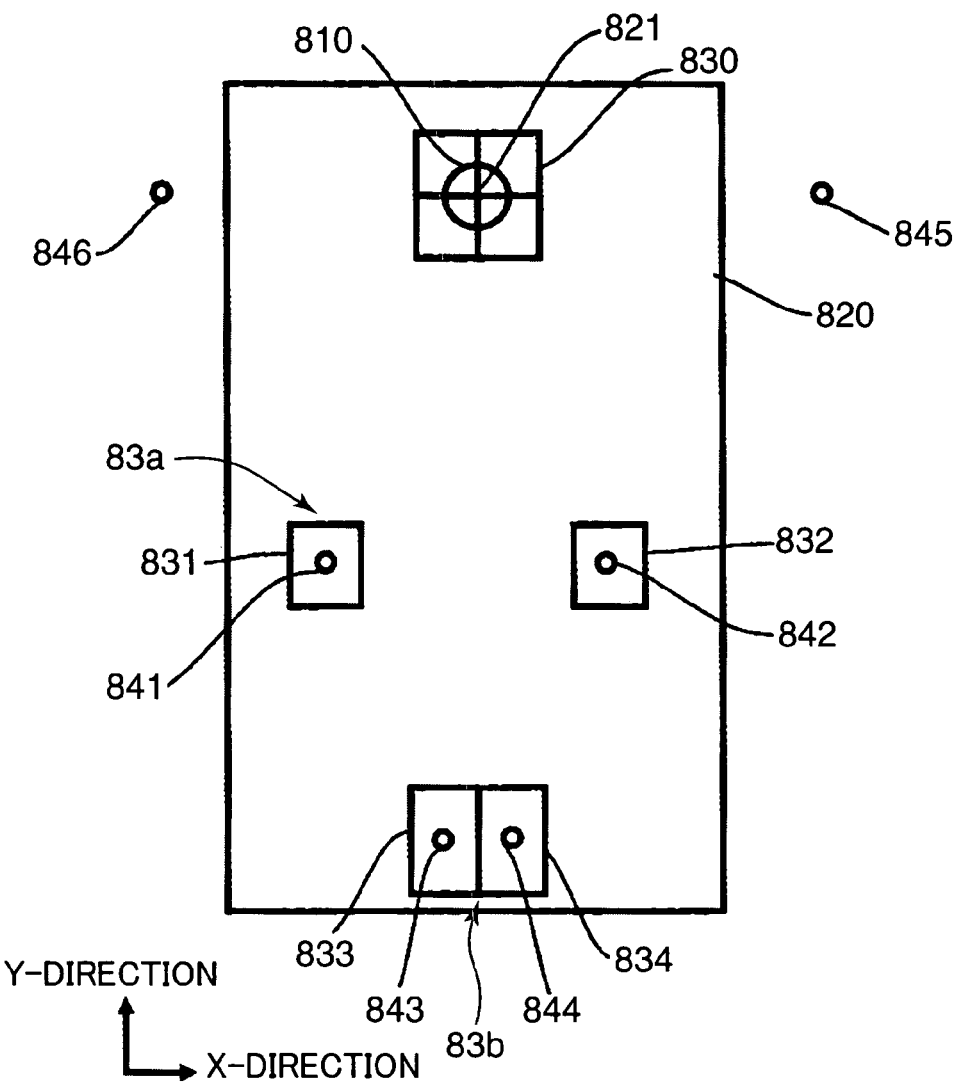
FIG. 28B is a diagram showing the arrangement of light receiving portions of a photodetector and a prism in the seventh embodiment.

FIG. 28B is a diagram showing the arrangement of light receiving portions of the photodetector 820 in the seventh embodiment. The $0^{th}$-order light 810 not diffracted by the holographic element 802 is received by a four-divided light receiving portion ($0^{th}$-order light receiving portion group) 830 on an optical axis 821. A focus signal and an RF signal are obtained by a signal outputted in conformity with an amount of light from this four-divided light receiving portion 830.

A light beam 841 diffracted by the first and third regions 850, 855 as the first subregion is received by a light receiving portion 831. The light receiving portion 831 outputs a signal corresponding to an amount of the received light. A light beam 842 diffracted by the second and fourth regions 851, 856 as the second subregion is received by a light receiving portion 832. The light receiving portion 832 outputs a signal corresponding to an amount of the received light.

On the other hand, a main region light receiving portion group 83b is arranged while being spaced apart from the optical axis 221 in a direction of the extensions of tangents to the third and fourth dividing lines 815, 816. The main region light receiving portion group 83b includes light receiving portions 833, 834. The light receiving portions 833, 834 are arranged adjacent to each other in the X-direction. A light beam 843 diffracted by the first main region 852 is received by the light receiving portion 833 that is one of the light receiving portions constituting the main region light receiving portion group 83b. The light receiving portion 833 outputs a signal corresponding to an amount of the received light. A light beam 844 diffracted by the second main region 854 is similarly received by the light receiving portion 834 that is one of the light receiving portions constituting the main region light receiving portion group 83b. The light receiving portion 834 outputs a signal corresponding to an amount of the received light.

A light beam 845 diffracted by the central region 853 and its conjugate diffracted light beam 846 are diffracted in a direction normal to the one in which the main region light receiving portion group 83b is spaced from the optical axis 821, i.e. in a direction of the extensions of the first and second dividing lines 817, 818 from the optical axis 821.

The light receiving portion 831 for receiving the light beam 841 diffracted by the first subregion is arranged between the direction of the extensions of the first and second dividing lines 817, 818 from the optical axis 821 and a direction of the extensions of the third and fourth dividing lines 815, 816 from the optical axis 821. Further, the light receiving portion 832 for receiving the light beam 842 diffracted by the second subregion is arranged at a position symmetrical with the light receiving portion 831 with respect to a straight line connecting the optical axis 821 and the main region light receiving portion group 83b.

Figure 29:
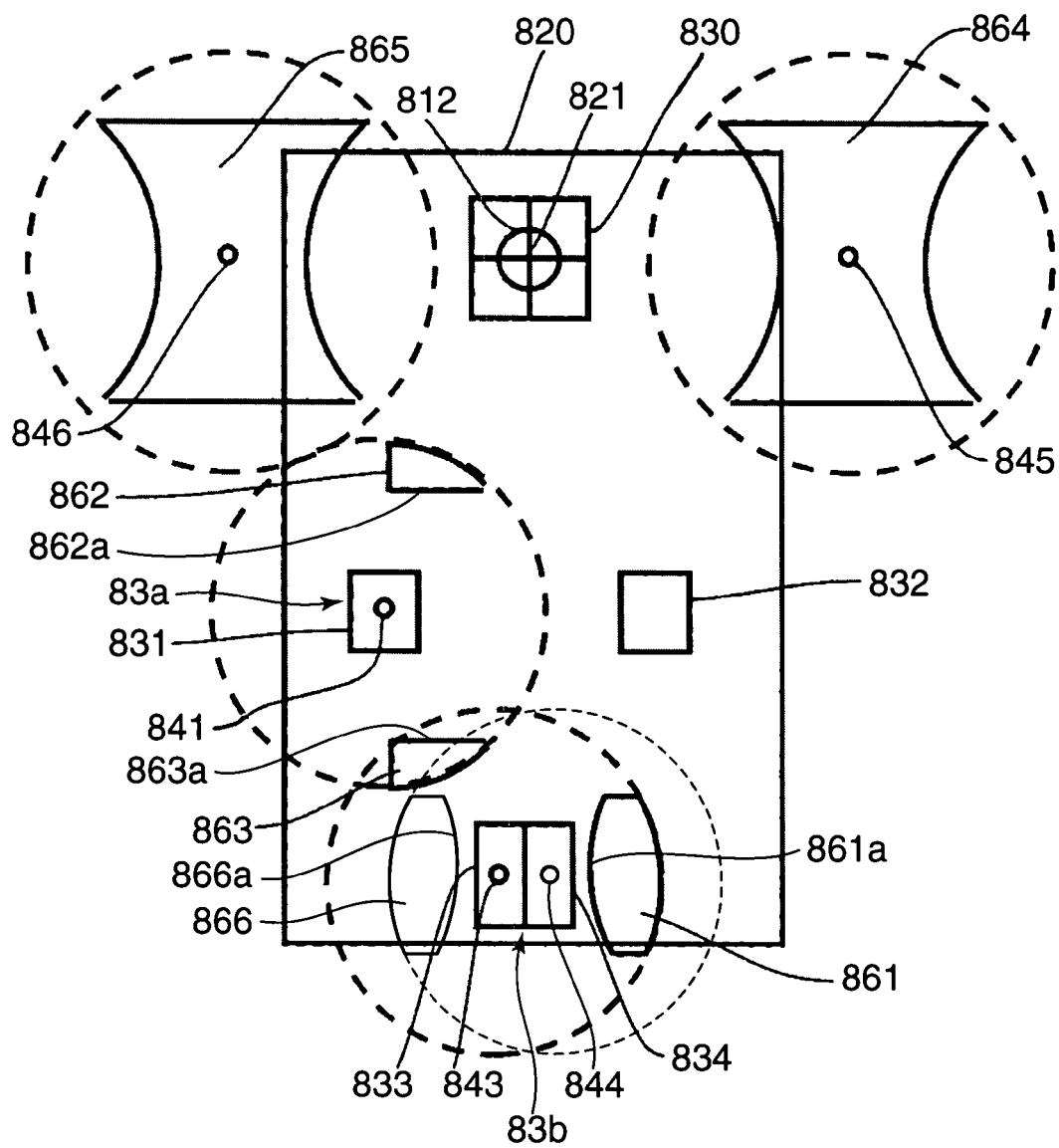
FIG. 29 is a diagram showing a relationship between the photodetector of the seventh embodiment and stray lights from layers having a minimum interlayer spacing in a four-layer optical disc.

FIG. 29 is a diagram showing a relationship between the photodetector 820 and stray lights from layers having a minimum layer spacing in a four-layer optical disc in the seventh embodiment. FIG. 29 shows a relationship of the light receiving portion 833 of the photodetector 820, the light beam 843 diffracted by the first main region 852 and an other-layer stray light 861 of the light beam 843 and a relationship of the light receiving portion 831, the light beam 841 diffracted by the first and third regions 850, 855 and other-layer stray lights 862, 863 of the light beam 841.

Other-layer stray lights produced from two information layers having the minimum layer spacing are those as shown. Since the light beam 843 is the diffracted light from the first main region 852, the shape of the stray light is similar to that of a light beam passing the first main region 852. This is the stray light 861. Here is shown the stray light 861 from the back-side layer when a focal point is adjusted to the front-side layer out of the information layers having the minimum layer spacing. Since stray lights from the back-side layer are focused before the photodetector, they are produced in a direction in which the holographic element 802 is mapped while being inverted in point symmetry.

Further, since the light beam 844 is the one from the second main region 854, the shape of the stray light is similar to that of a light beam passing the second main region 854. This is a stray light 866.

Similarly, the other-layer stray lights 862, 863 are produced in a direction in which the first and third regions 850, 855 are mapped while being inverted in point symmetry with respect to the light beam 831. Other-layer stray lights of the light beam 845 diffracted by the central region 853 and the light beam 846 conjugate to the light beam 845 are other-layer stray lights 864, 865 produced from two information layers having a maximum layer spacing. However, since the light receiving portions 831, 832 are arranged at positions distant from the other-layer stray lights 864, 865, no stray lights are incident on the light receiving portions 831, 832.

The respective light receiving portions 833, 834 of the main region light receiving portion group 83b are arranged between a projection line 861a of the third dividing line 815 on the photodetector 820 and a projection line 866a of the fourth dividing line 816 on the photodetector 820 by the stray lights from two information layers adjacent to the one information layer, on which the light beam is focused, out of a plurality of information layers. Further, the respective light receiving portions 831, 832 of the subregion light receiving portion group 83a are arranged between a projection line 862a of the first dividing line 817 on the photodetector 820 and a projection line 863a of the second dividing line 818 on the photodetector 820 by the stray lights from the two information layers adjacent to the one information layer, on which the light beam is focused, out of a plurality of information layers.

As shown in FIG. 29, if the layer spacing is relatively large, the stray lights can be avoided even if the two light receiving portions 833, 834 of the main region light receiving portion group 83b are arranged at a side where the stray lights are produced. Further, the subregion light receiving portion group 83a can also be arranged between the main region light receiving portion group 83b and the $0^{th}$-order light receiving portion group (four-divided light receiving portion 830). Such a construction can prevent the incident of stray lights on the light receiving portions for diffracted lights.

For example, if the focal length of the detection optical system is 13 mm and that of the objective lens is 1.3 mm, lateral magnification is 10. When the minimum layer spacing of an optical disc is 20 μm, the focal points of the other-layer stray lights are 2 mm by the approximation calculation of 20×10×10 μm. If NA=0.85, the beam radius of the objective lens is 1.105 mm. If this light beam is focused at a position 2 mm before the photodetector 820, the radii of the other-layer stray lights on the photodetector 820 is: 1.105×2/(13−2) =0.200 mm. In other words, the radii of the other-layer stray lights on the photodetector 820 are about 200 μm.

If the ratio of the width of the central region 853 on the holographic element 802 to the light beam is 80%, a stray light has a clearance of 320 μm in the middle. Accordingly, if the width of each light receiving portion of the main region light receiving portion group 83*b* is 80 μm, the length from the center of one light receiving portion to an end of the adjacent light receiving portion is 120 μm, but the width of the central part is 160 μm even at one side. Thus, there is a margin of 40 μm from the end of the light receiving portion to the stray light. Since such a stray light as to be focused before the light receiving portion already becomes smaller in beam diameter upon passing through the holographic element 802, the rate of the central region 853 is relatively large.

According to the seventh embodiment, if the minimum layer spacing is not too small as shown in FIG. 29, the stray lights can be avoided by arranging the light receiving portions between the projected positions of the respective dividing lines by the stray lights from the layers having the minimum layer spacing even if the stray lights are diffracted in such directions as to define relatively large angles to the directions of the dividing lines. Therefore, the effects of the present invention can be obtained.

Although beam shaping such as an anamorphic lens method and a beam shaper method, spherical aberration correction means such as a liquid crystal method, a beam expander method and a collimator lens driving method, and light amount adjustment means by inserting and retracting an ND filter and the like are not described in the preceding embodiments, effects similar to those as described in the embodiments can be obtained even if they are combined.

Although the four-layer optical disc is described as an example in the preceding embodiments, similar effects can be obtained even if the layer spacing is extremely small or large in the case of three or two layers or the number of layers is five, six, seven, eight or more.

Further, the optical head device according to the second to sixth embodiments may be applied to the optical information device shown in FIG. 9.

Figure 30:
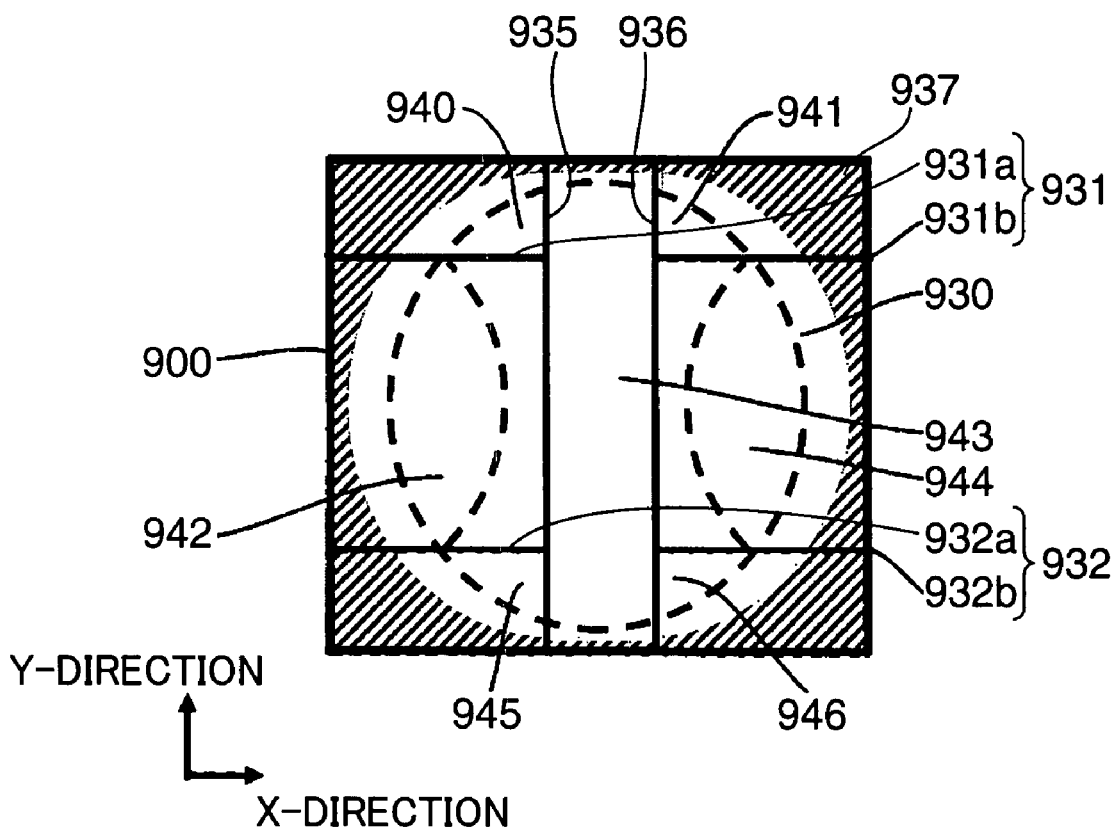
FIG. 30 is a diagram showing a first modification of the region division of the holographic element.

Although only one type of the division pattern of the holographic element is shown in the previous embodiments, similar effects can be obtained even with a division pattern other than the one of the above respective embodiments as long as the division pattern is defined by two vertical dividing lines vertically dividing the holographic element and two horizontal dividing lines horizontally dividing the holographic element. Particularly, the vertical dividing lines are curved lines in the above respective embodiments. However, the vertical dividing lines (third and fourth dividing lines 935, 936) may be straight lines, for example, as shown in FIG. 30. Although the horizontal dividing lines are straight lines in the above respective embodiments, the horizontal dividing lines may be curved lines. Further, although the horizontal dividing lines restrict the vertical dividing lines in the above respective embodiments, the vertical dividing lines may reach the ends of the aperture and the horizontal dividing lines may be restricted by the vertical dividing lines as shown in FIG. 30.

Here, various modifications of the holographic element and the photodetector are described.

FIG. 30 is a diagram showing a first modification of the region division of a holographic element. A holographic element 900 shown in FIG. 30 has first and second dividing lines 931, 932 along a first direction and third and fourth dividing lines 935, 936 along a second direction intersecting with the first direction. The first dividing line 931 is comprised of seventh and eighth dividing lines 931*a*, 931*b*, and the second dividing line 932 is comprised of ninth and tenth dividing lines 932*a*, 932*b*. It should be noted that the first direction is a direction (X-direction) substantially normal to a track tangent direction and the second direction is a direction (Y-direction) substantially parallel to the track tangential direction.

A region at the outer sides of the seventh and third dividing lines 931*a* and 935 is a first region 940. A region at the outer sides of the eighth and fourth dividing lines 931*b* and 936 is a second region 941. A region at the outer sides of the ninth and third dividing lines 932*a* and 935 is a third region 945. A region at the outer sides of the tenth and fourth dividing lines 932*b* and 936 is a fourth region 946. Here, a first subregion is made up of the first and third regions 940 and 945, and a second subregion is made up of the second and fourth regions 941, 946.

Further, a region at the outer side of the third dividing line 935 and between the seventh and ninth dividing lines 931*a* and 932*a* is a first main region 942. A region at the outer side of the fourth dividing line 936 and between the eighth and tenth dividing lines 931*b* and 932*b* is a second main region 944. A region enclosed by the third and fourth dividing lines 935, 936 is a central region 943. Further, the holographic element 900 is provided with an aperture 937.

Although the central region abuts on the vertical and horizontal dividing lines in the above respective embodiments, it may abut on the vertical dividing lines while including the optical axis as shown in FIG. 30.

Further, the dividing lines dividing the holographic element into a plurality of regions may be at specified angles to the track tangential direction. For example, if two objective lenses are arranged in the track tangential direction, at least one of the two objective lenses is such that the extension of a moving direction when the optical head is moved from the inner circumferential side toward the outer circumferential side of an optical disc does not pass through the center of the optical disc. In the case of such a movement, the track tangential direction changes at the inner circumferential side and at the outer circumferential side of the optical disc. In order to suppress the influence by this change, the dividing lines are inclined in conformity with the track tangential direction at an intermediate circumferential side. For example, if the spacing between the two objective lenses is 3.6 mm and the optical head device is moved from a radius position of 22 mm to a radius position of 60 mm on the optical disc, the angle of the tangent to the track changes from 9.4° to 3.4°. Therefore, the angle of inclination of the dividing lines may be set to 6.5° with respect to the track tangential direction.

Figure 31A:
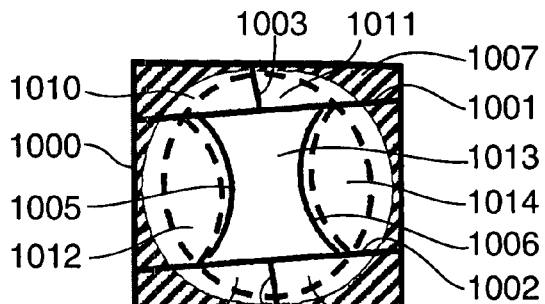
FIGS. 31A to 31D are diagrams showing a relationship between a photodetector according to a second modification and stray lights from layers having a minimum interlayer spacing in a four-layer optical disc.

FIGS. 31A to 31D are diagrams showing a relationship between a photodetector according to a second modification and stray lights from layers having a minimum layer spacing in a four-layer optical disc. FIG. 31A is a diagram showing the region division of a holographic element 1000 according to the second modification.

The dotted line in FIG. 31A shows a beam diameter and the overlap of diffracted lights from a track on the holographic element 1000 when the focal point of an objective lens is adjusted to a desired information layer of an optical disc. It should be noted that a Y-direction is a direction parallel to a track tangential direction and an X-direction is a direction normal to the track tangential direction in FIG. 31.

The holographic element 1000 has first and second dividing lines 1001, 1002 along a direction inclined only by a specified angle with respect to the direction normal to the track tangential direction, third, fourth, fifth and sixth dividing lines 1005, 1006, 1003 and 1004 along a direction inclined only by a specified angle with respect to the direction parallel to the track tangential direction. It should be noted that the first and second dividing lines 1001, 1002 are inclined, for example, by 6.5° with respect to the direction normal to the track tangential direction, and the third, fourth, fifth and sixth dividing lines 1005, 1006, 1003 and 1004 are inclined, for example, by 6.5° with respect to the direction parallel to the track tangential direction.

A region at the outer side of the first dividing line 1001 is divided into first and second regions 1010, 1011 by the fifth dividing line 1003. A region at the outer side of the second dividing line 1002 is divided into third and fourth regions 1015, 1016 by the sixth dividing line 1004. A first subregion is made up of the first and third regions 1010, 1015, and a second subregion is made up of the second and fourth regions 1011, 1016.

A region between the first and second dividing lines 1001, 1002 is divided into three regions by the third and fourth dividing lines 1005, 1006. A region at the outer side of the third dividing line 1005 and between the first and second dividing lines 1001, 1002 is a first main region 1012. A region at the outer side of the fourth dividing line 1006 and between the first and second dividing lines 1001, 1002 is a second main region 1014. A region enclosed by the first, second, third and fourth dividing lines 1001, 1002, 1005 and 1006 is a central region 1013. Further, the holographic element 1000 is provided with an aperture 1007.

Figure 31B:
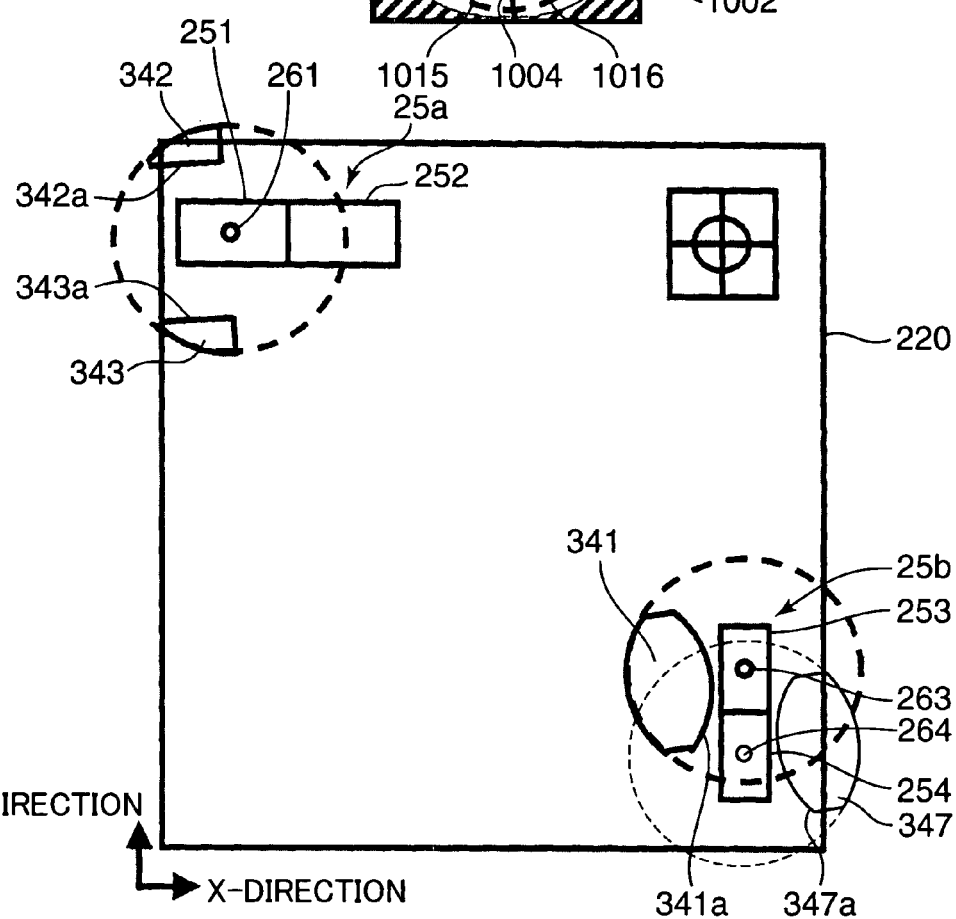

FIG. 31B shows a relationship of a light receiving portion 253 of the photodetector 220 according to the second modification, a light beam 263 diffracted by the region 1012 and an other-layer stray light 341 of the light beam 263, and a relationship of a light receiving portion 251, a light beam 261 diffracted by the regions 1010 and 1015 and other-layer stray lights 342, 343 of the light beam 261.

Other-layer stray lights produced from two information layers having a minimum layer spacing are those having a radius R4min proportional to a minimum layer spacing d4min. Since the light beam 263 is the one from the region 1012, the shape of the stray light is similar to that of a light beam passing the region 1012. This is a stray light 341. FIG. 31B shows stray lights from the front-side layer when a focal point is adjusted to the back-side layer out of the information layers having the minimum layer spacing. Since the stray lights from the front-side layer are focused behind the photodetector 220, they are located in a direction in which the holographic element 1000 is mapped as it is.

Further, since the light beam 264 is the one from the second main region 1014, the shape of the stray light is similar to that of a light beam passing the second main region 1014. This is a stray light 347.

Similarly, since the light beam 261 is the one from the regions 1010, 1015, the shapes of the stray lights are similar to those of light beams passing the regions 1010, 1015. These are stray lights 342, 343.

Figure 31D:
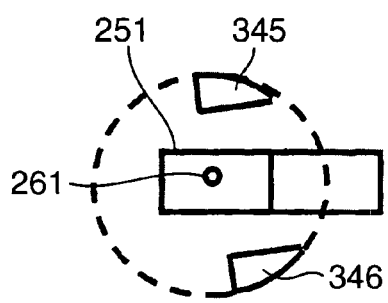
Figure 31C:
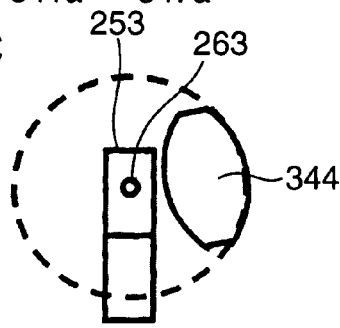

On the other hand, FIG. 31C shows a stray light 344 from the back-side layer when the light beam 263 diffracted by the region 1012 is focused on the front-side layer out of the information layers having the minimum layer spacing. Since stray lights from the back-side layer are focused before the photodetector 220, they are located in a direction in which the holographic element 1000 is mapped while being inverted in point symmetry. Thus, as shown in FIG. 31C, the stray lights 344, 341 are point symmetrical with respect to the light beam 263.

FIG. 31D shows stray lights 345, 346 from the back-side layer when the light beam 261 diffracted by the regions 1010, 1015 is focused on the front-side layer out of the information layers having the minimum layer spacing. Since stray lights from the back-side layer are focused before the photodetector 220, they are located in a direction in which the holographic element 1000 is mapped while being inverted in point symmetry. Thus, as shown in FIG. 31D, the stray lights 345, 346 and the stray lights 342, 343 are point symmetrical with respect to the light beam 261.

Light receiving portions 253, 254 of a main region light receiving portion group 25b are arranged between a projection line 341a of the third dividing line 1005 on the photodetector 220 and a projection line 347a of the fourth dividing line 1006 on the photodetector 220 by the stray lights from two information layers adjacent to the one information layer, on which the light beam is focused, out of a plurality of information layers. Further, light receiving portions 251, 252 of the subregion light receiving portion group 25a are arranged between a projection line 342a of the first dividing line 1001 on the photodetector 220 and a projection line 343a of the second dividing line 1002 on the photodetector 220 by the stray lights from two information layers adjacent to the one information layer, on which the light beam is focused, out of the plurality of information layers.

As described above, even if the optical head device includes two objective lenses, the effects of the present invention can be obtained by fabricating the holographic element such that the dividing lines are at specified angles to the track tangential direction and arranging the light receiving portions of the photodetector between the projected positions of the respective dividing lines by the stray lights from the layers having the minimum layer spacing of the optical disc.

Figure 32A:
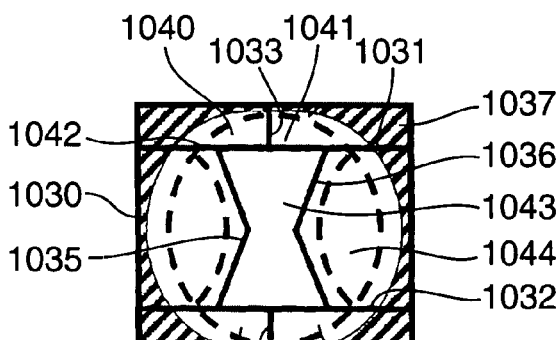
FIGS. 32A to 32D are diagrams showing a relationship between a photodetector according to a third modification and stray lights from layers having a minimum interlayer spacing in a four-layer optical disc.

FIGS. 32A to 32D are diagrams showing a relationship between a photodetector according to a third modification and stray lights from layers having a minimum layer spacing in a four-layer optical disc. FIG. 32A is a diagram showing the region division of a holographic element 1030 according to the third modification.

The dotted line in FIG. 32A shows a beam diameter and the overlap of diffracted lights from a track on the holographic element 1030 when the focal point of an objective lens is adjusted to a desired information layer of an optical disc. It should be noted that a Y-direction is a direction parallel to a track tangential direction and an X-direction is a direction normal to the track tangential direction in FIG. 32.

The holographic element 1030 has first and second dividing lines 1031, 1032 along a direction substantially normal to the track tangential direction, third and fourth dividing lines 1035, 1036 along a direction substantially parallel to the track tangential direction, and fifth and sixth dividing lines 1033 and 1034 along the direction substantially parallel to the track tangential direction. The third dividing line 1035 is not curved, but is bent near the center of the holographic element 1030. The fourth dividing line 1036 has such a shape obtained by inverting the third dividing line 1035 with respect to a straight line passing through the center of the holographic element 1030 and parallel to the track tangential direction.

A region at the outer side of the first dividing line 1031 is divided into first and second regions 1040, 1041 by the fifth dividing line 1033. A region at the outer side of the second dividing line 1032 is divided into third and fourth regions 1045, 1046 by the sixth dividing line 1034. A first subregion is made up of the first and third regions 1040, 1045, and a second subregion is made up of the second and fourth regions 1041, 1046.

A region between the first and second dividing lines 1031, 1032 is divided into three regions by the third and fourth dividing lines 1035, 1036. A region at the outer side of the third dividing line 1035 and between the first and second dividing lines 1031, 1032 is a first main region 1042. A region at the outer side of the fourth dividing line 1036 and between the first and second dividing lines 1031, 1032 is a second main region 1044. A region enclosed by the first, second, third and fourth dividing lines 1031, 1032, 1035 and 1036 is a central region 1043. Further, the holographic element 1030 is provided with an aperture 1037.

Figure 32B:
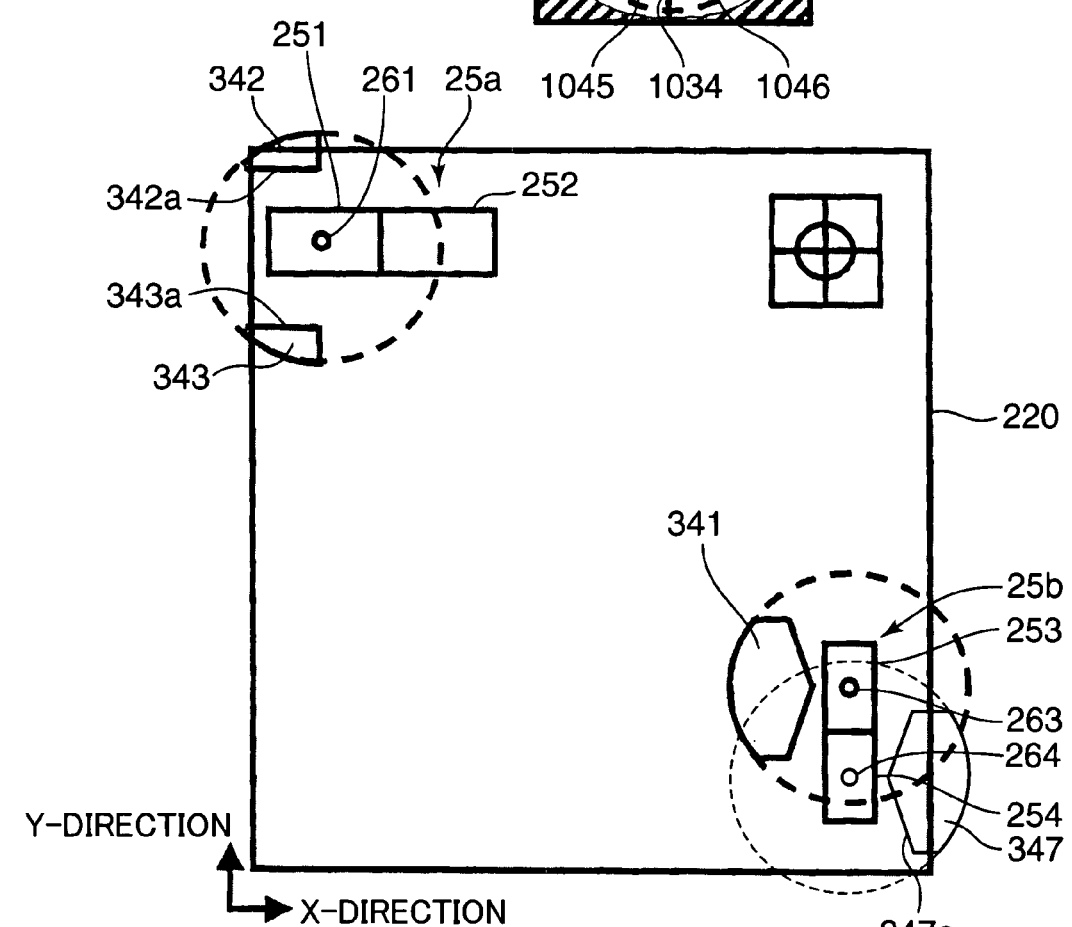

FIG. 32B shows a relationship of a light receiving portion 253 of a photodetector 220 according to the third modification, a light beam 263 diffracted by the region 1042 and an other-layer stray light 341 of the light beam 263, and a relationship of a light receiving portion 251, a light beam 261 diffracted by the regions 1040 and 1045 and other-layer stray lights 342, 343 of the light beam 261.

Other-layer stray lights produced from two information layers having a minimum layer spacing are those having a radius R4min proportional to a minimum layer spacing d4min. Since the light beam 263 is the one from the region 1042, the shape of the stray light is similar to that of a light beam passing the region 1042. This is a stray light 341. FIG. 32B shows stray lights from the front-side layer when a focal point is adjusted to the back-side layer out of the information layers having the minimum layer spacing. Since the stray lights from the front-side layer are focused behind the photodetector 220, they are located in a direction in which the holographic element 1030 is mapped as it is.

Further, since the light beam 264 is the one from the second main region 1044, the shape of the stray light is similar to that of a light beam passing the second main region 1044. This is a stray light 347.

Similarly, since the light beam 261 is the one from the regions 1040, 1045, the shapes of the stray lights are similar to those of light beams passing the regions 1040, 1045. These are stray lights 342, 343.

Figure 32D:
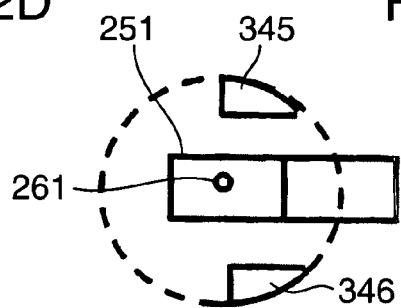
Figure 32C:
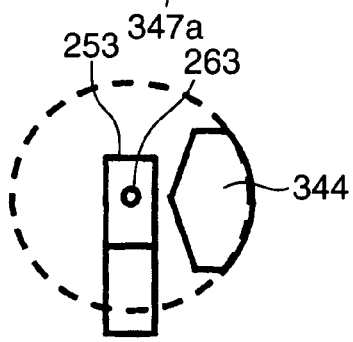

On the other hand, FIG. 32C shows a stray light 344 from the back-side layer when the light beam 263 diffracted by the region 1042 is focused on the front-side layer out of the information layers having the minimum layer spacing. Since stray lights from the back-side layer are focused before the photodetector 220, they are located in a direction in which the holographic element 1030 is mapped while being inverted in point symmetry. Thus, as shown in FIG. 32C, the stray lights 344, 341 are point symmetrical with respect to the light beam 263.

FIG. 32D shows stray lights 345, 346 from the back-side layer when the light beam 261 diffracted by the regions 1040, 1045 is focused on the front-side layer out of the information layers having the minimum layer spacing. Since stray lights from the back-side layer are focused before the photodetector 220, they are located in a direction in which the holographic element 1030 is mapped while being inverted in point symmetry. Thus, as shown in FIG. 32D, the stray lights 345, 346 and the stray lights 342, 343 are point symmetrical with respect to the light beam 261.

Light receiving portions 253, 254 of a main region light receiving portion group 25*b* are arranged between a projection line 341*a* of the third dividing line 1035 on the photodetector 220 and a projection line 347*a* of the fourth dividing line 1036 on the photodetector 220 by the stray lights from two information layers adjacent to the one information layer, on which the light beam is focused, out of a plurality of information layers. Further, light receiving portions 251, 252 of the subregion light receiving portion group 25*a* are arranged between a projection line 342*a* of the first dividing line 1031 on the photodetector 220 and a projection line 343*a* of the second dividing line 1032 on the photodetector 220 by the stray lights from two information layers adjacent to the one information layer, on which the light beam is focused, out of the plurality of information layers.

As described above, even if the third and fourth dividing lines 1035, 1036 dividing the holographic element 1030 in the direction substantially parallel to the track tangential direction have the bent shapes, the effects of the present invention can be obtained by arranging the light receiving portions of the photodetector between the projected positions of the respective dividing lines by the stray lights from the layers having the minimum layer spacing of the optical disc.

Figure 33A:
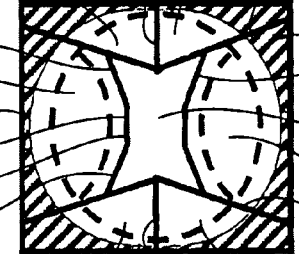
FIGS. 33A to 33D are diagrams showing a relationship between a photodetector according to a fourth modification and stray lights from layers having a minimum interlayer spacing in a four-layer optical disc.

FIGS. 33A to 33D are diagrams showing a relationship between a photodetector according to a fourth modification and stray lights from layers having a minimum layer spacing in a four-layer optical disc. FIG. 33A is a diagram showing the region division of a holographic element 1060 according to the fourth modification.

The dotted line in FIG. 33A shows a beam diameter and the overlap of diffracted lights from a track on the holographic element 1060 when the focal point of an objective lens is adjusted to a desired information layer of an optical disc. It should be noted that a Y-direction is a direction parallel to a track tangential direction and an X-direction is a direction normal to the track tangential direction in FIG. 33.

The holographic element 1060 has first and second dividing lines 1061, 1062 along a direction substantially normal to the track tangential direction, third and fourth dividing lines 1065, 1066 along a direction substantially parallel to the track tangential direction, and fifth and sixth dividing lines 1063 and 1064 along a direction substantially parallel to the track tangential direction.

The first dividing line 1061 is not straight, but is bent near the center of the holographic element 1060. The second dividing line 1062 has such a shape obtained by inverting the first dividing line 1061 with respect to a straight line passing through the center of the holographic element 1060 and normal to the track tangential direction.

The third dividing line 1065 is not curved, and has such a shape bent at two positions near the center of the holographic element 1060. Specifically, the third dividing line 1065 is comprised of a straight line 1065*a* parallel to the track tangential direction, a straight line 1065*b* bent at a specified angle to the track tangential direction at one end of the straight line 1065*a*, and a straight line 1065*c* bent at a specified angle to the track tangential direction at the other end of the straight line 1065*a*. Further, the fourth dividing line 1066 has a shape obtained by inverting the third dividing line 1065 with respect to a straight line passing through the center of the holographic element 1060 and parallel to the track tangential direction.

A region at the outer side of the first dividing line 1061 is divided into first and second regions 1070, 1071 by the fifth dividing line 1063. A region at the outer side of the second dividing line 1062 is divided into third and fourth regions 1075, 1076 by the sixth dividing line 1064. A first subregion is made up of the first and third regions 1070, 1075, and a second subregion is made up of the second and fourth regions 1071, 1076.

A region between the first and second dividing lines 1061, 1062 is divided into three regions by the third and fourth dividing lines 1065, 1066. A region at the outer side of the third dividing line 1065 and between the first and second dividing lines 1061, 1062 is a first main region 1072. A region at the outer side of the fourth dividing line 1066 and between the first and second dividing lines 1061, 1062 is a second main region 1074. A region enclosed by the first, second, third and fourth dividing lines 1061, 1062, 1065 and 1066 is a central region 1073. Further, the holographic element 1060 is provided with an aperture 1067.

Figure 33B:
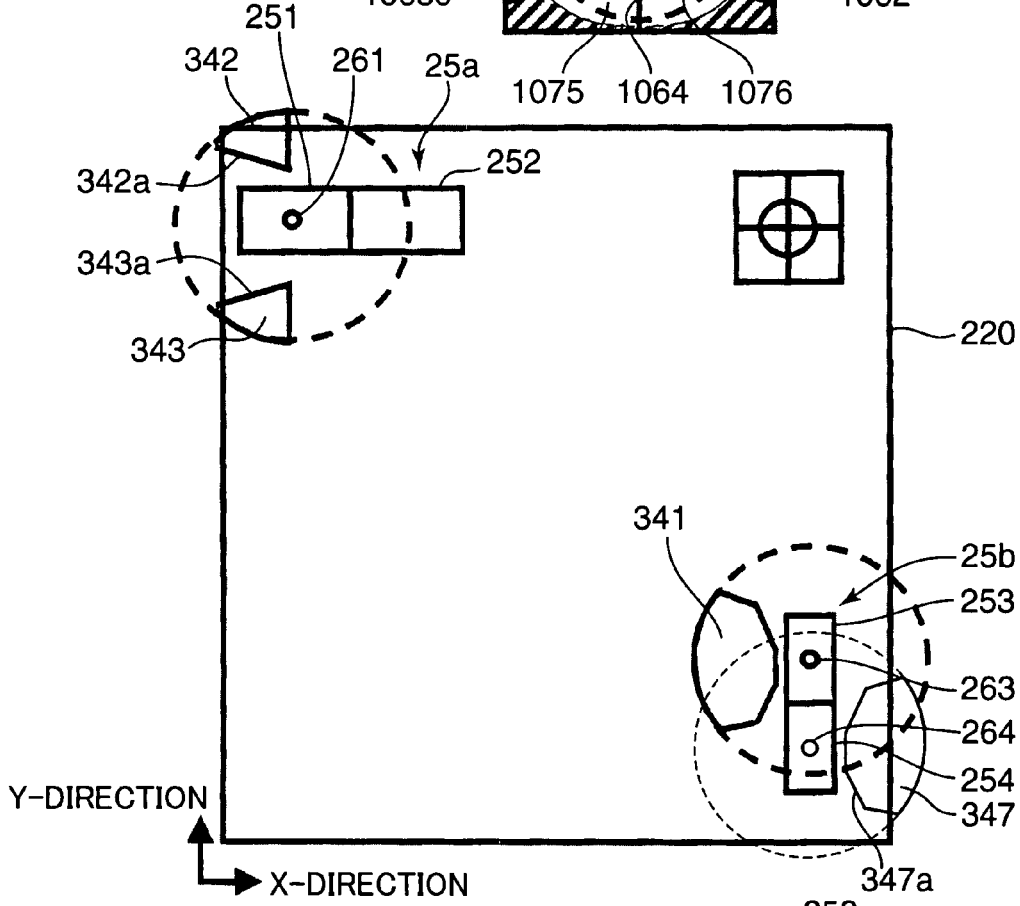

FIG. 33B shows a relationship of a light receiving portion 253 of a photodetector 220 according to the fourth modification, a light beam 263 diffracted by the region 1072 and an other-layer stray light 341 of the light beam 263, and a relationship of a light receiving portion 251, a light beam 261 diffracted by the regions 1070 and 1075 and other-layer stray lights 342, 343 of the light beam 261.

Other-layer stray lights produced from two information layers having a minimum layer spacing are those having a radius R4min proportional to a minimum layer spacing d4min. Since the light beam 263 is the one from the region 1072, the shape of the stray light is similar to that of a light beam passing the region 1072. This is a stray light 341. FIG. 33B shows stray lights from the front-side layer when a focal point is adjusted to the back-side layer out of the information layers having the minimum layer spacing. Since the stray lights from the front-side layer are focused behind the photodetector 220, they are located in a direction in which the holographic element 1060 is mapped as it is.

Similarly, since the light beam 261 is the one from the regions 1070, 1075, the shapes of the stray lights are similar to those of light beams passing the regions 1070, 1075. These are stray lights 342, 343.

Further, since the light beam 264 is the one from the second main region 1074, the shape of the stray light is similar to that of a light beam passing the second main region 1074. This is a stray light 347.

Figure 33D:
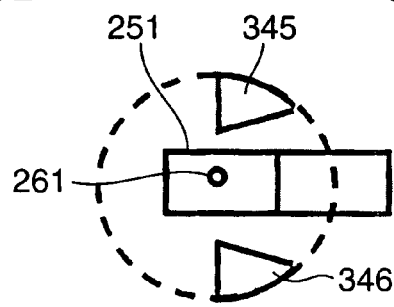
Figure 33C:
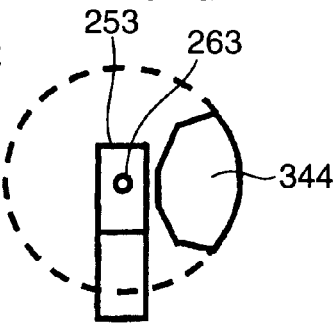

On the other hand, FIG. 33C shows a stray light 344 from the back-side layer when the light beam 263 diffracted by the region 1072 is focused on the front-side layer out of the information layers having the minimum layer spacing. Since stray lights from the back-side layer are focused before the photodetector 220, they are located in a direction in which the holographic element 1060 is mapped while being inverted in point symmetry. Thus, as shown in FIG. 33C, the stray lights 344, 341 are point symmetrical with respect to the light beam 263.

FIG. 33D shows stray lights 345, 346 from the back-side layer when the light beam 261 diffracted by the regions 1070, 1075 is focused on the front-side layer out of the information layers having the minimum layer spacing. Since stray lights from the back-side layer are focused before the photodetector, they are located in a direction in which the holographic element 1060 is mapped while being inverted in point symmetry. Thus, as shown in FIG. 33D, the stray lights 345, 346 and the stray lights 342, 343 are point symmetrical with respect to the light beam 261.

Light receiving portions 253, 254 of a main region light receiving portion group 25b are arranged between a projection line 341a of the third dividing line 1065 on the photodetector 220 and a projection line 347a of the fourth dividing line 1066 on the photodetector 220 by the stray lights from two information layers adjacent to the one information layer, on which the light beam is focused, out of a plurality of information layers. Further, light receiving portions 251, 252 of a subregion light receiving portion group 25a are arranged between a projection line 342a of the first dividing line 1061 on the photodetector 220 and a projection line 343a of the second dividing line 1062 on the photodetector 220 by the stray lights from two information layers adjacent to the one information layer, on which the light beam is focused, out of the plurality of information layers.

As described above, the first and second dividing lines 1061, 1062 dividing the holographic element 1060 in the direction substantially normal to the track tangential direction and the third and fourth dividing lines 1065, 1066 dividing the holographic element 1060 in the direction substantially parallel to the track tangential direction may have bent shapes, and the effects of the present invention can be obtained by arranging the light receiving portions of the photodetector between the projected positions of the respective dividing lines by the stray lights from the layers having the minimum layer spacing of the optical disc. In the case of dividing the holographic element 1060 as above, areas of the first and second subregions can be increased.

Figure 34A:
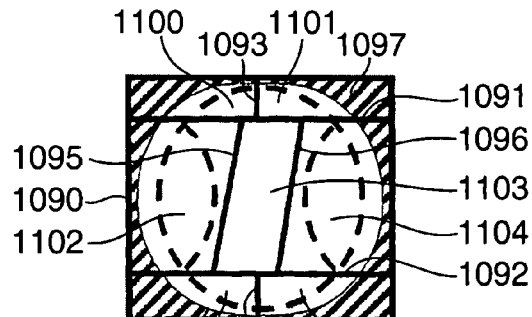
FIGS. 34A to 34D are diagrams showing a relationship between a photodetector according to a fifth modification and stray lights from layers having a minimum interlayer spacing in a four-layer optical disc.

FIGS. 34A to 34D are diagrams showing a relationship between a photodetector according to a fifth modification and stray lights from layers having a minimum layer spacing in a four-layer optical disc. FIG. 34A is a diagram showing the region division of a holographic element 1090 according to the fifth modification.

The dotted line in FIG. 34A shows a beam diameter and the overlap of diffracted lights from a track on the holographic element 1090 when the focal point of an objective lens is adjusted to a desired information layer of an optical disc. It should be noted that a Y-direction is a direction parallel to a track tangential direction and an X-direction is a direction normal to the track tangential direction in FIG. 34.

The holographic element 1090 has first and second dividing lines 1091, 1092 along a direction substantially normal to the track tangential direction, third and fourth dividing lines 1095, 1096 along a direction at a specified angle to a direction parallel to the track tangential direction, and fifth and sixth dividing lines 1093 and 1094 along a direction substantially parallel to the track tangential direction.

The third dividing line 1095 is not curved, but is a straight line at the specified angle to the direction parallel to the track tangential direction, and the fourth dividing line 1036 is a straight line at the same angle as the third dividing line 1095 to the direction parallel to the track tangential direction. The third and fourth dividing lines 1095, 1096 are parallel. A region (central region) enclosed by the first, second, third and fourth dividing lines 1091, 1092, 1095 and 1096 has a parallelogram shape.

A region at the outer side of the first dividing line 1091 is divided into first and second regions 1100, 1101 by the fifth dividing line 1093. A region at the outer side of the second dividing line 1092 is divided into third and fourth regions 1105, 1106 by the sixth dividing line 1094. A first subregion is made up of the first and third regions 1100, 1105, and a second subregion is made up of the second and fourth regions 1101, 1106.

A region between the first and second dividing lines 1091, 1092 is divided into three regions by the third and fourth dividing lines 1095, 1096. A region at the outer side of the third dividing line 1095 and between the first and second dividing lines 1091, 1092 is a first main region 1102. A region at the outer side of the fourth dividing line 1096 and between the first and second dividing lines 1091, 1092 is a second main region 1104. A region enclosed by the first, second, third and fourth dividing lines 1091, 1092, 1095 and 1096 is a central region 1103. Further, the holographic element 1090 is provided with an aperture 1097.

Figure 34B:
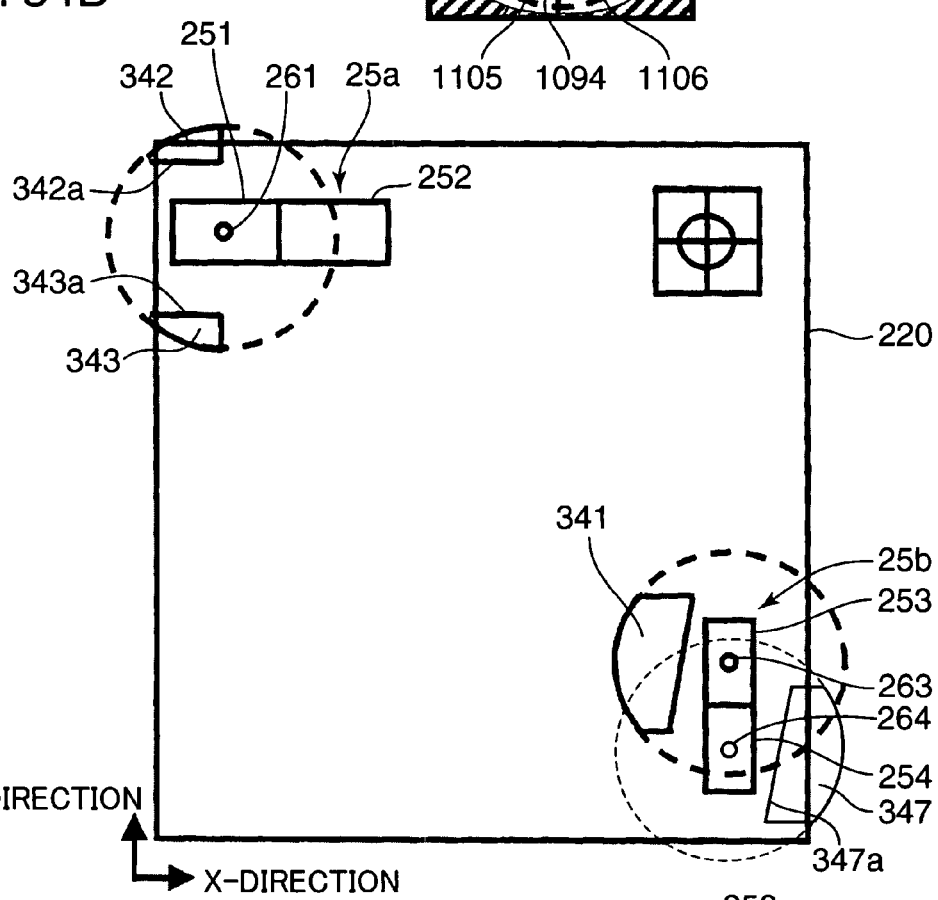

FIG. 34B shows a relationship of a light receiving portion 253 of a photodetector 220 according to the fifth modification, a light beam 263 diffracted by the region 1102 and an other-layer stray light 341 of the light beam 263, and a relationship of a light receiving portion 251, a light beam 261 diffracted by the regions 1100 and 1105 and other-layer stray lights 342, 343 of the light beam 261.

Other-layer stray lights produced from two information layers having a minimum layer spacing are those having a radius R4min proportional to a minimum layer spacing d4min. Since the light beam 263 is the one from the region 1102, the shape of the stray light is similar to that of a light beam passing the region 1102. This is a stray light 341. FIG. 34B shows stray lights from the front-side layer when a focal point is adjusted to the back-side layer out of the information layers having the minimum layer spacing. Since the stray lights from the front-side layer are focused behind the photodetector 220, they are located in a direction in which the holographic element 1090 is mapped as it is.

Further, since the light beam 264 is the one from the second main region 1104, the shape of the stray light is similar to that of a light beam passing the second main region 1104. This is a stray light 347.

Similarly, since the light beam 261 is the one from the regions 1100, 1105, the shapes of the stray lights are similar to those of light beams passing the regions 1100, 1105. These are stray lights 342, 343.

Figure 34D:
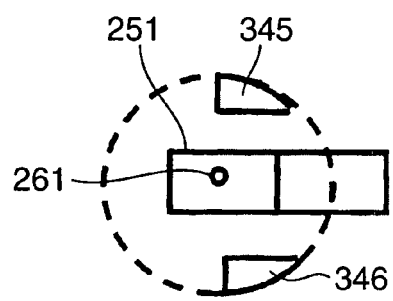
Figure 34C:
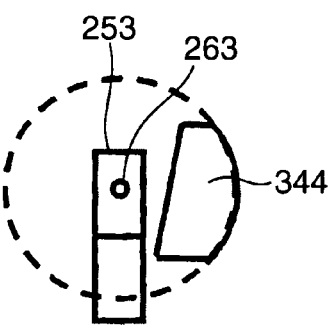

On the other hand, FIG. 34C shows a stray light 344 from the back-side layer when the light beam 263 diffracted by the region 1102 is focused on the front-side layer out of the information layers having the minimum layer spacing. Since stray lights from the back-side layer are focused before the photodetector 220, they are located in a direction in which the holographic element 1090 is mapped while being inverted in point symmetry. Thus, as shown in FIG. 34C, the stray lights 344, 341 are point symmetrical with respect to the light beam 263.

FIG. 34D shows stray lights 345, 346 from the back-side layer when the light beam 261 diffracted by the regions 1100, 1105 is focused on the front-side layer out of the information layers having the minimum layer spacing. Since stray lights from the back-side layer are focused before the photodetector, they are located in a direction in which the holographic element 1090 is mapped while being inverted in point symmetry. Thus, as shown in FIG. 34D, the stray lights 345, 346 and the stray lights 342, 343 are point symmetrical with respect to the light beam 261.

Light receiving portions 253, 254 of a main region light receiving portion group 25*b* are arranged between a projection line 341*a* of the third dividing line 1095 on the photodetector 220 and a projection line 347*a* of the fourth dividing line 1096 on the photodetector 220 by the stray lights from two information layers adjacent to the one information layer, on which the light beam is focused, out of a plurality of information layers. Further, light receiving portions 251, 252 of a subregion light receiving portion group 25*a* are arranged between a projection line 342*a* of the first dividing line 1091 on the photodetector 220 and a projection line 343*a* of the second dividing line 1092 on the photodetector 220 by the stray lights from two information layers adjacent to the one information layer, on which the light beam is focused, out of a plurality of information layers.

As described above, the shape of the central region 1103 enclosed by the first, second, third and fourth dividing lines 1091, 1092, 1095 and 1096 may have the parallelogram shape, and the effects of the present invention can be obtained by arranging the light receiving portions of the photodetector between the projected positions of the respective dividing lines by the stray lights from the layers having the minimum layer spacing of the optical disc.

Although the central region 1103 has the parallelogram shape in the fifth modification, the present invention is not particularly limited thereto and the central region 1103 may have a trapezoidal shape.

Figure 35A:
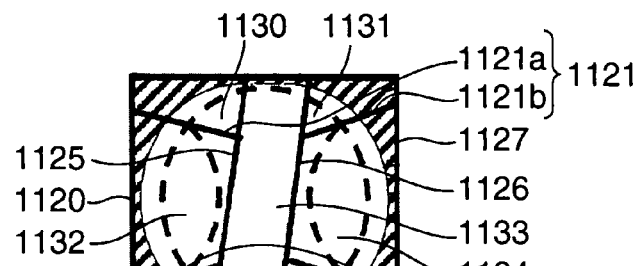
FIGS. 35A to 35D are diagrams showing a relationship between a photodetector according to a sixth modification and stray lights from layers having a minimum interlayer spacing in a four-layer optical disc.

FIGS. 35A to 35D are diagrams showing a relationship between a photodetector according to a sixth modification and stray lights from layers having a minimum layer spacing in a four-layer optical disc. FIG. 35A is a diagram showing the region division of a holographic element 1120 according to the sixth modification.

The dotted line in FIG. 35A shows a beam diameter and the overlap of diffracted lights from a track on the holographic element 1120 when the focal point of an objective lens is adjusted to a desired information layer of an optical disc. It should be noted that a Y-direction is a direction parallel to a track tangential direction and an X-direction is a direction normal to the track tangential direction in FIG. 35.

The holographic element 1120 has first and second dividing lines 1121, 1122 along directions substantially normal to the track tangential direction and third and fourth dividing lines 1125, 1126 along a direction at a specified angle to a direction parallel to the track tangential direction. The first dividing line 1121 is comprised of seventh and eighth dividing lines 1121*a*, 1121*b* along directions at specified angles to the direction normal to the track tangential direction, and the second dividing line 1122 is comprised of ninth and tenth dividing lines 1122*a*, 1122*b* along directions at specified angles to the direction normal to the track tangential direction.

The seventh and eighth dividing lines 1121*a*, 1121*b* are not parallel, and the ninth and tenth dividing lines 1122*a*, 1122*b* are not parallel. The eighth dividing line 1121*b* has a shape obtained by inverting the seventh dividing line 1121*a* with respect to a straight line passing through the center of the holographic element 1120 and parallel to the track tangential direction. Further, the tenth dividing line 1122*b* has a shape obtained by inverting the ninth dividing line 1122*a* with respect to a straight line passing through the center of the holographic element 1120 and parallel to the track tangential direction.

The third dividing line 1125 is not curved, but is a straight line at the specified angle to the direction parallel to the track tangential direction, and the fourth dividing line 1126 is a straight line at the same angle as the third dividing line 1125 to the direction parallel to the track tangential direction. The third and fourth dividing lines 1125, 1126 are parallel. A region (central region) enclosed by the third, fourth dividing lines 1125, 1126 and the upper and lower sides of the holographic element 1120 has a parallelogram shape.

A region at the outer sides of the seventh and third dividing lines 1121*a*, 1125 is a first region 1130. A region at the outer sides of the eighth and fourth dividing lines 1121*b*, 1126 is a second region 1131. A region at the outer sides of the ninth and third dividing lines 1122*a*, 1125 is a third region 1135. A region at the outer sides of the tenth and fourth dividing lines 1122*b*, 1126 is a fourth region 1136. Here, a first subregion is made up of the first and third regions 1130, 1135, and a second subregion is made up of the second and fourth regions 1131, 1136.

A region at the outer side of the third dividing line 1125 and between the seventh and ninth dividing lines 1121*a*, 1122*a* is a first main region 1132. A region at the outer side of the fourth dividing line 1126 and between the eighth and tenth dividing lines 1121*b*, 1122*b* is a second main region 1134. A region enclosed by the third and fourth dividing lines 1125, 1126 is a central region 1133. Further, the holographic element 1120 is provided with an aperture 1127.

Figure 35B:
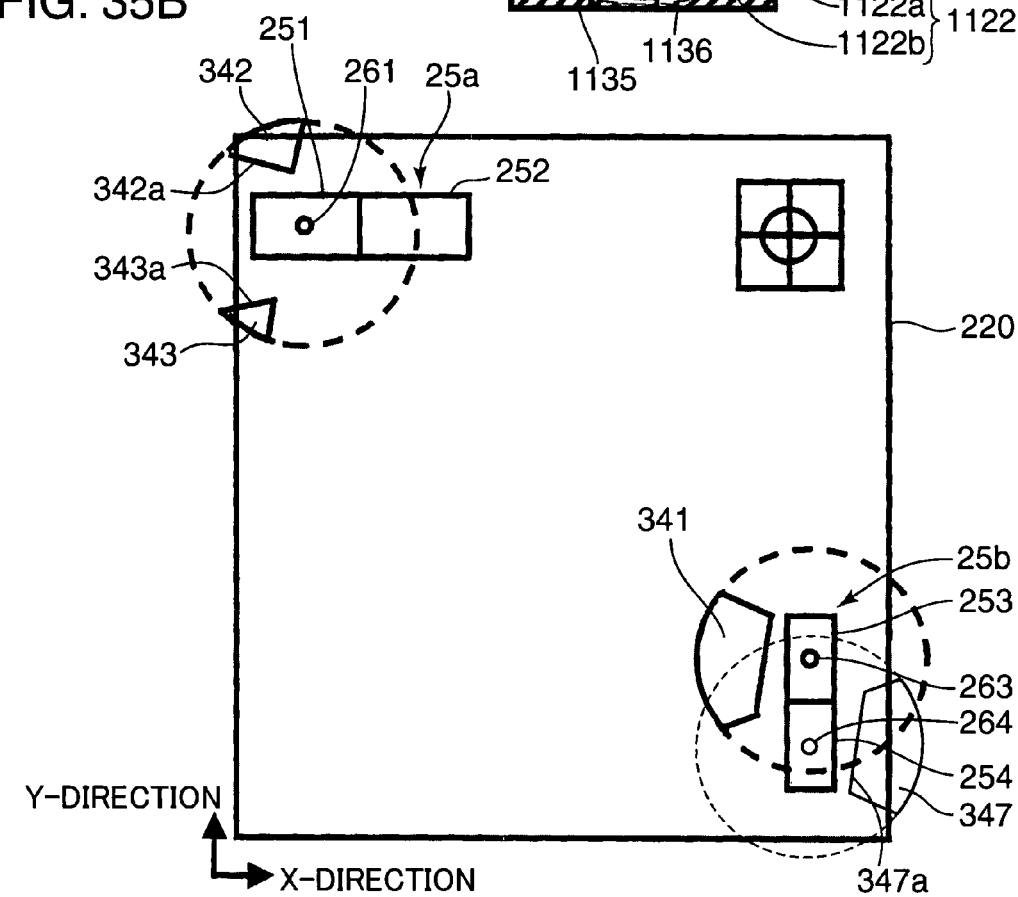

FIG. 35B shows a relationship of a light receiving portion 253 of a photodetector 220 according to the sixth modification, a light beam 263 diffracted by the region 1132 and an other-layer stray light 341 of the light beam 263, and a relationship of a light receiving portion 251, a light beam 261 diffracted by the regions 1130 and 1135 and other-layer stray lights 342, 343 of the light beam 261.

Other-layer stray lights produced between two information layers having a minimum layer spacing are those having a radius R4min proportional to a minimum layer spacing d4min. Since the light beam 263 is the one from the region 1132, the shape of the stray light is similar to that of a light beam passing the region 1132. This is a stray light 341. FIG. 35B shows stray lights from the front-side layer when a focal point is adjusted to the back-side layer out of the information layers having the minimum layer spacing. Since the stray lights from the front-side layer are focused behind the photodetector 220, they are located in a direction in which the holographic element 1120 is mapped as it is.

Further, since the light beam 264 is a light beam from the second main region 1134, the shape of the stray light is similar to that of a light beam passing the second main region 1134. This is a stray light 347.

Similarly, since the light beam 261 is the one from the regions 1130, 1135, the shapes of the stray lights are similar to those of light beams passing the regions 1130, 1135. These are stray lights 342, 343.

Figure 35D:
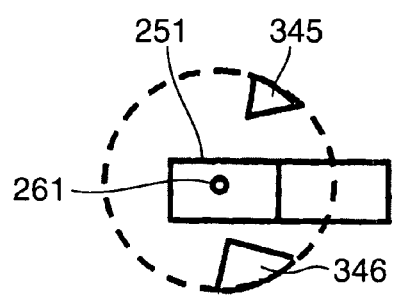
Figure 35C:
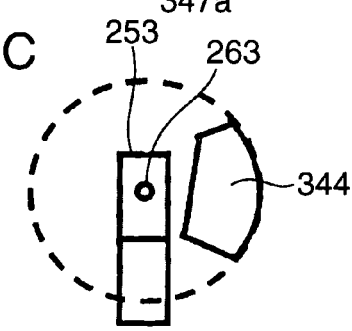

On the other hand, FIG. 35C shows a stray light 344 from the back-side layer when the light beam 263 diffracted by the region 1132 is focused on the front-side layer out of the information layers having the minimum layer spacing. Since stray lights from the back-side layer are focused before the photodetector 220, they are located in a direction in which the holographic element 1120 is mapped while being inverted in point symmetry. Thus, as shown in FIG. 35C, the stray lights 344, 341 are point symmetrical with respect to the light beam 263.

FIG. 35D shows stray lights 345, 346 from the back-side layer when the light beam 261 diffracted by the regions 1130, 1135 is focused on the front-side layer out of the information layers having the minimum layer spacing. Since stray lights from the back-side layer are focused before the photodetector, they are located in a direction in which the holographic element 1120 is mapped while being inverted in point symmetry. Thus, as shown in FIG. 35D, the stray lights 345, 346 and the stray lights 342, 343 are point symmetrical with respect to the light beam 261.

Light receiving portions 253, 254 of a main region light receiving portion group 25b are arranged between a projection line 341a of the third dividing line 1125 on the photodetector 220 and a projection line 347a of the fourth dividing line 1126 on the photodetector 220 by the stray lights from two information layers adjacent to the one information layer, on which the light beam is focused, out of a plurality of information layers. Further, light receiving portions 251, 252 of a subregion light receiving portion group 25a are arranged between a projection line 342a of the first dividing line 1121 (seventh dividing line 1121a) on the photodetector 220 and a projection line 343a of the second dividing line 1122 (ninth dividing line 1122a) on the photodetector 220 by the stray lights from two information layers adjacent to the one information layer, on which the light beam is focused, out of the plurality of information layers.

As described above, the first and second subregions may be separated by the central region, the dividing lines dividing the first and second subregions may not be connected, and the first to fourth dividing lines 1121 to 1126 may not be normal or parallel to the track tangential direction. The effects of the present invention can be obtained by arranging the light receiving portions of the photodetector between the projected positions of the respective dividing lines by the stray lights from the layers having the minimum layer spacing of the optical disc.

The specific embodiments described above mainly embrace inventions having the following constructions.

An optical head device according to one aspect of the present invention comprises a light source for emitting a light beam; a focusing optical system for focusing the light beam emitted from the light source into a convergent light to be incident on an information recording medium having tracks; a diffraction optical system for diffracting a part of the light beam reflected and diffracted by the information recording medium; and a photodetector for receiving the light beam diffracted by the diffraction optical system and the light beam having passed through the diffraction optical system without being diffracted, wherein the diffraction optical system is divided into a plurality of regions by first and second dividing lines extending in a first direction and third and fourth dividing lines extending in a second direction intersecting with the first direction and uses regions at the outer sides of the first and second dividing lines as first and second subregions and regions at the outer sides of the third and fourth dividing lines as first and second main regions; the photodetector includes a $0^{th}$-order light receiving portion group for receiving the light beam having passed through the diffraction optical system without being diffracted, a main region light receiving portion group for receiving the light beam diffracted by the first and second main regions and a subregion light receiving portion group for receiving the light beam diffracted by the first and second subregions; the information recording medium includes a plurality of information layers; light receiving portions of the main region light receiving portion group are arranged between projection lines of the third and fourth dividing lines on the photodetector by stray lights from the information layer adjacent to the one information layer, on which the light beam is focused, out of the plurality of information layers; and light receiving portions of the subregion light receiving portion group are arranged between projection lines of the first and second dividing lines on the photodetector by the stray lights from the information layer adjacent to the one information layer, on which the light beam is focused, out of the plurality of information layers.

According to this construction, the light beam is emitted from the light source, and is focused into the convergent light to be incident on the information recording medium having the track. The part of the light beam reflected and diffracted by the information recording medium is diffracted by the diffraction optical system, and the light beam diffracted by the diffraction optical system and the one having passed through the diffraction optical system without being diffracted are received by the photodetector. The diffraction optical system is divided into the plurality of regions by the first and second dividing lines extending in the first direction and the third and fourth dividing lines extending in the second direction intersecting with the first direction. The regions at the outer sides of the first and second dividing lines are the first and second subregions, and the regions at the outer sides of the third and fourth dividing lines are the first and second main regions. The $0^{th}$-order light receiving portion group of the photodetector receives the light beam having passed through the diffraction optical system without being diffracted, the main region light receiving portion group thereof receives the light beam diffracted by the first and second main regions, and the subregion light receiving portion group thereof receives the light beam diffracted by the first and second subregions. The information recording medium includes the plurality of information layers, and the light receiving portions of the main region light receiving portion group are arranged between the projection lines of the third and fourth dividing lines on the photodetector by the stray lights from the information layer adjacent to the one information layer, on which the light beam is focused, out of the plurality of information layers. Further, the light receiving portions of the subregion light receiving portion group are arranged between projection lines of the first and second dividing lines on the photodetector by the stray lights from the information layer adjacent to the one information layer, on which the light beam is focused, out of the plurality of information layers.

Accordingly, the stray lights from the information layer adjacent to the one information layer, on which the light beam is focused, out of the plurality of information layers, are not incident on the respective light receiving portions of the main region light receiving portion group and the subregion light receiving portion group, wherefore an offset-free tracking signal can be generated and a stable tracking control can be realized even if an optical disc has three or more layers.

In the above optical head device, the main region light receiving portion group preferably includes two light receiving portions arranged in a direction of the extensions of tangents to the third and fourth dividing lines of the diffraction optical system.

According to this construction, since the two light receiving portions constituting the main region light receiving portion group are arranged in the direction of the extensions of the tangents to the third and fourth dividing lines of the diffraction optical system, an offset-free tracking signal can be generated while the widths of the light receiving portions of the main region light receiving portion group is increased.

In the above optical head device, the two light receiving portions of the main region light receiving portion group are arranged side by side in the direction of the extensions of tangents to the third and fourth dividing lines of the diffraction optical system.

According to this construction, since the two light receiving portions constituting the main region light receiving portion group are arranged side by side in the direction of the extensions of the tangents to the third and fourth dividing lines of the diffraction optical system, there are sufficient clearances between the light receiving portions of the main region light receiving portion group and other-layer stray lights and the light receiving portions can be arranged with margins.

In the above optical head device, the subregion light receiving portion group preferably includes two light receiving portions arranged in a direction of the extensions of tangents to the first and second dividing lines of the diffraction optical system.

According to this construction, since the two light receiving portions constituting the subregion light receiving portion group are arranged in the direction of the extensions of tangents to the first and second dividing lines of the diffraction optical system, an offset-free tracking signal can be generated while the widths of the light receiving portions of the subregion light receiving portion group is increased.

In the above optical head device, the two light receiving portions of the subregion light receiving portion group are preferably arranged side by side in the direction of the extensions of tangents to the first and second dividing lines of the diffraction optical system.

According to this construction, since the two light receiving portions of the subregion light receiving portion group are preferably arranged side by side in the direction of the extensions of tangents to the first and second dividing lines of the diffraction optical system, there are sufficient clearances between the light receiving portions of the subregion light receiving portion group and other-layer stray lights and the light receiving portions can be arranged with margins.

In the above optical head device, the diffraction optical system preferably uses a region enclosed by the first, second, third and fourth dividing lines as a central region and diffracts the light beam by the central region in a direction bisecting an angle defined by the main region light receiving portion group and the subregion light receiving portion group with an optical axis as an apex.

According to this construction, the region enclosed by the first, second, third and fourth dividing lines is the central region, and the light is diffracted by the central region in the direction bisecting the angle between the main region light receiving portion group and the subregion light receiving portion group with the optical axis as an apex. Thus, the diffracted light by the central region and other-layer stray lights by the other regions can be incident at positions distant from both the main region light receiving portion group and the subregion light receiving portion group, wherefore an offset-free tracking signal can be generated.

In the above optical head device, the diffraction optical system preferably uses a region enclosed by the first, second, third and fourth dividing lines as a central region and diffracts the light beam by the central region in a direction normal to a direction bisecting an angle defined by the main region light receiving portion group and the subregion light receiving portion group with the optical axis as an apex.

According to this construction, the region enclosed by the first, second, third and fourth dividing lines is the central region, and the light is diffracted by the central region in the direction normal to the direction bisecting the angle between the main region light receiving portion group and the subregion light receiving portion group with the optical axis as an apex. Thus, the diffracted light by the central region and other-layer stray lights by the other regions can be incident at positions distant from both the main region light receiving portion group and the subregion light receiving portion group, wherefore an offset-free tracking signal can be generated.

In the above optical head device, the diffraction optical system preferably includes a light shielding portion for shielding unnecessary other-layer stray lights. According to this construction, the other-layer stray lights can be removed by the light shielding portion before reaching the photodetector, wherefore an offset-free tracking signal can be generated.

In the above optical head device, it is preferable that a branching element is further provided between the diffraction optical system and the photodetector for branching the light beam passing through the diffraction optical system without being diffracted; that the photodetector further includes a $0^{th}$-order light receiving portion group for receiving the light beam incident thereon without being diffracted by the diffraction optical system; the $0^{th}$-order light receiving portion group includes a focus detecting portion present on the optical axis and adapted to detect the light beam having passed through the branching element by four light receiving portions and generate a focus signal and an RF signal detecting portion present at a position deviated from the optical axis and adapted to detect the light beam branched off by the branching element by one light receiving portion and generate an RF signal.

According to this construction, since the light beam branched off by the branching element is detected by the one light receiving portion to generate the RF signal, noise production resulting from the detection by a plurality of light receiving portions can be suppressed to improve the S/N ratio of the RF signal, wherefore information can be reproduced at a smaller error rate.

In the optical head device, the branching element is preferably a prism. According to this construction, a function of branching the light beam can be realized by a simple optical element to suppress production cost.

In the above optical head device, the branching element preferably includes an element for giving astigmatism in one light path after beam branching. According to this construction, the light beam for detecting the RF signal can be focused on the light receiving portion and astigmatism can be given to the light beam for detecting the focus signal. Therefore, the areas of the light receiving portions can be made smaller, the frequency characteristics of the light receiving portions can be improved and the cost of the branching element can be suppressed.

In the above optical head device, the element for giving the astigmatism is preferably either a lens or a holographic element. According to this construction, the element for giving the astigmatism can be simply constructed.

In the above optical head device, it is preferable that the light source includes a first light source for emitting a first light beam, a second light source for emitting a second light beam having a wavelength longer than that of the first light beam and a third light source for emitting a third light beam having a wavelength longer than that of the first light beam and different from that of the second light beam; that the $0^{th}$-order light receiving portion group includes a first $0^{th}$-order light receiving portion group for receiving the first and second light beams having passed through the diffraction optical system without being diffracted and a second $0^{th}$-order light receiving portion group for receiving the third light beam having passed through the diffraction optical system without being diffracted; that the main region light receiving portion receives the first light beam diffracted by the first and second main regions; that the subregion light receiving portion group receives the first light beam diffracted by the first and second subregions; and that the second $0^{th}$-order light receiving portion group is arranged between the first $0^{th}$-order light receiving portion group and either one of the main region light receiving portion group or the subregion light receiving portion group.

According to this construction, the first light beam is emitted from the first light source, the second light beam having a wavelength longer than that of the first light beam is emitted from the second light source, and the third light beam having a wavelength longer than that of the first light beam and different from the second light beam is emitted from the third light source. The first and second light beams having passed through the diffraction optical system without being diffracted are received by the first $0^{th}$-order light receiving portion group, and the third light beam having passed through the diffraction optical system without being diffracted is received by the second $0^{th}$-order light receiving portion group. Further, the first light beam diffracted by the first and second main regions is received by the main region light receiving portion group, and the first light beam diffracted by the first and second subregions is received by the subregion light receiving portion group. The second $0^{th}$-order light receiving portion group is arranged between the first $0^{th}$-order light receiving portion group and either one of the main region light receiving portion group or the subregion light receiving portion group.

Accordingly, even in the case of recording or production on or from three types of optical discs such as CDs, DVDs and BDs, an offset-free tracking signal can be generated a stable tracking control can be realized while compatibility with the respective optical discs is ensured by the compact photodetector.

An optical information device according another aspect of the present invention comprises the above optical head device for reading and/or recording information from and/or on an information recording medium, a moving device for changing relative positions of the information recording medium and the optical head device, and a control circuit for controlling the moving device and the optical head device.

According to this construction, an offset-free tracking signal can be generated by using the above optical head device even if an optical disc is a multi-layer disc having three or more layers, wherefore an optical information device capable of realizing a stable tracking control can be provided.

According to the present invention, since other-layer stray lights from the layers having a minimum layer spacing out of a plurality of information layers are not incident on the respective light receiving portions of the main region light receiving portion group and the subregion light receiving portion group, an offset-free tracking signal can be generated and a stable tracking control can be realized even if an optical disc is a multi-layer disc having three or more layers.

The optical head device and optical information device according to the present invention have a function of executing a stable tracking control and a function of realizing a low information error rate and is useful as an external storage device for a computer. They can be also applied to video recording devices and video reproducing devices such as DVD recorders, BD recorders and HD-DVD recorders. Further, they are useful as storage devices for car navigation systems, portable music players, digital still cameras and digital video cameras.

This application is based on patent application Nos. 2006-273820 and 2006-289820 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An optical head device, comprising:
a light source for emitting a light beam;
a focusing optical system for focusing the light beam emitted from the light source into a convergent light to be incident on an information recording medium having tracks;
a diffraction optical system for diffracting a part of the light beam reflected and diffracted by the information recording medium; and
a photodetector for receiving the light beam diffracted by the diffraction optical system and the light beam having passed through the diffraction optical system without being diffracted, wherein:
the diffraction optical system is divided into a plurality of regions by first and second dividing lines extending in a first direction and third and fourth dividing lines extending in a second direction intersecting with the first direction and uses regions at the outer sides of the first and second dividing lines as first and second subregions and regions at the outer sides of the third and fourth dividing lines as first and second main regions;

the photodetector includes a $0^{th}$-order light receiving portion group for receiving the light beam having passed through the diffraction optical system without being diffracted, a main region light receiving portion group for receiving the light beam diffracted by the first and second main regions and a subregion light receiving portion group for receiving the light beam diffracted by the first and second subregions;

the information recording medium includes a plurality of information layers;

light receiving portions of the main region light receiving portion group are arranged between projection lines of the third and fourth dividing lines on the photodetector by stray lights from the information layer adjacent to the one information layer, on which the light beam is focused, out of the plurality of information layers; and light receiving portions of the subregion light receiving portion group are arranged between projection lines of the first and second dividing lines on the photodetector by the stray lights from the information layer adjacent to the one information layer, on which the light beam is focused, out of the plurality of information layers.

2. An optical head device according to claim 1, wherein the main region light receiving portion group includes two light receiving portions arranged in a direction of extensions of tangents to the third and fourth dividing lines of the diffraction optical system.

3. An optical head device according to claim 2, wherein the two light receiving portions of the main region light receiving portion group are arranged side by side in the direction of the extensions of tangents to the third and fourth dividing lines of the diffraction optical system.

4. An optical head device according to claim 1, wherein the subregion light receiving portion group includes two light receiving portions arranged in a direction of extensions of tangents to the first and second dividing lines of the diffraction optical system.

5. An optical head device according to claim 4, wherein the two light receiving portions of the subregion light receiving portion group are arranged side by side in the direction of the extensions of tangents to the first and second dividing lines of the diffraction optical system.

6. An optical head device according to claim 1, wherein the diffraction optical system uses a region enclosed by the first, second, third and fourth dividing lines as a central region and diffracts the light beam by the central region in a direction bisecting an angle defined by the main region light receiving portion group and the subregion light receiving portion group with an optical axis as an apex.

7. An optical head device according to claim 1, wherein the diffraction optical system uses a region enclosed by the first, second, third and fourth dividing lines as a central region and diffracts the light beam by the central region in a direction normal to a direction bisecting an angle defined by the main region light receiving portion group and the subregion light receiving portion group with an optical axis as an apex.

8. An optical head device according to claim 1, wherein the diffraction optical system includes a light shielding portion for shielding unnecessary other-layer stray lights.

9. An optical head device according to claim 1, wherein:

the light source includes a first light source for emitting a first light beam, a second light source for emitting a second light beam having a wavelength longer than that of the first light beam and a third light source for emitting a third light beam having a wavelength longer than that of the first light beam and different from that of the second light beam;

the $0^{th}$-order light receiving portion group includes a first $0^{th}$-order light receiving portion group for receiving the first and second light beams having passed through the diffraction optical system without being diffracted and a second $0^{th}$-order light receiving portion group for receiving the third light beam having passed through the diffraction optical system without being diffracted;

the main region light receiving portion receives the first light beam diffracted by the first and second main regions;

the subregion light receiving portion group receives the first light beam diffracted by the first and second subregions; and the second $0^{th}$-order light receiving portion group is arranged between the first $0^{th}$-order light receiving portion group and either one of the main region light receiving portion group or the subregion light receiving portion group.

10. An optical information device, comprising:

an optical head device according to claim 1 for reading and/or recording information from and/or on an information recording medium;

a moving device for changing relative positions of the information recording medium and the optical head device, and a control circuit for controlling the moving device and the optical head device.

\* \* \* \* \*